US012810557B2

(12) United States Patent
Lee

(10) Patent No.: US 12,810,557 B2
(45) Date of Patent: Nov. 24, 2026

(54) WEARABLE DEVICE, METHOD, AND NON-TRANSITORY COMPUTER READABLE STORAGE MEDIUM PROVIDING GRAPHIC REGION

(71) Applicant: Samsung Electronics Co., Ltd., Suwon-si (KR)

(72) Inventor: Eunkyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 18/486,729

(22) Filed: Oct. 13, 2023

(65) Prior Publication Data

US 2024/0203067 A1 Jun. 20, 2024

Related U.S. Application Data

(63) Continuation of application No. PCT/KR2023/012651, filed on Aug. 25, 2023.

(30) Foreign Application Priority Data

Dec. 15, 2022 (KR) ........................ 10-2022-0176356
Jan. 9, 2023 (KR) ........................ 10-2023-0003143

(51) Int. Cl.
*G06T 19/00* (2011.01)
*G01C 21/20* (2006.01)
(Continued)

(52) U.S. Cl.
CPC .......... *G06T 19/006* (2013.01); *G01C 21/206* (2013.01); *G02B 27/0093* (2013.01); (Continued)

(58) Field of Classification Search
None
See application file for complete search history.

(56) References Cited

U.S. PATENT DOCUMENTS 9,081,177 B2 7/2015 Wong et al.
9,639,986 B2 5/2017 Cho et al.
(Continued)

FOREIGN PATENT DOCUMENTS

CN 106293810 A 1/2017
JP 2022-158533 A 10/2022
(Continued)

OTHER PUBLICATIONS

International Search Report dated Dec. 12, 2023, issued in International Patent Application No. PCT/KR2023/012651.

*Primary Examiner* — Jwalant Amin
(74) *Attorney, Agent, or Firm* — Jefferson IP Law, LLP

(57) ABSTRACT

A wearable device is provided. The wearable device includes a display arranged with respect to eyes of a user wearing the wearable device. The wearable device includes a camera including at least one lens that faces a direction corresponding to a direction in which the eyes faces. The wearable device includes a processor. The processor is configured to identify, in response to a schedule, a place labeled with respect to the schedule. The processor is configured to identify, based at least in part on the identification, whether the camera of the wearable device positioned in the place faces a region in the place to which a graphic region for the schedule is set. The processor is configured to display, via the display, at least portion of the graphic region on at least portion of the region, based on identifying that a direction of the camera corresponds to a first direction in which the camera faces the region. The processor is configured to identify, via the display, information for informing the first direction, based on identifying that the direction corresponds to a second direction different from the first direction.

20 Claims, 38 Drawing Sheets

(51) Int. Cl.

| | |
|---|---|
| ***G02B 27/00*** | (2006.01) |
| ***G02B 27/01*** | (2006.01) |
| ***G06F 1/16*** | (2006.01) |
| ***G06F 3/00*** | (2006.01) |
| ***G06F 3/01*** | (2006.01) |
| ***G06F 3/0481*** | (2022.01) |
| ***G06F 3/04842*** | (2022.01) |
| ***G06V 40/18*** | (2022.01) |
| ***H04W 4/80*** | (2018.01) |

(52) U.S. Cl.

CPC ............. *G02B 27/017* (2013.01); *G06F 1/16* (2013.01); *G06F 3/00* (2013.01); *G06F 3/01* (2013.01); *G06F 3/011* (2013.01); *G06F 3/013* (2013.01); *G06F 3/0481* (2013.01); *G06F 3/04842* (2013.01); *G06T 19/00* (2013.01); *G06V 40/18* (2022.01); *H04W 4/80* (2018.02); *G02B 2027/0138* (2013.01); *G02B 2027/014* (2013.01); *G02B 2027/0187* (2013.01)

(56) References Cited

U.S. PATENT DOCUMENTS

| | | | | |
|---|---|---|---|---|
| 10,474,336 | B2 | 11/2019 | Smith | |
| 10,860,103 | B2 * | 12/2020 | Kacelenga | G06F 3/011 |
| 11,017,231 | B2 | 5/2021 | Petill et al. | |
| 11,145,096 | B2 | 10/2021 | Mchugh et al. | |
| 11,699,266 | B2 * | 7/2023 | Laurent | G06F 3/016 345/419 |
| 12,108,011 | B2 | 10/2024 | Canberk et al. | |
| 2014/0333566 | A1 * | 11/2014 | Lee | H04W 4/50 345/173 |
| 2015/0168729 | A1 * | 6/2015 | Kobayashi | G06F 1/1686 345/156 |
| 2016/0048023 | A1 * | 2/2016 | Haddick | H04N 9/3197 345/8 |
| 2016/0147302 | A1 | 5/2016 | Choi | |
| 2017/0026577 | A1 * | 1/2017 | You | H04N 5/9201 |
| 2017/0109916 | A1 * | 4/2017 | Kurz | G06T 19/006 |
| 2017/0287215 | A1 | 10/2017 | Lalondde et al. | |
| 2020/0020334 | A1 * | 1/2020 | Kang | G06F 3/167 |
| 2020/0120199 | A1 | 4/2020 | Maeng et al. | |
| 2020/0258029 | A1 * | 8/2020 | Jung | G06N 3/047 |
| 2020/0335211 | A1 * | 10/2020 | Gopalakrishnan | G06F 8/61 |
| 2022/0202357 | A1 * | 6/2022 | Ogawa | A61B 5/4809 |
| 2023/0071993 | A1 * | 3/2023 | Sztuk | G06V 40/171 |
| 2023/0139626 | A1 * | 5/2023 | Berliner | G06F 3/1423 345/156 |

FOREIGN PATENT DOCUMENTS

| | | | |
|---|---|---|---|
| KR | 10-2015-0020918 | A | 2/2015 |
| KR | 10-2015-0084200 | A | 7/2015 |
| KR | 10-2018-0102171 | A | 9/2018 |
| KR | 10-1940720 | B1 | 4/2019 |
| KR | 10-2019-0099170 | A | 8/2019 |
| KR | 10-2019-0106769 | A | 9/2019 |
| KR | 10-2527522 | B1 | 5/2023 |
| WO | 2018/186516 | A1 | 10/2018 |

* cited by examiner

WEARABLE DEVICE, METHOD, AND NON-TRANSITORY COMPUTER READABLE STORAGE MEDIUM PROVIDING GRAPHIC REGION

CROSS-REFERENCE TO RELATED APPLICATION(S)

This application is a continuation application, claiming priority under § 365(c), of an International application No. PCT/KR2023/012651, filed on Aug. 25, 2023, which is based on and claims the benefit of a Korean patent application number 10-2022-0176356, filed on Dec. 15, 2022, in the Korean Intellectual Property Office, and of a Korean patent application number 10-2023-0003143, filed on Jan. 9, 2023, in the Korean Intellectual Property Office, the disclosure of each of which is incorporated by reference herein in its entirety.

TECHNICAL FIELD

The disclosure relates to a wearable device, a method, and a non-transitory computer readable storage medium providing a graphic region.

BACKGROUND ART

In order to provide an enhanced user experience, an electronic device that provides a service displaying information generated by a computer in association with an external object in the real-world is being developed. The electronic device may be a wearable device that may be worn by a user. For example, the electronic device may be an augmented reality (AR) glass. For example, the electronic device may be a virtual reality (VR) device. For example, the electronic device may be a video see-through (VST) device.

The above information is presented as background information only to assist with an understanding of the disclosure. No determination has been made, and no assertion is made, as to whether any of the above might be applicable as prior art with regard to the disclosure.

DISCLOSURE

Technical Solution

A wearable device is provided. The wearable device may comprise a display arranged with respect to eyes of a user wearing the wearable device. The wearable device may comprise a camera comprising at least one lens that faces a direction corresponding to a direction in which the eyes faces. The wearable device may comprise a processor. The wearable device may comprise memory storing instructions. The instructions may cause, when executed by the processor, the wearable device to identify, based on a schedule, a place associated with the schedule. The instructions may cause, when executed by the processor, the wearable device to identify, based on the wearable device being position in the place associated with the schedule, a direction of the camera of the wearable device with respect to a region in the place to which a graphic region for the schedule is set. The instructions may cause, when executed by the processor, the wearable device to display, via the display, at least portion of the graphic region on at least portion of the region, based on identifying that the direction of the camera corresponds to a first direction in which the camera faces the region. The instructions may cause, when executed by the processor, the wearable device display, via the display, information for informing to change a direction of the camera, based on identifying that the direction corresponds to a second direction different from the first direction.

A method is provided. The method may be executed for a wearable device comprising a display arranged with respect to eyes of a user wearing the wearable device and a camera including at least one lens that faces a direction corresponding to a direction in which the eyes faces. The method may comprise identifying, based on a schedule, a place associated with the schedule. The method may comprise, based on the wearable device being positioned in the place associated with the schedule, identifying a direction of the camera of the wearable device with respect to a region in the place to which a graphic region for the schedule is set. The method may comprise, based on identifying that the direction of the camera corresponds to a first direction in which the camera faces the region, display, via the display, at least portion of the graphic region on at least portion of the region. The method may comprise, based on identifying that the direction corresponds to a second direction different from the first direction, display, via the display, information for informing to change a direction of the camera.

A non-transitory computer readable storage medium is provided. The non-transitory computer readable storage medium may store one or more programs. The one or more programs may comprise instructions which, when executed by a processor of a wearable device including a display arranged with respect to eyes of a user wearing the wearable device and a camera including at least one lens that faces a direction corresponding to a direction in which the eyes faces, cause the wearable device to identify, based on a schedule, a place associated with the schedule. The one or more programs may comprise instructions which, when executed by the processor, cause the wearable device to, based on the wearable device being positioned in the place associated with the schedule, identify a direction of the camera of the wearable device with respect to a region in the place to which a graphic region for the schedule is set. The one or more programs may comprise instructions which, when executed by the processor, cause the wearable device to, based on identifying that the direction of the camera corresponds to a first direction in which the camera faces the region, display, via the display, at least portion of the graphic region on at least portion of the region. The one or more programs may comprise instructions which, when executed by the processor, cause the wearable device, based on identifying that the direction corresponds to a second direction different from the first direction, display, via the display, information for informing to change a direction of the camera.

DESCRIPTION OF THE DRAWINGS

The above and other aspects, features, and advantages of certain embodiments of the disclosure will be more apparent from the following description taken in conjunction with the accompanying drawings, in which.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
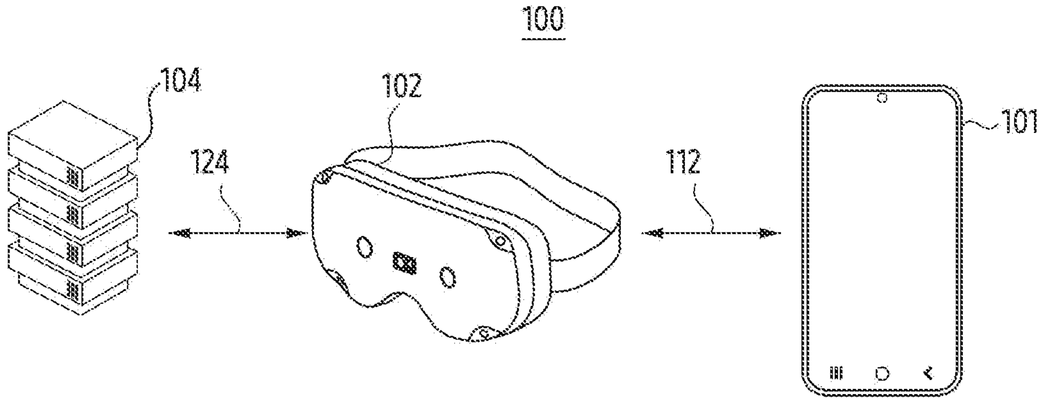
FIG. 1 illustrates an example of an environment including an exemplary wearable device.

FIG. 1 illustrates an example of an environment including an exemplary wearable device.

Referring to FIG. 1, an environment 100 may include an electronic device 101, a wearable device 102, and an external electronic device 104.

For example, the electronic device 101 may store a software application to control or manage another device through the electronic device 101. For example, the electronic device 101 may control or manage a device such as the wearable device 102 (or a physical device) by using the software application. For example, the electronic device 101 may control the other device, by executing the software application based on a user input received with respect to a user interface of the software application. For example, the software application may be used to provide a graphic region (or a virtual region) identified based on the user input received while the user interface is displayed, for the other device. For example, the graphic region may be provided in response to an event. For example, the event may be identified through the software application. The event will be illustrated below.

For example, the wearable device 102 may be a device for providing a virtual reality (VR) service, an augmented reality (AR) service, a mixed reality (MR) service, or an extended reality (XR) service. For example, the wearable device 102 may include a display for providing the AR service, the MR service, or the XR service. For example, when the wearable device 102 is AR glasses, the display of the wearable device 102 may include a transparent layer. For example, when the wearable device 102 is a video see-through (or visual see-through) (VST) device, the display of the wearable device 102 may be opaque.

For example, the wearable device 102 may provide the AR service, the MR service, or the XR service, by displaying real environment around the wearable device 102 or an image indicating the real environment, on the display of wearable device 102, with a virtual object. For example, when the wearable device 102 is the AR glasses, the wearable device 102 may display the virtual object on the real environment shown through the display of the wearable device 102. For example, when the wearable device 102 is the VST device, the wearable device 102 may display the virtual object on the image obtained through a camera of the wearable device 102. For example, the virtual object may include the graphic region. For example, the graphic region may be displayed on the display of the wearable device 102, based on data received from the electronic device 101 to the wearable device 102 through a connection 112. For example, the graphic region may be displayed on the display of the wearable device 102, based on data received from the external electronic device 104 to the wearable device 102 through a connection 124.

For example, the wearable device 102 may store one or more software applications for providing the graphic region. For example, the one or more software applications may be used to identify the event. For example, the one or more of software applications may include a software application for managing a schedule. For example, the one or more software applications may include a software application for managing another device (e.g., the electronic device 101) through the wearable device 102. For example, the one or more of software applications may include a software application for providing an alarm or a notification. For example, the one or more software applications may include a software application used to set a condition, used to set one or more functions corresponding to the condition, and used to execute the one or more functions in response to satisfaction of the condition. For example, the one or more software applications may include a software application used to provide a service using contact information or manage the contact information. For example, the one or more software applications may include a software application for recognizing an image obtained through a camera. However, it is not limited thereto.

For example, the one or more software applications may be executed based on a user account. For example, the user account used for the one or more of software applications may correspond to a user account used for the software application in the electronic device 101. However, it is not limited thereto.

For example, the external electronic device 104 may be one or more servers for processing related to the software application stored in the electronic device 101 and/or the one or more software applications stored in the wearable devices 102. For example, the external electronic device 104 may execute processing related to the software application in the electronic device 101 and/or the one or more of the software applications in the wearable device 102, based on a user account each corresponding to the user account used in the electronic device 101 and the user account used in the wearable device 102. For example, the external electronic device 104 may transmit a notification or a push message to the electronic device 101, based on the processing. The notification or the push message from the external electronic device 104 may be transmitted to the wearable device 102 using the connection 112 through the electronic device 101. For example, the external electronic device 104 may transmit a notification or a push message to the wearable device 102 through the connection 124, based on the processing. For example, the notification or the push message may be transmitted from the external electronic device 104 to the electronic device 101 and/or the wearable device 102, in response to identifying the event to be illustrated below in the external electronic device 104. However, it is not limited thereto.

According to embodiments, the electronic device 101 and/or the external electronic device 104 may not be included in the environment 100. For example, operations to be illustrated below may be executed by the wearable device 102 within a standalone state from the electronic device 101 and the external electronic device 104, and may be executed based on a communication between the electronic device 101 and the wearable device 102 and/or a communication between the external electronic device 104 and the wearable device 102.

The wearable device 102 may include components for providing a graphic region in response to an event through a display of the wearable device 102. The components may be illustrated in FIG. 2.

Figure 2:
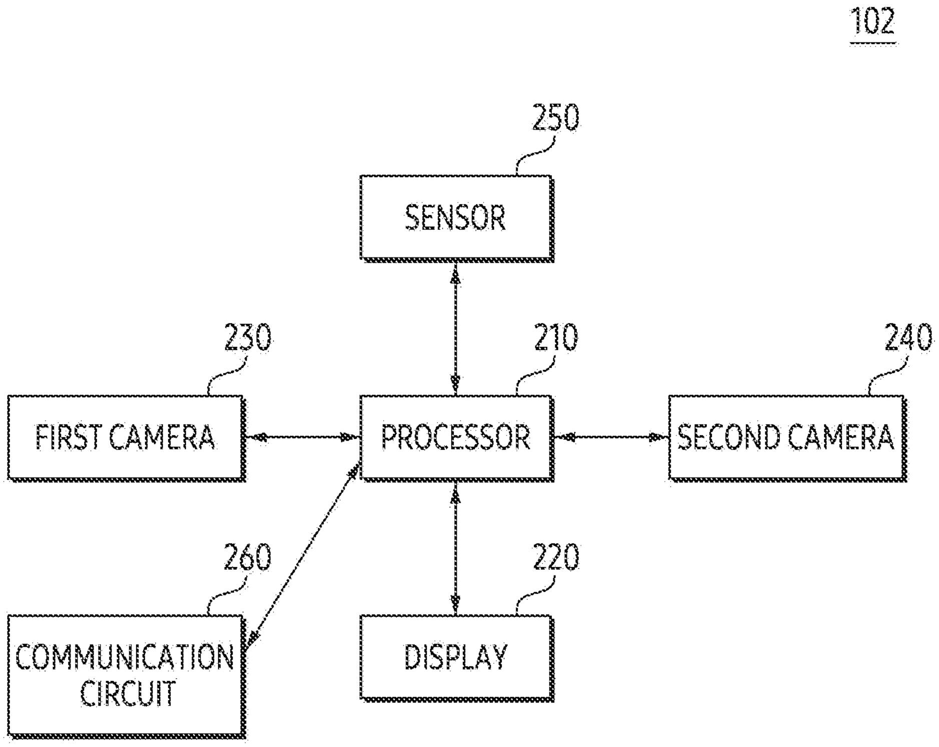
FIG. 2 is a simplified block diagram of an exemplary wearable device.

FIG. 2 is a simplified block diagram of an exemplary wearable device.

Referring to FIG. 2, the wearable device 102 may include a processor 210, a display 220, a first camera 230, a second camera 240, a sensor 250, and/or a communication circuit 260.

For example, the processor 210 may be used to execute operations (and/or methods) to be illustrated below. For example, the processor 210 may be operably coupled with the display 220, the first camera 230, the second camera 240, the sensor 250, and/or the communication circuit 260. For example, operative coupling of the processor 210 to the display 220, the first camera 230, the second camera 240, the sensor 250, and/or the communication circuit 260 may indicate that the processor 210 is directly connected to each of the display 220, the first camera 230, the second camera 240, the sensor 250, and the communication circuit 260. For example, operative coupling of the processor 210 to the display 220, the first camera 230, the second camera 240, the sensor 250, and/or the communication circuit 260 may indicate that the processor 210 is connected to each of the display 220, the first camera 230, the second camera 240, the sensor 250, and the communication circuit 260, through another component of the wearable device 102. For example, operative coupling of the processor 210 to the display 220, the first camera 230, the second camera 240, the sensor 250, and/or the communication circuit 260 may indicate that each of the display 220, the first camera 230, the second camera 240, the sensor 250, and the communication circuit 260 operates based on instructions executed by the processor 210. For example, operative coupling of the processor 210 to the display 220, the first camera 230, the second camera 240, the sensor 250, and/or the communication circuit 260 may indicate that each of the display 220, the first camera 230, the second camera 240, the sensor 250, and the communication circuit 260 is controlled by the processor 210. However, it is not limited thereto.

For example, the display 220 may be used to provide visual information. For example, the display 220 may be transparent when the wearable device 102 is AR glasses, and may be opaque or translucent when the wearable device 102 is a VST device. For example, the display 220 may be arranged with respect to eyes of a user. For example, the display 220 may be arranged to be positioned in front of the eyes of a user wearing the wearable device 102.

For example, each of the first camera 230 and the second camera 240 may be used to obtain an image. For example, the first camera 230 may include at least one lens that has a field of view (FOV) corresponding to an FOV of eyes of a user wearing the wearable device 102 and faces in a direction corresponding to a direction in which the eyes faces. For example, the first camera 230 may be used to obtain an image indicating an environment around the wearable device 102. For example, unlike the first camera 230, the second camera 240 may face the eyes of the user wearing the wearable device 102. For example, the second camera 240 may be used to identify a user input through the eyes. For example, the second camera 240 may be used for tracking the eyes or a gaze of the eyes. According to embodiments, the first camera 230 and/or the second camera 240 may not be included in the wearable device 102.

For example, the sensor 250 may be used to identify a state of the wearable device 102, a state of the user wearing the wearable device 102, and/or a state of the environment around the wearable device 102. For example, the sensor 250 may be used to obtain data indicating a posture of the wearable device 102, data indicating acceleration of the wearable device 102, and/or data indicating orientation of the wearable device 102. For example, the sensor 250 may be used to obtain biometric data of the user wearing the wearable device 102. For example, the sensor 250 may be used to obtain data indicating a pose of the user wearing the wearable device 102. For example, the sensor 250 may be used to obtain data indicating illuminance around the wearable device 102. For example, the sensor 250 may be used to obtain data indicating a temperature around the wearable device 102. However, it is not limited thereto.

For example, the communication circuit 260 may be used for a communication between the wearable devices 102 and another device (e.g., the electronic device 101 and/or the external electronic device 104). For example, the communication circuit 260 may be used to establish a connection between the wearable device 102 and the other device. For example, the communication circuit 260 may be used to transmit a signal, information, and/or data to the other devices through the connection. For example, the communication circuit 260 may be used to receive a signal, information, and/or data from the other device through the connection. However, it is not limited thereto.

For example, the processor 210 may execute operations for the graphic region illustrated through description of FIG. 1. For example, the graphic region may be provided in association with an event. For example, the graphic region may be provided in response to the event. For example, the event may be set while setting the graphic region. Setting the event, setting the graphic region, and providing (or displaying) the graphic region may be exemplified through FIG. 3.

Figure 3:
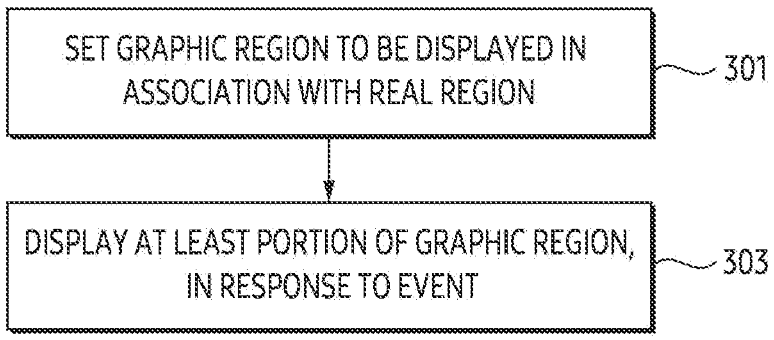
FIG. 3 is a flowchart illustrating an exemplary method for providing a graphic region.

FIG. 3 is a flowchart illustrating an exemplary method for providing a graphic region.

Referring to FIG. 3, in operation 301, a processor 210 may set a graphic region to be displayed in association with a real region. Setting the graphic region may be exemplified through FIG. 4.

Figure 4:
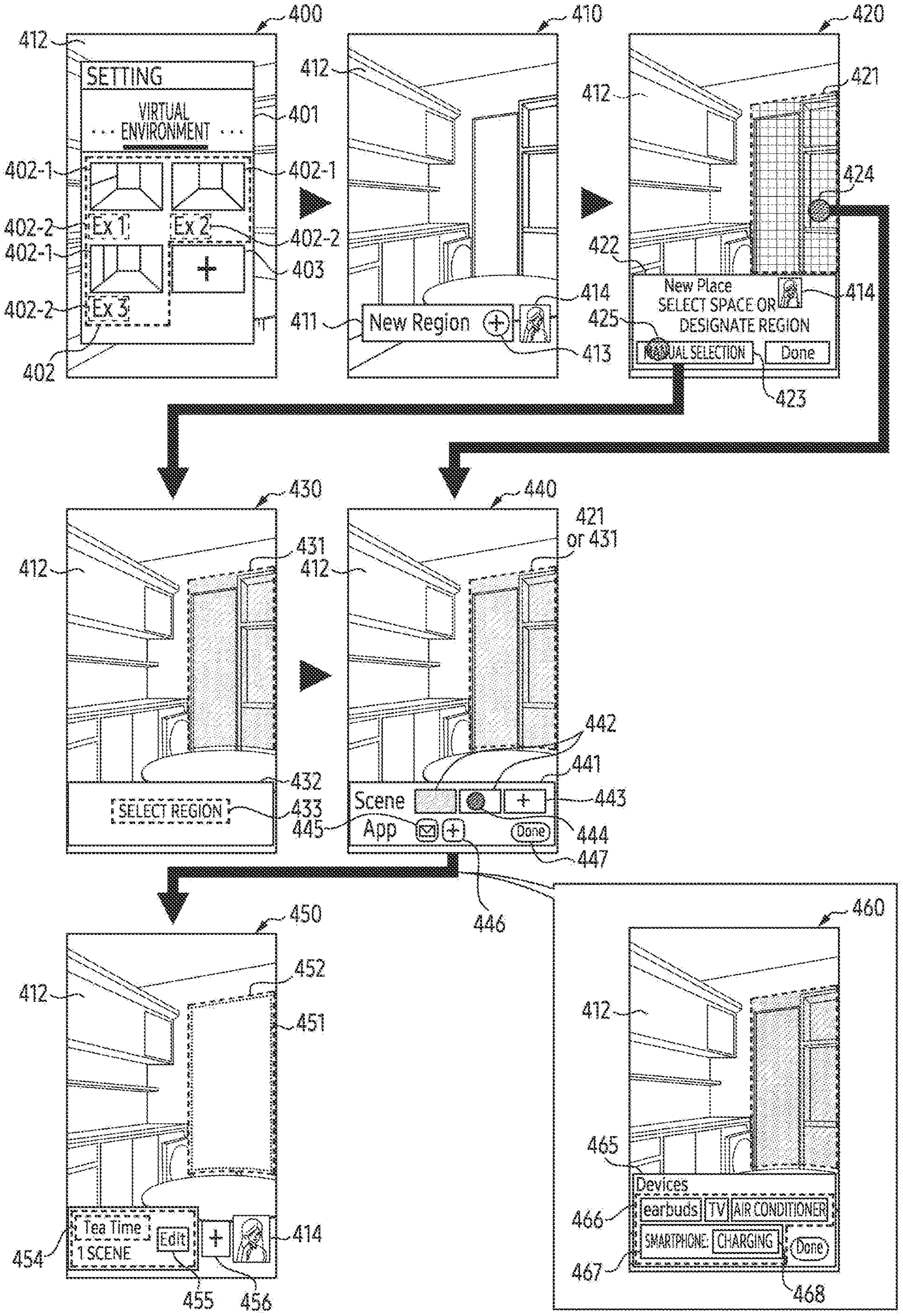
FIG. 4 illustrates an exemplary method of setting a graphic region associated with a real region.

FIG. 4 illustrates an exemplary method of setting a graphic region associated with a real region.

Referring to FIG. 4, a processor 210 may display a user interface 401 for setting a graphic region through a display 220, such as a state 400. For example, the user interface 401 may include a plurality of visual objects 402 each indicating a plurality of candidate graphic regions. For example, each of the plurality of candidate graphic regions each indicated by the plurality of visual objects 402 may include a thumbnail image 402-1 and/or text 402-2 of each of the plurality of candidate graphic regions. For example, the text 402-2 may indicate a theme of each of the plurality of candidate graphic regions. Although not illustrated in FIG. 4, in response to a user input indicating that a visual object of the plurality of visual objects 402 is selected, the processor 210 may display a graphic region indicated by the visual object selected by the user input on the display 220. For example, the graphic region indicated by the visual object may be displayed in association with a real region around the wearable device 102. However, it is not limited thereto.

For example, at least a portion of the plurality of candidate graphic regions may have a history of downloading from an external electronic device or being used (or displayed) within the wearable device 102. For example, at least another portion of the plurality of candidate graphic regions may have a history of being set through an executable object 403.

For example, the processor 210 may receive a user input for the executable object 403, displayed within the user interface 401 with the plurality of visual objects 402 in the state 400. For example, the executable object 403 may be used to set a new graphic region. For example, the executable object 403 may be used to register another graphic region that is at least partially different from the plurality of candidate graphic regions each indicated by the plurality of visual objects 402. For example, the processor 210 may change the state 400 to a state 410 in response to the user input.

In the state 410, the processor 210 may display a user interface 411, with an environment 412 around the wearable device 102 that includes a real region, through the display 220. For example, the environment 412 may be a real environment shown through the display 220, when the wearable device 102 is an AR glasses. For example, the environment 412 may be an image representing the real environment obtained through the first camera 230, when the wearable device 102 is a VST device.

For example, the user interface 411 may include an object 413 indicating to set the graphic region. For example, the user interface 411 may be displayed with a thumbnail image 414 provided for a user account used for a setting or a registration of the graphic region or a user related to the user account. For example, the thumbnail image 414 may be displayed with the user interface 411, in order to indicate that the graphic region is set through the user interface 411 based on the user account. However, it is not limited thereto.

For example, the processor 210 may change the state 410 to a state 420, in response to a user input for the object 413. For example, in the state 420, the processor 210 may display a layer 421 superimposed on a part (e.g., the real region) of the environment 412, through the display 220. For example, the layer 421 may be displayed based on executing spatial recognition (or spatial awareness) on an image obtained through the first camera 230. For example, the layer 421 may be superimposed on the part of the environment 412, in order to indicate a candidate region capable of being set the graphic region within the environment 412. For example, the layer 421 may be superimposed on the part of the environment 412, in order to indicate a position capable of being set the graphic region. FIG. 4 illustrates an example of displaying only the layer 421, but the processor 210 may display each of a plurality of layers including the layer 421 as partially superimposed on the environment 412, according to a result of the spatial recognition. However, it is not limited thereto. For example, the layer 421 may be superimposed on the entire region of an image obtained through the first camera 230.

For example, unlike illustration of FIG. 4, the layer 421 may be set to be translucent or opaque. For example, unlike the illustration of FIG. 4, the layer 421 may include one or more layers.

For example, unlike the illustration of FIG. 4, indication positioned along a periphery (or edge) of the candidate region may be displayed instead of the layer 421.

For example, the processor 210 may change the state 420 to a state 440, based on a user input 424 indicating to select the layer 421. For example, the user input 424 may include an input with respect to an input device (e.g., a controller) related to the wearable device 102, a gaze input identified through the second camera 240, a user gesture identified through the first camera 230, and/or a voice input identified through a microphone of the wearable device 102. However, it is not limited thereto. The state 440 will be illustrated below.

For example, in the state 420, the processor 210 may display a user interface 422 through the display 220, together with the layer 421 superimposed on the part of the environment 412. For example, the user interface 422 may include an object 423 for identifying a position in which the graphic region will be set based on a user input (or manually identifying). For example, the object 423 may be displayed in the user interface 422 to set a user-designated region as the position of the graphic region. For example, the processor 210 may change the state 420 to a state 430, in response to a user input 425 for the object 423. For example, the user input 425 may include an input for an input device (e.g., a controller) related to the wearable device 102, a gaze input identified through the second camera 240, a user gesture identified through the first camera 230, and/or a voice input identified through the microphone of the wearable device 102. However, it is not limited thereto.

In the state 430, the processor 210 may display the user interface 432 through the display 220. For example, the user interface 432 may include text 433 indicating that a position in which the graphic region is to be set may be defined or specified through a user input. For example, in the state 430, the processor 210 may receive a user input for drawing a region 431. For example, the processor 210 may identify the region 431, which is a closed region formed along a movement path of the user input, based on identifying a completion, a termination, or a release of the user input, and may change the state 430 to the state 440 based on the identification of the region 431.

In the state 440, the processor 210 may display a user interface 441 for selecting a color (or texture) of the graphic region through the display 220, based on the user input 424 received within the state 420 or the user input received within the state 430 (or release of the user input received within the state 430). For example, the user interface 441 may include objects 442 each indicating candidate colors of the graphic region. For example, the processor 210 may change the state 440 to a state 450, based at least in part on a user input 444 indicating to select an object of the objects 442. For example, the user input 444 may include an input for an input device related to the wearable device 102, a gaze input identified through the second camera 240, a user gesture identified through the first camera 230, and/or a voice input identified through the microphone of the wearable device 102. However, it is not limited thereto.

On the other hand, the user interface 441 may further include an object 443 for selecting another color (or different texture) distinct from the candidate colors. For example, the object 443 may be used to provide other candidate colors (or other candidate textures) distinct from the candidate colors indicated by the objects 442. For example, the object 443 may be used to display other objects each indicating the other candidate colors (or the other candidate textures) provided from another software application. Although not illustrated in FIG. 4, the processor 210 may request the other candidate colors (or the other candidate textures) to the other software application in response to a user input for the object 443, may display the other objects each representing the other candidate colors (or the other candidate textures) obtained from the other software applications together with the environment 412, and may change the state 440 to the state 450 in response to an input indicating to select an object of the other objects. However, it is not limited thereto.

For example, the user interface 441 may further include an object 445 and an object 446 for setting a software application that provides an execution screen to be displayed together with a graphic region 451 (to be exemplified below) set through at least a part of the object 442 and/or object 443 of the user interface 441. For example, the object 445 may be displayed to indicate at least one software application selected through the object 446. For example, an execution screen of the at least one software application indicated by the object 445 may be displayed together with the graphic region 451. However, it is not limited thereto.

For example, the user interface 441 may further include an object 447 indicating a completion of setting through the user interface 441. However, it is not limited thereto.

In the state 450, the processor 210 may display the graphic region 451 having a color (or texture) identified in the state 440 through the display 220, based at least in part on the user input 444 received in the state 440. For example, the graphic region 451 may be displayed by applying the color (or the texture) identified based on the user input 444 received in the state 440 to the region (i.e., layer 421) or the region 431. For example, the graphic region 451 may be set with respect to a real region 452. For example, the graphic region 451 may be displayed on the real region 452. For example, the graphic region 451 may replace the real region 452. However, it is not limited thereto.

For example, the graphic region 451 may be set with respect to the event, as well as the real region 452. For example, the event may include identifying a schedule. For example, the event may include identifying a change in a state of another device related to the wearable device 102. For example, the event may include identifying the wearable device 102 or a context of the wearable device 102 through an external object around the wearable device 102. For example, the event may include identifying a change in an environment around the wearable device 102. For example, the event may include identifying a condition set for the graphic region 451 based on a user input. However, it is not limited thereto.

For example, at least one intermediate state may be defined between the state 440 and the state 450, in order to set the event associated with the graphic region 451. For example, the processor 210 may change the state 440 to a state 460 based on the user input 444. For example, in the state 460, the processor 210 may display the user interface 465 through the display 220. For example, the user interface 465 may be used to set the event to identifying a change in a state of another device associated with the wearable device 102. For example, the user interface 465 may be provided from a software application used to manage at least one device (e.g., the electronic device 101) associated with the wearable device 102. For example, the user interface 465 may include a plurality of objects 466 indicating each of a plurality of devices that may be controlled through the wearable device 102. For example, based on at least one user input received in association with an object 467 among the plurality of objects 466 in the user interface 465, the processor 210 may set the event as identifying that a state of the electronic device 101 (e.g., a smartphone) indicated by the object 467 is changed to a charging state. For example, after the at least one user input is received, the object 467 may include text 468 indicating the event. For example, the processor 210 may change the state 460 to the state 450 based on a user input indicating a completion of setting the event.

For example, in the state 450, the processor 210 may display a user interface 453 through the display 220, together with the graphic region 451. For example, the user interface 453 may be displayed to indicate the event associated with the graphic region 451. For example, the user interface 453 may be displayed to indicate the event, which is a condition for displaying the graphic region 451. For example, the user interface 453 may be used to set the event. For example, the user interface 453 may be used to call or display another user interface (e.g., the user interface 465 in the state 460) for setting the event.

For example, the user interface 453 may indicate the event set with respect to the graphic region 451. For example, the user interface 453 may include text 454 indicating a schedule (e.g., a tea-time) associated with the graphic region 451. For example, the text 454 may indicate displaying the graphic region 451 through the display 220 when identifying the schedule. For example, the user interface 453 may further include an object 455 for editing the schedule. For example, the user interface 453 may further include an object 456 for adding an event associated with the graphic region 451. For example, the graphic region 451 may be displayed through the display 220, in response to the event indicated by the text 454 and/or an event set based on a user input for the object 456. However, it is not limited thereto.

Although FIG. 4 illustrates an example of setting an event associated with the graphic region, such as the graphic region 451, through the wearable device 102, the event may be set through another device (e.g., the electronic device 101). Setting the event through the other device may be exemplified through FIG. 5.

Figure 5:
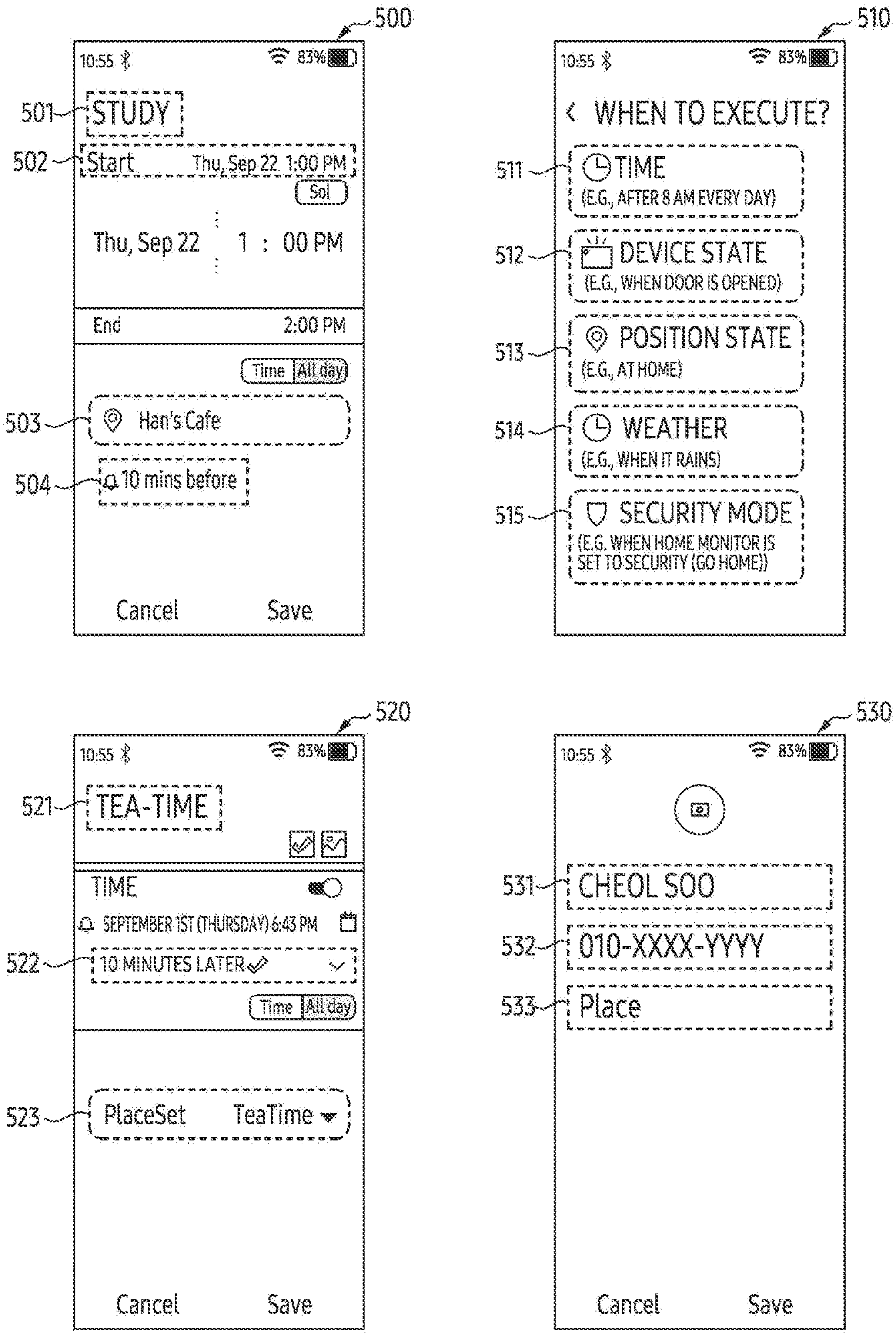
FIG. 5 illustrates an exemplary method of setting an event related to a graphic region through another device.

FIG. 5 illustrates an exemplary method of setting an event related to a graphic region through another device.

Referring to FIG. 5, a user interface 500 may be displayed through a display of an electronic device 101, based on a user account corresponding to a user account used to set the graphic region. For example, the user interface 500 may be displayed based on an execution of a software application in the electronic device 101 for managing a schedule. For example, the event may be set through the user interface 500. For example, based on the user input received through the user interface 500, the electronic device 101 may obtain information on a name 501 (e.g., study) of a schedule, a time 502 (e.g., September 22 1:00 pm) of the schedule, a place 503 (e.g., Han's Cafe) of the schedule (or a place in which the graphic region is displayed), and an alarm time 504 (e.g., before 10 minutes) of the schedule. For example, the electronic device 101 may transmit the information to the external electronic device 104 based on a user account. For example, the information may be linked or associated with information on the graphic region, within the external electronic device 104. For example, in response to identifying the alarm time 504 of the schedule, the external electronic device 104 may transmit a signal for informing the wearable device 102 to display the graphic region in association with the schedule to the wearable device 102. For example, in response to the signal, the processor 210 of the wearable device 102 may display the graphic region through the display 220 within the time 502 of the schedule with respect to the place 503 of the schedule. For example, the graphic region may be displayed through the display 220, together with the name 501 of the schedule. Displaying the graphic region will be exemplified below.

For another example, the user interface 510 may be displayed through the display of the electronic device 101, based on a user account corresponding to a user account used to set the graphic region. For example, the user interface 510 may be displayed based on an execution of a software application within the electronic device 101 for setting a condition, setting one or more functions corresponding to the condition, and executing the one or more functions in response to a satisfaction of the condition. For example, the electronic device 101 may identify at least one condition that should be satisfied to display the graphic region, based on a user input received through the user interface 510. For example, based on the user input, the electronic device 101 may obtain information indicating a condition 511 related to a time (e.g., after 8 a.m. every day), a condition 512 related to another device (e.g., when a door of another device (e.g., a refrigerator) distinct from the electronic device 101 and the wearable device 102 are opened), a condition 513 related to a position of a user (e.g., when the user is at home), a condition 514 related to a weather (e.g., when it rains), and a condition 515 related to a security (e.g. when a monitoring device for security identifies a user in the house). For example, the electronic device 101 may transmit the information to the external electronic device 104 based on a user account. For example, the information may be linked or associated with information on the graphic region within the external electronic device 104. For example, in response to a satisfaction of the condition 511 to the condition 515, the external electronic device 104 may transmit a signal for informing the wearable device 102 to display the graphic region to the wearable device 102. For example, the processor 210 of the wearable device 102 may display the graphic region through the display 220, in response to the signal. Displaying the graphic region will be exemplified below.

For still another example, the user interface 520 may be displayed through the display of the electronic device 101 based on a user account corresponding to a user account used to set the graphic region. For example, the user interface 520 may be displayed based on an execution of a software application within the electronic device 101 for providing or managing an alarm. For example, the electronic device 101 may obtain information indicating a name 521 (e.g., a tea-time) of an alarm related to the graphic region, a timing 522 (e.g., 10 minutes later) when the alarm is provided, and a position 523 (e.g., a position set for the tea-time) in which the graphic region is displayed with the alarm, based on the user input received through the user interface 520. For example, the electronic device 101 may transmit the information to the external electronic device 104 based on a user account. For example, the external electronic device 104 may transmit a signal for informing the wearable device 102 to display the graphic region in association with the alarm to the wearable device 102, in response to identifying the timing 522 of the alarm. For example, the processor 210 of the wearable device 102 may display the graphic region through a display 220, with respect to the position 523, in response to the signal. For example, the graphic region may be displayed through the display 220, together with the name 521 of the alarm. Displaying the graphic region will be exemplified below.

For still another example, a user interface 530 may be displayed through the display of the electronic device 101, based on a user account corresponding to a user account used to set the graphic region. For example, the user interface 530 may be displayed based on an execution of a software application in the electronic device 101 for managing a contact and/or managing a call. For example, based on a user input received through the user interface 530, the electronic device 101 may obtain information indicating a name 531 of a user (e.g., Cheol Soo), a phone number 532 related to the graphic region (e.g., 010-XXXX-YYYYY), and a place 533 where the graphic region will be provided. For example, in response to identifying an incoming call from the phone number 532 indicated by the information or an outgoing call from the phone number 532 indicated by the information, the electronic device 101 may transmit a signal indicating to display the graphic region through the display 220 within the place 533 to the wearable device 102. For example, the processor 210 of the wearable device 102 may display the graphic region through the display 220, with respect to the place 533, in response to the signal. Displaying the graphic region will be exemplified below.

As described above, the event related to the graphic region may be set through another device (e.g., the electronic device 101) related to the wearable device 102 as well as the wearable device 102.

For example, the wearable device 102 may be used to set at least another function to be provided with displaying the graphic region. For example, the at least one other function may be set through a user interface displayed via the display 220 of the wearable device 102, together with the graphic region. The user interface may be exemplified through FIG. 6.

Figure 6:
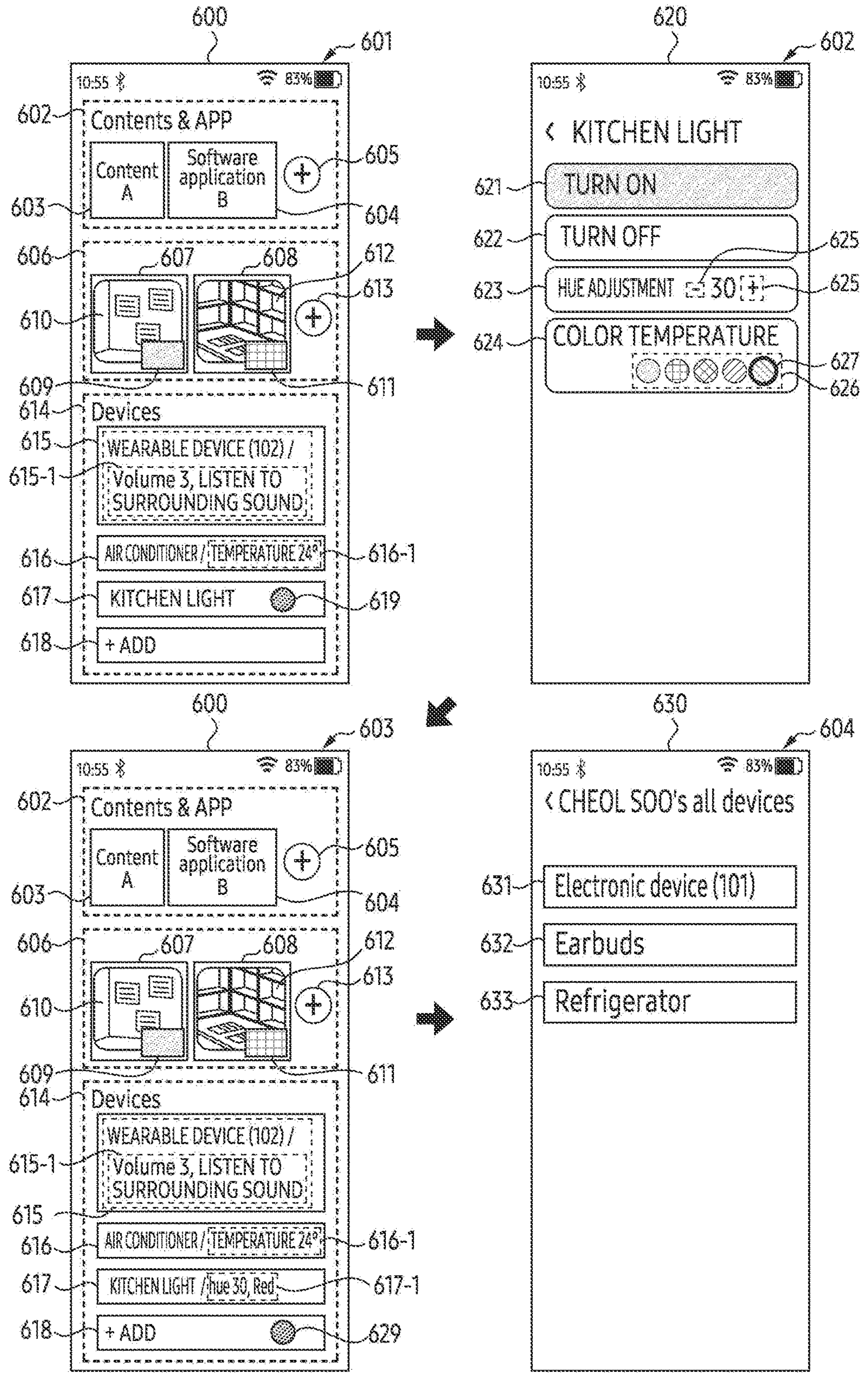
FIG. 6 illustrates an exemplary method of setting at least another function provided with displaying a graphic region.

FIG. 6 illustrates an exemplary method of setting at least another function provided with displaying a graphic region.

Referring to FIG. 6, the processor 210 may display a user interface 600 through a display 220, as in a state 601. For example, the user interface 600 may include regions for setting the at least one other function to be provided with displaying the graphic region.

For example, the user interface 600 may include a region 602 for setting a content to be displayed with the graphic region or an execution screen to be displayed together with the graphic region. For example, the region 602 may include an object 603 indicating to display a content (e.g., content A) in the graphic region or together with the graphic region and/or an object 604 indicating to display an execution screen of a software application (e.g., software application B) in the graphic region or together with the graphic region. For example, the region 602 may further include an object 605 to add the execution screen of the software application or the content to be displayed in the graphic region or together with the graphic region. For example, the processor 210 may identify the content or the execution screen to be displayed with the graphic region, based at least in part on a user input with respect to the object 605.

For example, the user interface 600 may include a region 606 for setting or adding the graphic region. For example, the region 606 may include an object 607 indicating a first graphic region, which is the graphic region, and/or an object 608 indicating a second graphic region. For example, the object 607 may include a visual element 609 indicating a color (or texture) of the first graphic region and/or a visual element 610 indicating a real region in which the first graphic region will be displayed. For example, the object 608 may include a visual element 611 indicating a color (or texture) of the second graphic region and/or a visual element 612 indicating a real region in which the second graphic region will be displayed. For example, the region 606 may include an object 613 for adding a new graphic region (e.g., a third graphic region). For example, the processor 210 may change the state 601 to the state 410 in response to a user input for the region 606. However, it is not limited thereto.

For example, the user interface 600 may include a region 614 for setting a state of another device to be provided together with displaying the graphic region. For example, the region 614 may include an object 615 indicating setting of the wearable device 102 provided while at least one graphic region set through the region 606 is displayed. For example, the object 615 may include text 615-1 indicating the setting. For example, the region 614 may include an object 616 indicating setting of a first external electronic device (e.g., air conditioner) provided while the at least one graphic region is displayed. For example, the object 616 may include text 616-1 indicating the setting of the first external electronic device. For example, the region 614 may include an object 617 indicating a second external electronic device (e.g., kitchen light) available in association with the at least one graphic region while the at least one graphic region is displayed. For example, since setting of the second external electronic device provided while the at least one graphic region is displayed is not defined, the object 617 may not include text, unlike the object 615 and the object 616. For example, the region 614 may include an object 618 for adding a third external electronic device (e.g., new external electronic device) available in association with the at least one graphic region while the at least one graphic region is displayed. For example, the processor 210 may change the state 601 to the state 602, in response to a user input 619 for the object 617.

For example, in the state 602, the processor 210 may display the user interface 620 for setting the second external electronic device (e.g., kitchen light) indicated by the object 617 through the display 220. For example, the user interface 620 may include objects for setting the second external electronic device to be provided while the at least one graphic region is displayed.

For example, the user interface 620 may include an object 621 for turning on the second external electronic device while the at least one graphic region is displayed. For example, the user interface 620 may include an object 622 for turning off the second external electronic device while the at least one graphic region is displayed. For example, when the object 621 is selected according to a user input among the object 621 and the object 622, the object 621 may be visually emphasized with respect to the object 622, as illustrated in FIG. 6. However, it is not limited thereto. For example, the user interface 620 may include an object 623 for setting brightness of light emitted from the second external electronic device while the at least one graphic region is displayed. For example, the object 623 may include executable elements 625 for identifying a level of the brightness. For example, the level may be identified based on a user input for the executable elements 625. For example, the user interface 620 may include an object 624 for setting a color temperature of the light emitted from the second external electronic device. For example, the object 624 may include visual elements 626 indicating candidate color temperatures that may be set to the color temperature. For example, the visual element 627 indicating a candidate color temperature identified according to a user input among the visual elements 626 may be visually emphasized with respect to remaining visual elements. Although not illustrated in FIG. 6, the object 623 and the object 624 may be deactivated when the object 622 among the object 621 and the object 622 is identified according to a user input. However, it is not limited thereto. For example, the processor 210 may change the state 602 to the state 603, in response to a user input indicating a completion of the setting of the second external electronic device through the user interface 620.

For example, in the state 603, the processor 210 may display the user interface 600 through the display 220. For example, since the user interface 600 in the state 603 is displayed through the state 602, the object 617 within the user interface 600 in the state 603 may include text 617-1, unlike the object 617 within the user interface 600 in the state 601. For example, the text 617-1 may indicate setting of the second external electronic device identified according to a user input received in the state 602. For example, the processor 210 may change the state 603 to the state 604, in response to a user input 629 for the object 618.

For example, in the state 604, the processor 210 may display a user interface 630 through the display 220. For example, the user interface 630 may include an object 631, an object 632, and/or an object 633 each representing one or more external electronic devices available while the at least one graphic region is displayed.

For example, the one or more external electronic devices may be identified based on a position of the at least one graphic region. For example, the one or more external electronic devices may be positioned within a region in which the at least one graphic region is displayed. However, it is not limited thereto.

For example, the one or more external electronic devices may be identified based on a type (or attribute) of a service provided through the at least one graphic region. However, it is not limited thereto.

For example, the one or more external electronic devices may be identified based on a user account corresponding to a user account used to set the at least one graphic region. However, it is not limited thereto.

Although not illustrated in FIG. 6, the processor 210 may receive a user input indicating to select one of the object 631, the object 632, and the object 633 within the user interface 630. For example, the processor 210 may identify setting of the external electronic device indicated by the object selected by the user input. For example, as indicated by the state 601 and/or the state 603, the processor 210 may display an object indicating the setting of the external electronic device within the user interface 600.

As described above, since the wearable device 102 may provide setting a function provided while displaying the graphic region as well as setting the graphic region and setting an event for displaying the graphic region, the wearable device 102 may enhance a quality of a service provided in a real environment.

Referring back to FIG. 3, in operation 303, the processor 210 may display at least a portion of the graphic region (e.g., the graphic region set through FIG. 4 and/or FIG. 6) through the display 220, in response to an event (e.g., the event exemplified through FIG. 4 and/or FIG. 5). For example, the at least a portion of the graphic region may be displayed to change a part of real region by using a virtual object or a graphic object. However, it is not limited thereto.

For example, the at least a portion of the graphic region may be displayed in response to the event identifying a schedule. Displaying the at least a portion of the graphic region in response to identifying the schedule may be exemplified through FIG. 7.

Figure 7:
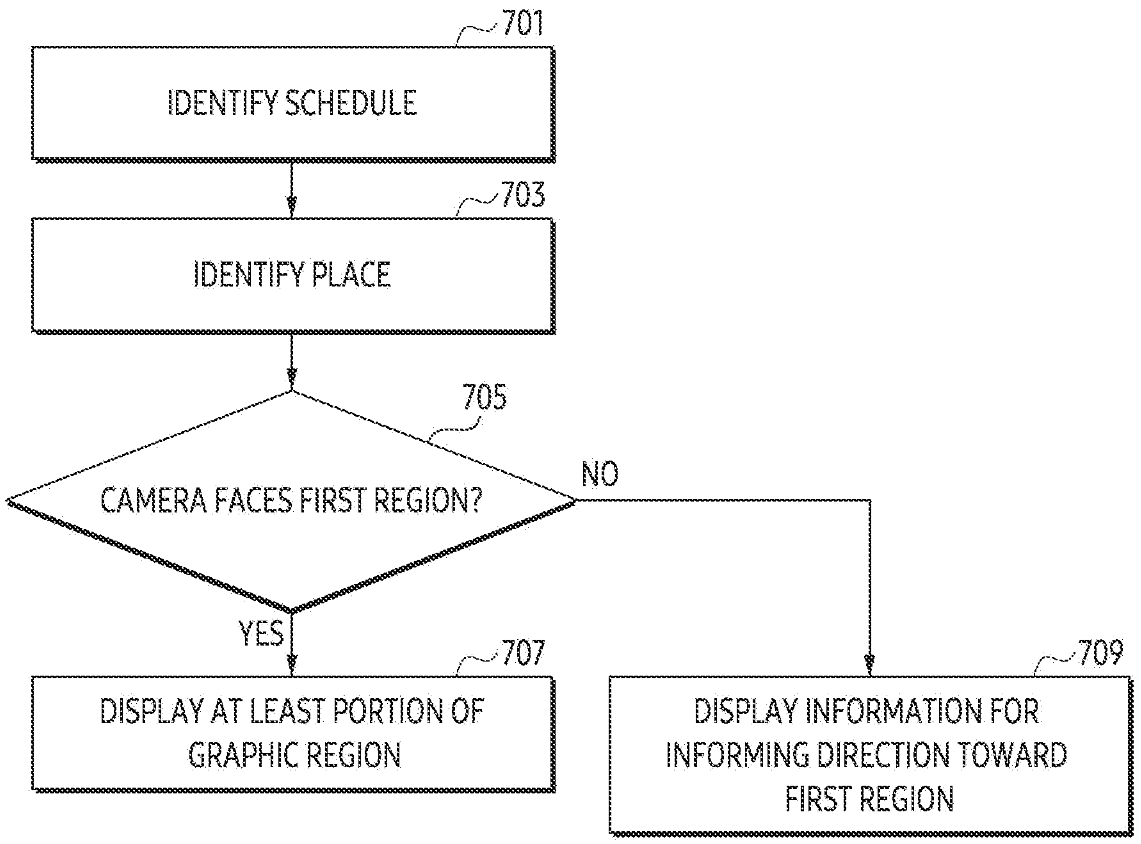
FIG. 7 is a flowchart illustrating an exemplary method of displaying at least a portion of a graphic region, in response to identifying a schedule.

FIG. 7 is a flowchart illustrating an exemplary method of displaying at least a portion of a graphic region, in response to identifying a schedule.

Referring to FIG. 7, in operation 701, the processor 210 may identify a registered schedule through a user account. For example, the schedule may be identified through a software application used to register the schedule based on the user account. For example, the schedule may be identified through the software application in an active state. The software application in the active state may indicate that the software application is executed in a foreground state. The software application in the active state may indicate that the software application is executed within a background state. For example, the processor 210 may change a state of the software application from an inactive state to the active state according to assistance of a server (e.g., the external electronic device 104), and identify the schedule through the software application changed to the active state. Changing the inactive state to the active state may be exemplified through FIG. 8.

Figure 8:
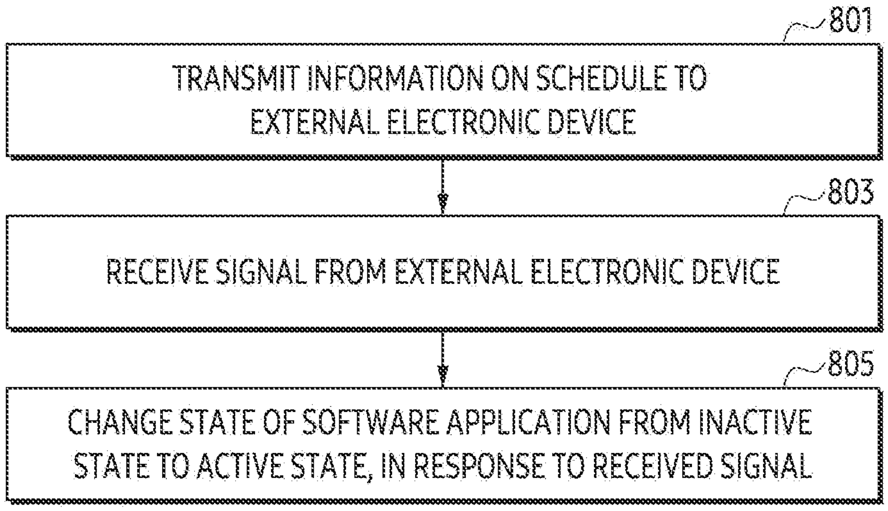
FIG. 8 is a flowchart illustrating an exemplary method of changing an inactive state of a software application to an active state to identify a schedule.

FIG. 8 is a flowchart illustrating an exemplary method of changing an inactive state of a software application to an active state to identify a schedule.

Referring to FIG. 8, in operation 801, the processor 210 may transmit information on the schedule to the external electronic device 104 through a communication circuit 260 based on registering the schedule. For example, transmitting the information may be executed through the software application used to register the schedule. For example, the processor 210 may access an external electronic device 104 by using a user account used to register the schedule, and transmit the information by using the software application based on the access. For example, the external electronic device 104 may receive the information from the wearable device 102. For example, the external electronic device 104 may store the information, in association with the user account.

In operation 803, the processor 210 may receive a signal from the external electronic device 104 through the communication circuit 260. For example, the signal may be transmitted from the external electronic device 104, in response to identifying the schedule in the external electronic device 104. For example, even when the software application within the wearable device 102 is in an inactive state, the external electronic device 104 may identify the schedule and transmit the signal in response to identifying the schedule so that the wearable device 102 may identify the schedule.

In operation 805, the processor 210 may change the state of the software application from the inactive state to the active state in response to the received signal. For example, the processor 210 may identify the schedule based on the software application changed to the active state.

FIG. 8 illustrates identifying the schedule through the assistance of the external electronic device 104, but identifying the schedule may be executed through the wearable device 102 in a standalone state from the external electronic device 104. For example, the processor 210 may provide information on the schedule to an operating system of the wearable device 102, based on identifying that the software application is changed to the inactive state after registering the schedule. For example, the operating system may be executed to identify the schedule while the software application is in the inactive state, based on the information. For example, the processor 210 may change a state of the software application from the inactive state to the active state, in response to identifying the schedule by using the operating system. For example, the processor 210 may identify the schedule through the software application changed to the active state. On the other hand, the information on the schedule may be provided to one or more other software applications in the wearable device 102, as well as the operating system. For example, the processor 210 may provide data indicating a position in which the information on the schedule is stored to the one or more other software applications through the operating system. For example, the processor 210 may identify the schedule through one or more other software applications as well as the software application by providing the data.

Referring back to FIG. 3, the schedule may be identified through one or more other software applications distinct from the software application. For example, the identification through the one or more software applications may be executed through the user account. For example, the schedule may be identified through the one or more other software applications in the active state. For example, the processor 210 may change a state of the one or more other software applications from the inactive state to the active state according to assistance of the external electronic device 104, and identify the schedule through the one or more other software applications changed to the active state. Changing the inactive state of the one or more other software applications to the active state may be exemplified through FIG. 9.

Figure 9:
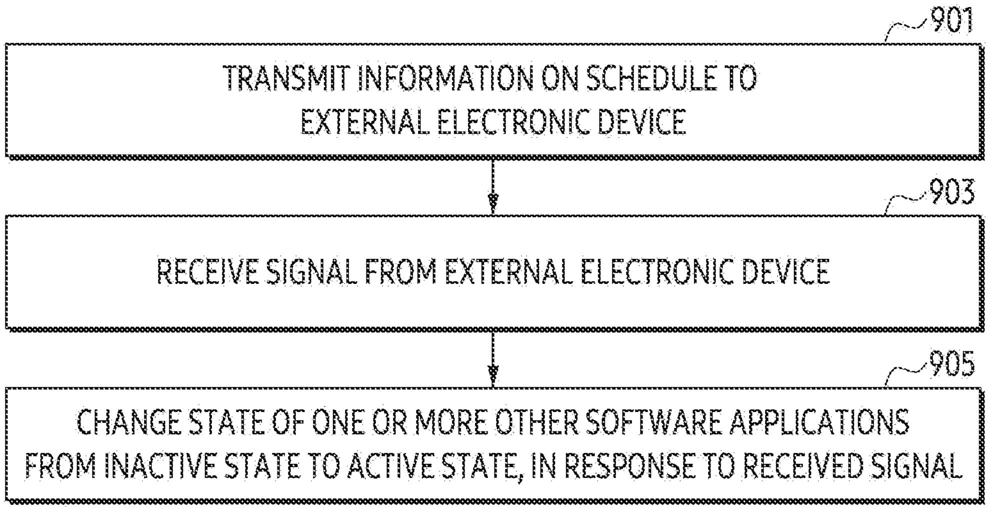
FIG. 9 is a flowchart illustrating an exemplary method of changing an inactive state of one or more other software applications to an active state to identify a schedule.

FIG. 9 is a flowchart illustrating an exemplary method of changing an inactive state of one or more other software applications to an active state to identify a schedule.

Referring to FIG. 9, in operation 901, the processor 210 may transmit information on the schedule to the external electronic device 104 through the communication circuit 260, based on registering the schedule. For example, transmitting the information may be executed through the software application used to register the schedule. For example, the processor 210 may access the external electronic device 104 by using a user account used to register the schedule, and transmit the information by using the software application based on the access. For example, the external electronic device 104 may receive the information from the wearable device 102. For example, the external electronic device 104 may store the information in association with the user account.

In operation 903, the processor 210 may receive a signal from the external electronic device 104 through the communication circuit 260. For example, the signal may be transmitted from the external electronic device 104, in response to identifying the schedule in the external electronic device 104. For example, even when the software application in the wearable device 102 is in an inactive state, the external electronic device 104 may identify the schedule and transmit the signal in response to identifying the schedule so that the wearable device 102 may identify the schedule. For example, the signal may be transmitted to change a state of one or more other software applications distinct from the software application, unlike a signal transmitted in operation 803 of FIG. 8.

In operation 905, the processor 210 may change a state of the one or more other software applications from the inactive state to the active state, in response to the received signal. For example, the one or more other software applications may include a software application for an execution screen (or content) to be provided with displaying the graphic region. For example, the one or more other software applications may include a software application sharing the schedule with the software applications. For example, the one or more other software applications may include a software application used to display the graphic region. However, it is not limited thereto. For example, the processor 210 may identify the schedule, based on the one or more other software applications changed to the active state.

Although FIGS. 8 and 9 illustrate an example of identifying the schedule according to a trigger of the external electronic device 104, identifying the schedule may be executed according to a trigger of the wearable device 102. Identifying the schedule according to the trigger of the wearable device 102 may be exemplified through FIG. 10.

Figure 10:
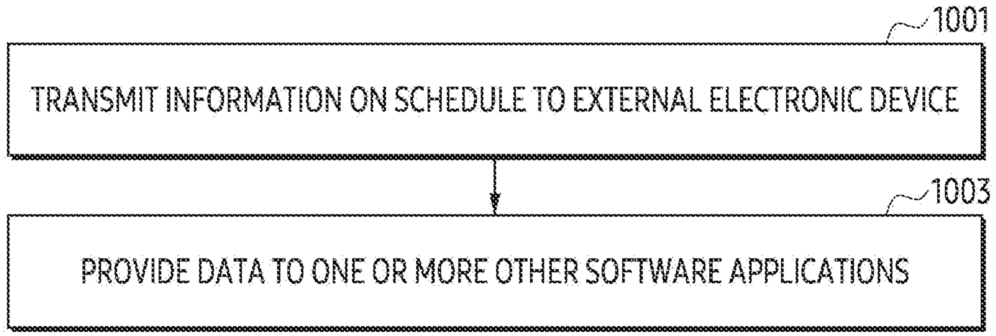
FIG. 10 is a flowchart illustrating an exemplary method of identifying a schedule through a software application from among the software application and one or more other software applications, based on data provided from an external electronic device.

FIG. 10 is a flowchart illustrating an exemplary method of identifying a schedule through a software application from among the software application and one or more other software applications, based on data provided from an external electronic device.

Referring to FIG. 10, in operation 1001, the processor 210 may transmit information on the schedule to the external electronic device 104 through the communication circuit 260, based on registering the schedule. For example, transmitting the information may be executed through the software application used to register the schedule. For example, the processor 210 may access the external electronic device 104 by using a user account used to register the schedule, and transmit the information by using the software application based on the access. For example, the external electronic device 104 may receive the information from the wearable device 102. The external electronic device 104 may obtain data indicating a position in which the information is stored, in response to the information. For example, the external electronic device 104 may transmit the data to the wearable device 102. For example, the wearable device 102 may receive the data from the external electronic device 104 through the communication circuit 260.

In operation 1003, the processor 210 may provide the data to the one or more other software applications distinct from the software application. For example, the data may be provided to maintain a state of at least a portion of the one or more other software applications in the active state. For example, a software application from among the one or more other software applications and the software application (e.g., a software applications used to register the schedule) may be maintained in the active state based on the data. For example, the software application maintained in the active state may periodically access the information in the external electronic device 104 through the communication circuit 260 to identify the schedule. However, it is not limited thereto.

As described above, the wearable device 102 may reduce a load of the external electronic device 104 by identifying the schedule based on accessing the external electronic device 104 through the data received from the external electronic device 104.

Referring back to FIG. 7, in operation 703, the processor 210 may identify a place (e.g., a region of interest (ROI) and/or a point of interest (POI)) labeled with respect to the schedule. For example, the processor 210 may identify the place to identify whether a graphic region for the schedule is present.

In operation 705, the processor 210 may identify whether a camera (e.g., the first camera 230) of the wearable device 102 positioned in the place faces a region (e.g., real region) in the place where a graphic region for the schedule is set, based at least in part on identifying the place. For example, since the graphic region should be displayed with respect to the schedule, the processor 210 may identify whether the camera faces the region to provide a service related to the schedule. For example, the processor 210 may execute operation 707 based on identifying that a direction of the camera corresponds to a first direction in which the camera faces the region, and execute operation 709 based on identifying that the direction corresponds to a second direction different from the first direction. For example, operation 705 may be executed based on an image obtained through the camera. For example, operation 705 may be executed through a sensor 250 of the wearable device 102. However, it is not limited thereto.

In operation 707, the processor 210 may display at least a portion of the graphic region on at least a portion of the region through display 220, in response to the camera facing the region. Displaying the at least a portion of the graphic region may be exemplified through FIG. 11.

Figure 11:
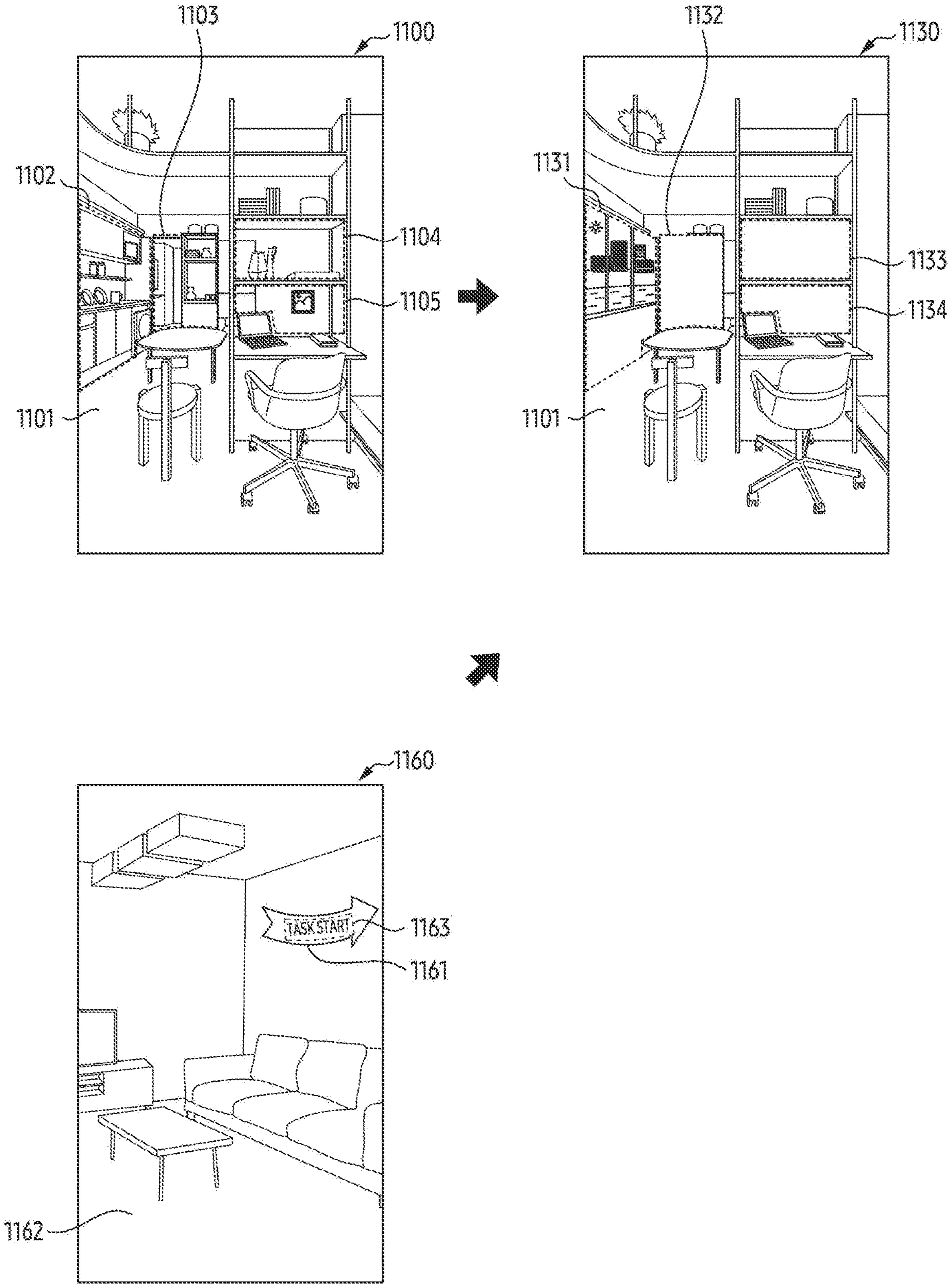
FIG. 11 illustrates an exemplary method of displaying at least a portion of a graphic region.

FIG. 11 illustrates an exemplary method of displaying at least a portion of a graphic region.

Referring to FIG. 11, the processor 210 may provide an environment 1101 around the wearable device 102 through the display 220, as in a state 1100. For example, when the wearable device 102 is AR glasses, the environment 1101 may be a real environment within the place shown through the display 220. For example, when the wearable device 102 is a VST device, the environment 1101 may be an image with respect to the place, obtained through the first camera 230.

For example, the environment 1101 may include a region in which a graphic region for the schedule is set. For example, the environment 1101 may include a region 1102 in which a first graphic region is set, a region 1103 in which a second graphic region is set, a region 1104 in which a third graphic region is set, and a region 1105 in which a fourth graphic region is set. For example, the region 1102, the region 1103, the region 1104, and the region 1105 may be identified through operations exemplified through the state 420 and/or the state 430 of FIG. 4. However, it is not limited thereto.

For example, as in a state 1130, on a condition that the direction corresponds to the first direction facing the region 1102, the region 1103, the region 1104, and the region 1105, the processor 210 may display at least a portion of the first graphic region 1131 on the region 1102, display at least a portion of the second graphic region 1132 on the region 1103, display at least a portion of the third graphic region 1133 on the region 1104, and display at least a portion of the fourth graphic region 1134 on the region 1105. For example, the first graphic region 1131 may be displayed to cover the region 1102, in order to reduce a focus on the schedule from being dispersed due to external objects positioned within the region 1102. For example, the first graphic region 1131 may include a content related to the schedule. For example, the first graphic region 1131 may be used as a virtual display. However, it is not limited thereto. For example, each of the second graphic region 1132, the third graphic region 1133, and the fourth graphic region 1134 may be displayed to cover the region 1103, the region 1104, and the region 1105, in order to reduce a focus on the schedule from being dispersed due to external objects positioned within each of the region 1103, the region 1104, and the region 1105. For example, since the environment 1101 in the state 1130 includes at least a portion of the first graphic region 1131 to the fourth graphic region 1134, the environment 1101 in the state 1130 may provide an enhanced environment more than the environment 1101 in the state 1100. For example, the environment 1101 in the state 1130 may be more suitable for the schedule than the environment 1101 in the state 1100.

Referring back to FIG. 7, in operation 709, the processor 210 may display information for indicating the first direction through the display 220, in response to the camera not facing the region. For example, since a state of the wearable device 102 suitable for the schedule may be a state facing the region, the processor 210 may guide changing a direction (or orientation) of the wearable device 102 by displaying the information. Displaying the information may be exemplified through FIG. 11.

Referring to FIG. 11, as in a state 1160, on a condition that the direction faces a second direction different from the first direction, the processor 210 may display information 1161 (e.g., visual cue) to inform the first direction through the display 220. For example, the information 1161 may be provided through the display 220 together with an environment 1162 shown when facing the second direction. For example, when the wearable device 102 is AR glasses, the environment 1162 may be a real environment in the place shown through the display 220. For example, when the wearable device 102 is a VST device, the environment 1162 may be an image with respect to the place, obtained through the first camera 230.

For example, the information 1161 may indicate the first direction through an arrow. For example, a direction in which the arrow faces may be identified through a spatial map obtained in the wearable device 102. However, it is not limited thereto. For example, the information 1161 may include text 1163 indicating that the first direction indicated by the arrow is associated with the schedule (e.g., task). For example, the information 1161 may be visually emphasized with respect to the environment 1162. For example, the information 1161 may have a color distinct from a color of the environment 1162. For example, the information 1161 may blink, unlike the environment 1162. However, it is not limited thereto.

Although not illustrated in FIG. 7, the processor 210 may identify whether the direction is changed to the first direction, through the first camera 230 and/or the sensor 250 while the state 1160 is provided. For example, the processor 210 may change the state 1160 to the state 1130 in response to identifying that the direction is changed to the first direction.

Although FIG. 7 illustrates that the wearable device 102 is positioned in the place labeled with respect to the schedule, the wearable device 102 may be positioned outside the place. When the wearable device 102 is positioned outside the place, the processor 210 may display information for informing a movement to the place including the region 1102, the region 1103, the region 1104, and the region 1105 on the display 220, for the schedule. Displaying the information may be exemplified through FIG. 12.

Figure 12:
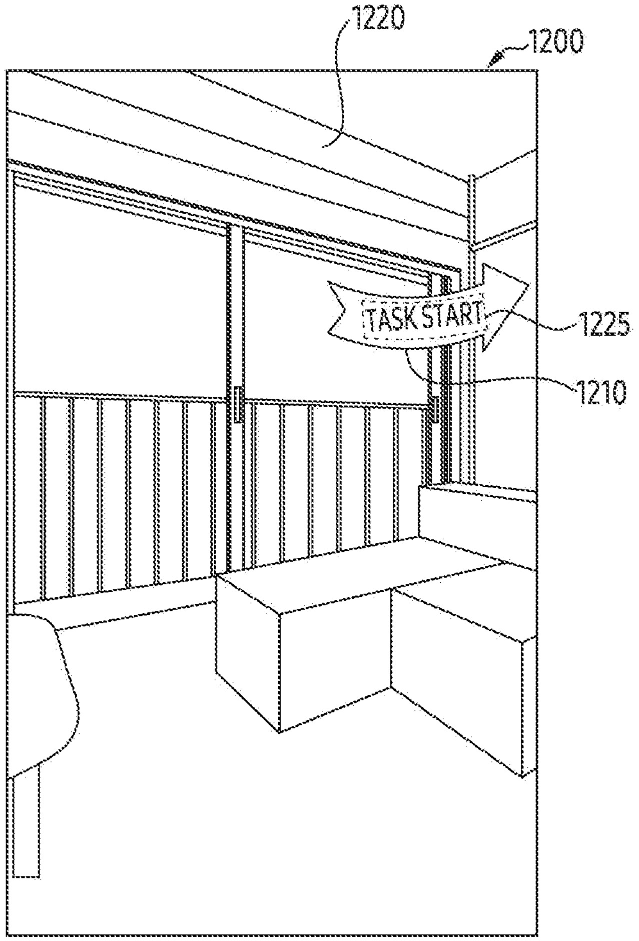
FIG. 12 illustrates an exemplary method of displaying information for informing a movement to a place labeled with respect to a schedule.

FIG. 12 illustrates an exemplary method of displaying information for informing a movement to a place labeled with respect to a schedule.

Referring to FIG. 12, as in a state 1200, the processor 210 may display information 1210 for informing a movement to the place, in response to identifying that the wearable device 102 is positioned outside the place labeled with respect to the schedule. For example, the information 1210 may be provided through the display 220 together with an environment 1220 around the wearable device 102 positioned outside the place. For example, when the wearable device 102 is AR glasses, the environment 1120 may be a real environment outside the place shown through the display 220. For example, when the wearable device 102 is a VST device, the environment 1120 may be an image with respect to the place, obtained through the first camera 230. For example, a position of the wearable device 102 may be identified through the first camera 230 or the communication circuit 260 (e.g., a communication circuit for Bluetooth low energy (BLE), a communication circuit for ultra-wideband (UWB), and/or a communication circuit for wireless fidelity (Wi-Fi)). For example, the position of the wearable device 102 may be identified based on information received from the external electronic device to the wearable device 102 through the communication circuit 260. However, it is not limited thereto.

For example, the information 1210 may indicate a direction to the place through an arrow. For example, a direction in which the arrow faces may be identified through a spatial map obtained in the wearable device 102. However, it is not limited thereto. For example, the information 1210 may include text 1225 indicating that the direction indicated by the arrow is associated with the schedule. For example, the information 1210 may have a color distinct from a color of the environment 1220. For example, the information 1210 may blink, unlike the environment 1220. However, it is not limited thereto.

On the other hand, the processor 210 may provide another state before providing the state 1130 in response to identifying that the direction corresponds to the first direction. The other state may be exemplified through FIG. 13.

Figure 13:
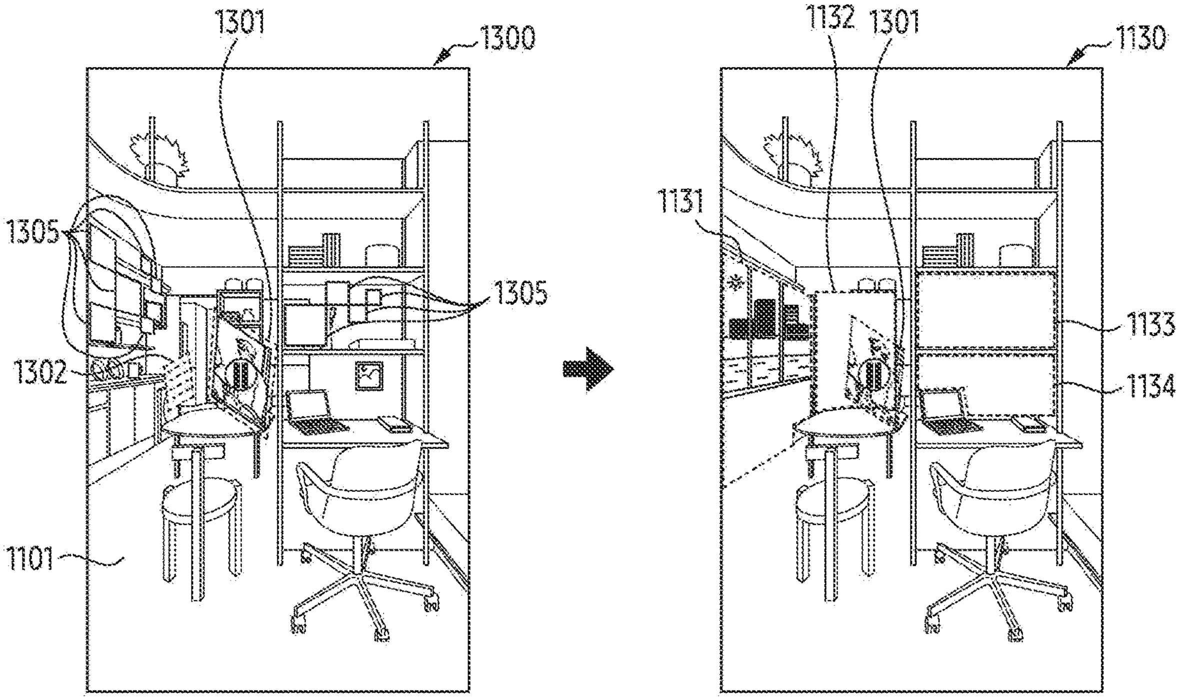
FIG. 13 illustrates an exemplary method of extending at least a portion of a graphic region from a portion of a region to another portion of a region.

FIG. 13 illustrates an exemplary method of extending at least a portion of a graphic region from a portion of a region to another portion of a region.

Referring to FIG. 13, the processor 210 may identify that the direction corresponds to the first direction based on the schedule, while an execution screen 1301 of a first software application that is not set with respect to the schedule and an execution screen 1302 of a second software application that is not set with respect to the schedule are displayed, together with the environment 1101. For example, the processor 210 may provide a state 1300 in response to the identification. For example, the state 1300 may be provided before the state 1130 is provided. For example, in the state 1300, the processor 210 may display the execution screen 1301 and the execution screen 1302 on the environment 1101. For example, the processor 210 may identify a gaze of a user through the second camera 240 in response to the identification. For example, the processor 210 may identify that the gaze is positioned in the execution screen 1301 among the execution screen 1301 and the execution screen 1302, through the second camera 240. For example, the processor 210 may cease displaying the execution screen 1302 for the schedule, based on the identification and the direction corresponding to the first direction. For example, based on the gaze maintained with respect to the execution screen 1301, the processor 210 may maintain a display of the execution screen 1301, unlike the execution screen 1302. For example, since the execution screen 1301 is a screen in which a user input (e.g., gaze) is being received, the processor 210 may maintain a display of the execution screen 1301 independently of the schedule. On the other hand, a content represented through the execution screen 1301 may be ceased independently of maintaining a display of the execution screen 1301. For example, representing the content may be ceased for providing an environment for the schedule.

In the state 1300, the processor 210 may display a visual effect 1305 that causes the first graphic region 1131 to the fourth graphic region 1134 set with respect to the region 1102 to the region 1105 to appear gradually. For example, since suddenly displaying the first graphic region 1131 to the fourth graphic region 1134 may provide a sense of difference to the user, the processor 210 may display the visual effect 1305. For example, the processor 210 may display the visual effect 1305 by extending at least a portion of the graphic region (e.g., the first graphic region 1131 to the fourth graphic region 1134) from a portion (e.g., at least a portion of the region 1102 to the region 1105) of the region in the place spaced apart from the wearable device 102 to another portion of the region. The processor 210 may change the state 1300 to the state 1130 after displaying the visual effect 1305.

The processor 210 may identify whether a gaze positioned on the execution screen 1301 is maintained while changing the state 1300 to the state 1130. For example, the processor 210 may maintain a display of the execution screen 1301 independently of the schedule, based on identifying that the gaze is maintained on the execution screen 1301. For example, the processor 210 may cease the display of the execution screen 1301 for the schedule, based on identifying that the gaze is not maintained on the execution screen 1301.

Although the state 1300 of FIG. 13 illustrates that the environment 1101 is changed to a space for the schedule through the visual effect 1305, it may be explicitly indicated that the environment 1101 is changed to a space for the schedule. For example, the processor 210 may provide the state 1300, by displaying a message including executable objects for stopping to display the graphic region and/or ceasing to display the graphic region. Displaying the message may be exemplified through FIG. 14.

Figure 14:
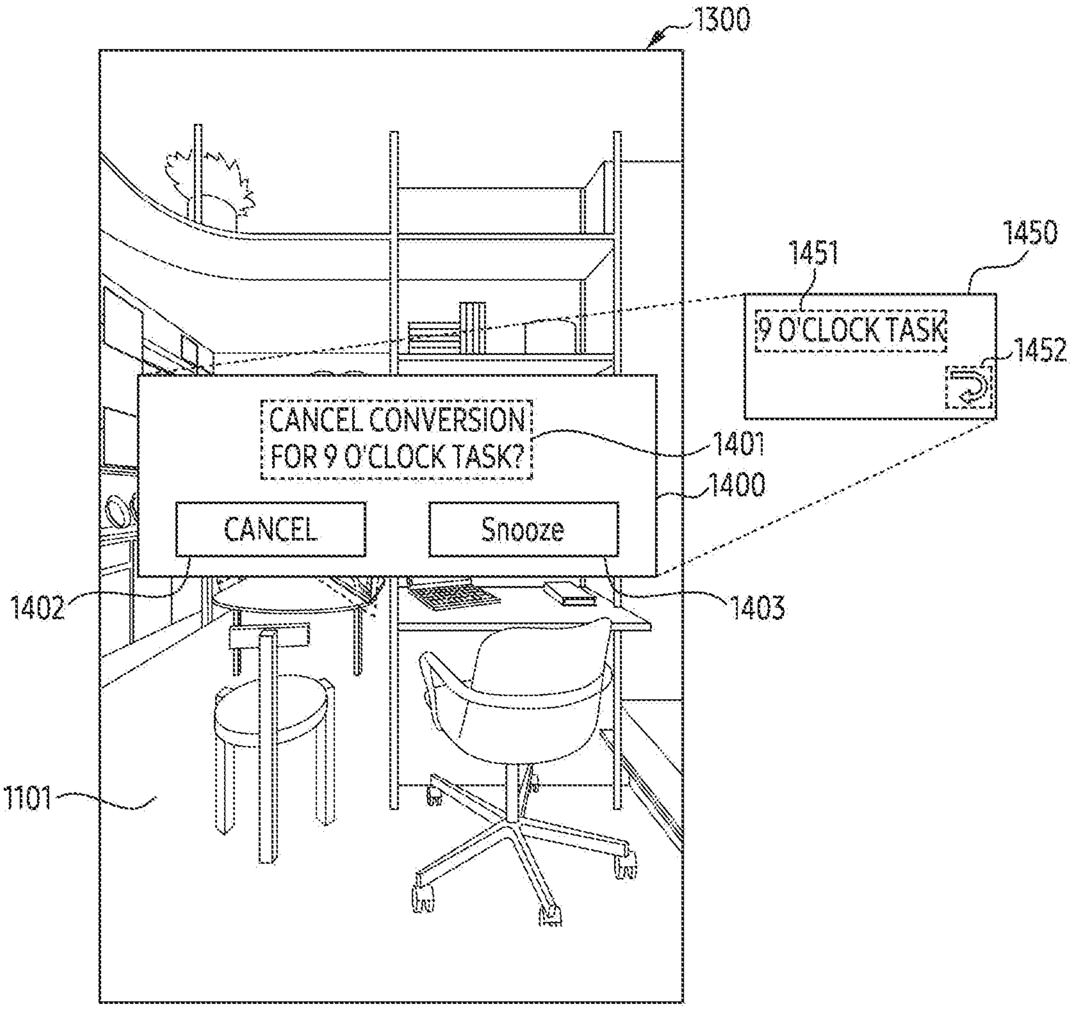
FIG. 14 illustrates an exemplary method of displaying a message to cease or stop a display of a graphic region.

FIG. 14 illustrates an exemplary method of displaying a message to cease or stop a display of a graphic region.

Referring to FIG. 14, in the state 1300, the processor 210 may further display a message 1400 through the display 220. For example, the message 1400 may include text 1401 asking whether to cease displaying at least portion (e.g., at least a portion of the first graphic region 1131 to the fourth graphic region 1134) of the graphic region for the schedule.

For example, the message 1400 may include an executable object 1402 for ceasing to display the at least portion of the graphic region. For example, the message 1400 may include an executable object 1403 for stopping to display the at least portion of the graphic region. Although not illustrated in FIG. 14, the processor 210 may change the state 1300 to the state 1100 of FIG. 11, by ceasing to display the at least portion of the graphic region in response to a user input with respect to the executable object 1402. Although not illustrated in FIG. 14, the processor 210 may stop displaying the at least portion of the graphic region in response to a user input with respect to the executable object 1403. For example, the processor 210 may display a portion (e.g., a portion of the region 1102 to the region 1105) of the region and a portion (e.g., a portion of the first graphic region 1131 to the fourth graphic region 1134) of the graphic region through the display 220, by stopping to display the at least a portion of the graphic region.

For example, the message 1400 may be simplified. For example, the message 1400 may be replaced with a message 1450. For example, the message 1450 may include text 1451 indicating the schedule. For example, the message 1450 may include an executable object 1452 for ceasing to display the at least a portion of the graphic region. Although not illustrated in FIG. 14, the processor 210 may change the state 1300 to the state 1100 of FIG. 11, by ceasing to display at least a portion of the graphic region in response to a user input with respect to the executable object 1452.

Although FIGS. 7 to 14 illustrate an example in which a size of a place associated with the graphic region is maintained through a display of the graphic region, the size of the place may also be reduced through the display of the graphic region. For example, a part of the place may be separated from another part of the place according to the display of the graphic region. A part of the place separated from the other portion of the place may be exemplified through FIG. 15.

Figure 15:
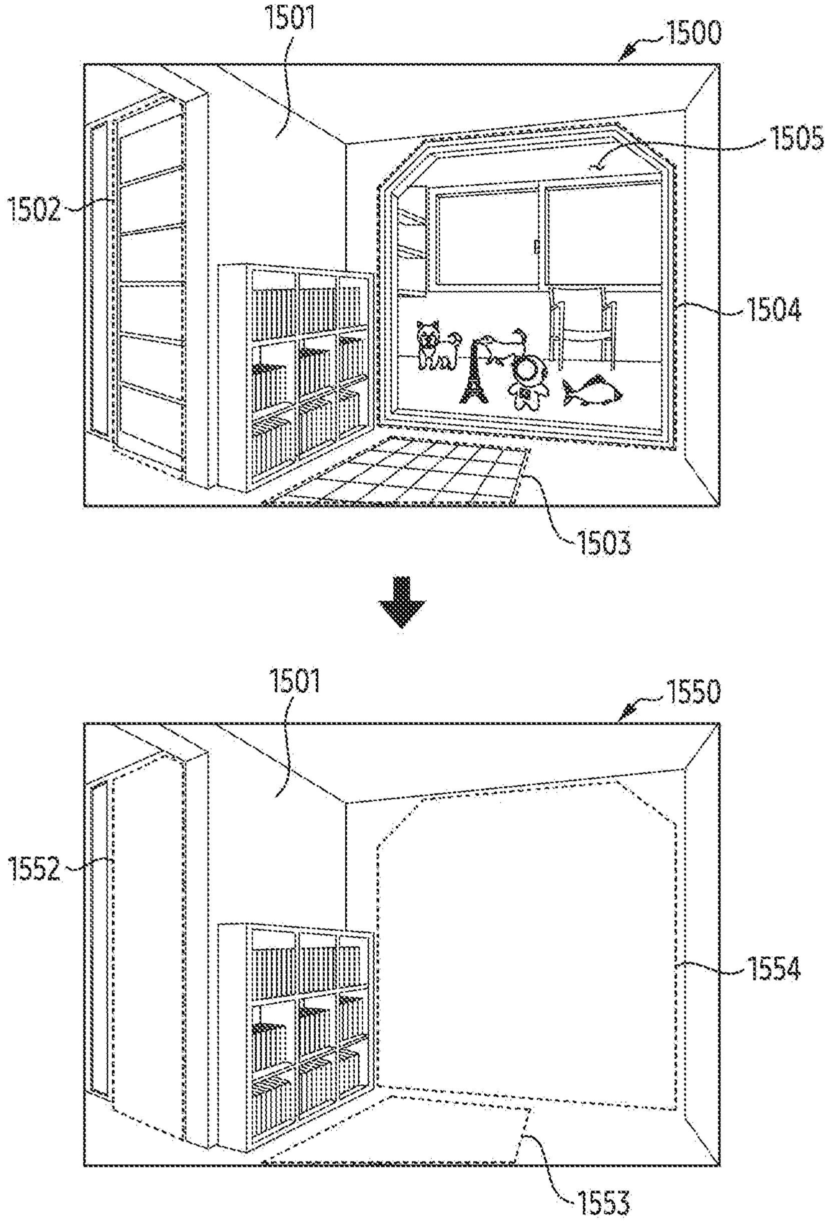
FIG. 15 illustrates an exemplary method of separating a portion of a place from another portion of the place by displaying a graphic region.

FIG. 15 illustrates an exemplary method of separating a portion of a place from another portion of the place by displaying a graphic region.

Referring to FIG. 15, as in a state 1500, an environment 1501 may include a region 1502, a region 1503, and a space 1505 that are not suitable for the schedule (e.g., reading). For example, the space 1505 may not be a surface, unlike the region 1502 and the region 1503. For example, the graphic region may be set with respect to the region 1504 to separate the space 1505. For example, the processor 210 may provide the environment 1501 as a state 1550, based at least in part on the schedule. For example, the environment 1501 in the state 1550 may include a graphic region 1552 displayed on the region 1502, a graphic region 1553 displayed on the region 1503, and a graphic region 1554 displayed on the region 1504. For example, the graphic region 1554 may be displayed to separate the space 1505 from the environment 1501. For example, a size of the environment 1501 in the state 1550 may be smaller than a size of environment 1501 in the state 1500 due to the graphic region 1554. For example, the wearable device 102 may suitably provide the environment 1501 for the schedule, by separating the space 1505 from the environment 1501 through a display of the graphic region 1554.

Unlike the above examples, a plurality of graphic regions may be set with respect to a real region. For example, a first graphic region among the plurality of graphic regions may be set for a first schedule, and a second graphic region among the plurality of graphic regions may be set for a second schedule. Displaying different graphic regions with respect to a real region according to different schedules may be exemplified through FIG. 16.

Figure 16:
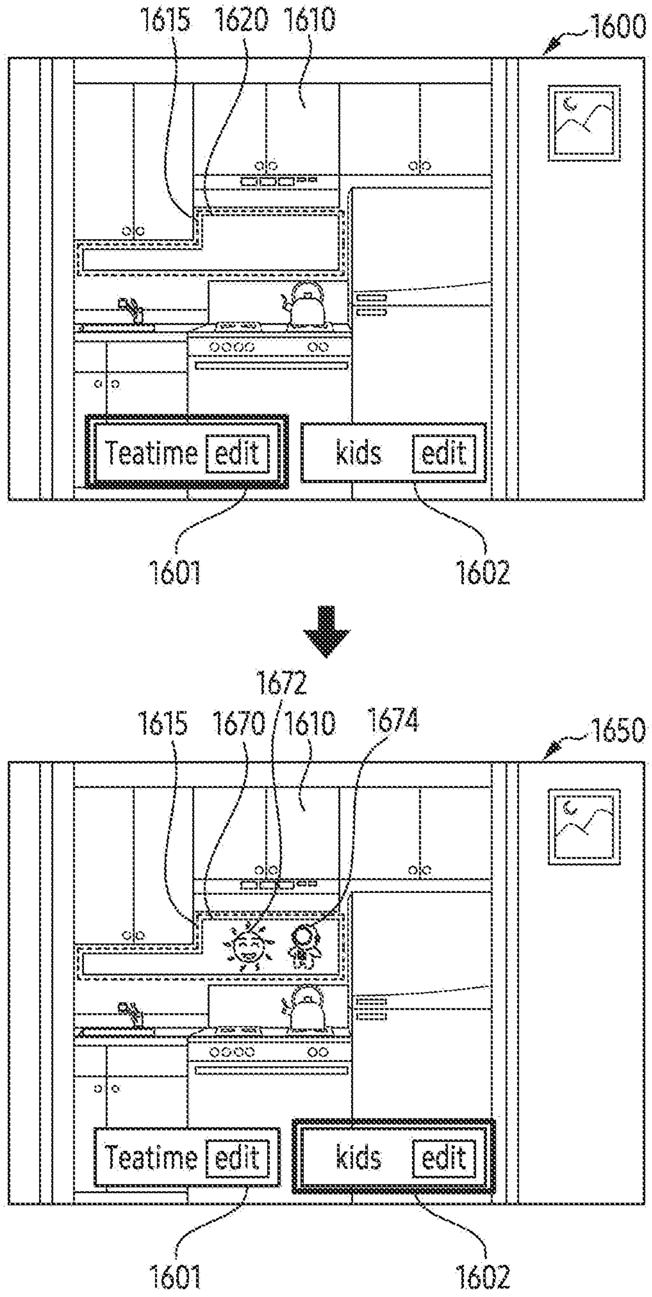
FIG. 16 illustrates an exemplary method of displaying different graphic regions with respect to one real region, according to different schedules.

FIG. 16 illustrates an exemplary method of displaying different graphic regions with respect to one real region, according to different schedules.

Referring to FIG. 16, a graphic region 1620 and a graphic region 1670, which are different graphic regions with respect to a region 1615 (e.g., real region) in an environment 1610 may be set. For example, the graphic region 1620 may be set with respect to the region 1615 for a first schedule, and the graphic region 1670 may be set with respect to the region 1615 for a second schedule.

For example, the processor 210 may provide a state 1600 based on identifying the first schedule among the first schedule and the second schedule. For example, in the state 1600, the processor 210 may display an object 1601 indicating the first schedule and an object 1602 indicating the second schedule. For example, in the state 1600, the object 1601 may be visually emphasized with respect to the object 1602, in order to indicate that the first schedule among the first schedule and the second schedule is identified. For example, in the state 1600, the processor 210 may display the graphic region 1620 on the region 1615. For example, the graphic region 1620 may be suitably set for the first schedule (e.g., tea-time). For example, the graphic region 1620 may have a first color.

For example, the processor 210 may provide a state 1650 based on identifying the second schedule among the first schedule and the second schedule. For example, in the state 1650, the processor 210 may display the object 1601 and the object 1602. For example, in the state 1650, the object 1602 may be visually emphasized with respect to the object 1601, in order to indicate that the second schedule among the first schedule and the second schedule is identified. For example, in the state 1650, the processor 210 may display a graphic region 1670 different from the graphic region 1620 on the region 1615. For example, unlike the graphic region 1620, the graphic region 1670 may be suitably set for the second schedule. For example, the graphic region 1670 may have a second color distinct from the first color. For example, the graphic region 1670 may further include a visual object 1672 and/or a visual object 1674, unlike the graphic region 1620. For example, each of the visual objects 1672 and the visual object 1674 may be included in the graphic region 1670 for the second schedule.

Unlike the above examples, a graphic region may be floated on a real region. For example, the graphic region may be positioned over the real region and spaced apart from the real region. Displaying the graphic region spaced apart from the real region may be exemplified through FIG. 17.

Figure 17:
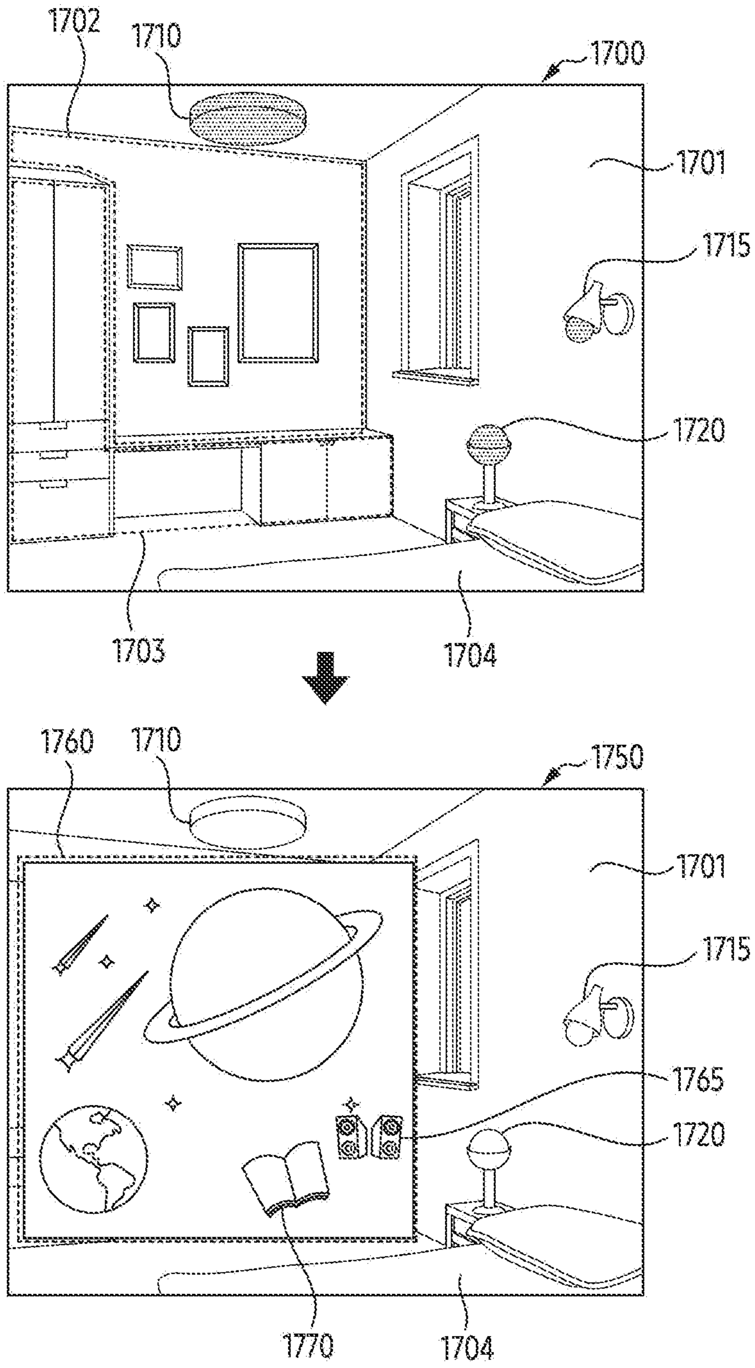
FIG. 17 illustrates an exemplary method of displaying a graphic region floated on a real region.

FIG. 17 illustrates an exemplary method of displaying a graphic region floated on a real region.

Referring to FIG. 17, as in a state 1700, an environment 1701 may include an object 1704 associated with a schedule. For example, the environment 1701 in the state 1700 may include a region 1702 spaced apart from an object 1704 by a first distance and a region 1703 spaced apart from the object 1704 by a second distance shorter than the first distance.

For example, the processor 210 may provide a state 1750 different from the state 1700, based at least in part on identifying the schedule. For example, in the state 1750, the processor 210 may display a graphic region 1760 floated on the region 1702 and the region 1703, via the display 220. For example, the graphic region 1760 may be spaced apart from the object 1704 by a third distance shorter than the first distance between the region 1702 and the object 1704 and the second distance between the region 1703 and the object 1704. For example, the graphic region 1760 may be displayed over the region 1702 and the region 1703. For example, the graphic region 1760 may indicate a content set for the schedule. For example, the graphic region 1760 may be used as a virtual display for displaying the content for the schedule.

For example, displaying the graphic region 1760 may be provided with at least one another function set for the schedule.

For example, the graphic region 1760 may be displayed together with a virtual device 1765 for the schedule and/or a virtual device 1770 for the schedule. For example, the virtual device 1765 may be a virtual audio for adding a visual effect to a background music outputted through a speaker of the wearable device 102. For example, the virtual device 1770 may be an electronic book for adding a visual effect to a voice outputted through the speaker of the wearable device 102. However, it is not limited thereto.

For example, the graphic region 1760 may be displayed while a real device operates according to a setting changed according to the schedule. For example, an external electronic device 1710, an external electronic device 1715, and/or an external electronic device 1720, which are real devices in the environment 1701, may operate according to a first setting within the state 1700 and may operate according to a second setting for the schedule within the state 1750. Changing setting of real devices in the environment 1701 will be exemplified through FIGS. 21 to 23.

Unlike the above examples of displaying a graphic region based on identifying a schedule, the graphic region may be displayed based on a state of an environment around the wearable device 102. For example, the processor 210 may display the graphic region through the display 220, in response to identifying that the state of the environment corresponds to a reference state. For example, the graphic region may be displayed to enhance a quality of the environment. For example, since the graphic region is displayed according to a state of the environment, the wearable device 102 may provide a service suitable for a situation by displaying the graphic region. Displaying the graphic region based on a state of the environment may be exemplified through FIG. 18.

Figure 18:
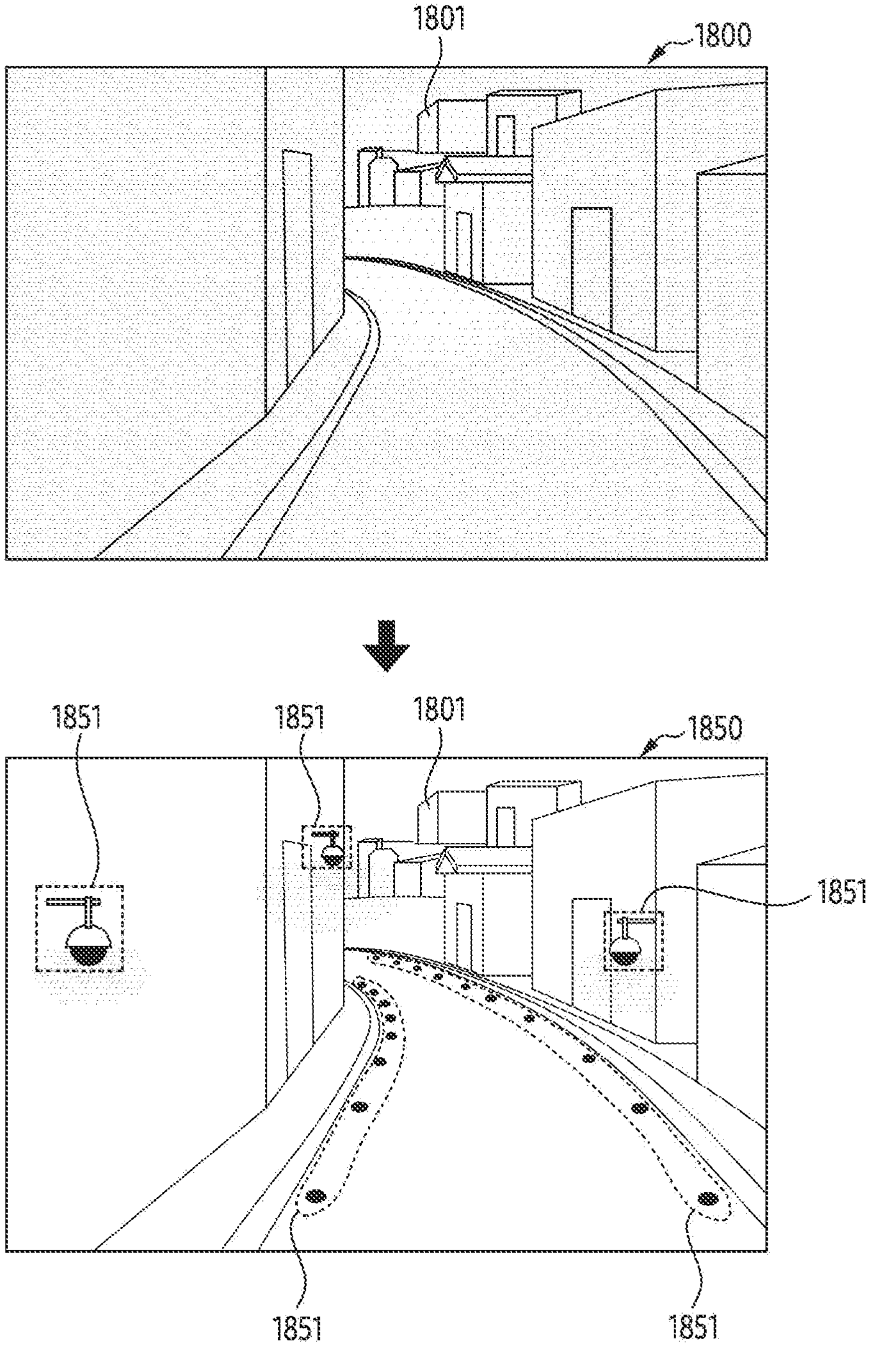
FIG. 18 illustrates an exemplary method of displaying a graphic region according to illuminance.

FIG. 18 illustrates an exemplary method of displaying a graphic region according to illuminance.

Referring to FIG. 18, as in a state 1800, an environment 1801 may have an illuminance lower than a reference illuminance. For example, the processor 210 of the wearable device 102 in the environment 1801 may obtain data indicating the illuminance lower than the reference illuminance through the sensor 250. For example, the processor 210 may provide a state 1850 based on the data. For example, in the state 1850, the processor 210 may change a brightness of the environment 1801. For example, the processor 210 may display the environment 1801 at a brightness level higher than the illuminance to enhance a visibility of the environment 1801. For example, the processor 210 may display graphic regions 1851 through the display 220 on the environment 1801, in order to provide the brightness level. For example, each of the graphic regions 1851 may include a virtual light. For example, each of the graphic regions 1851 may have an arrangement for guiding or informing a path. For example, the graphic regions 1851 may be disposed along the path.

As described above, the graphic regions 1851 may be displayed based on identifying a state of the environment 1801. For example, the graphic regions 1851 may be displayed for safety of a user in the environment 1801.

Unlike the above examples, the graphic region may also be displayed based on identifying a change in a state of a real object in an environment. For example, the processor 210 may identify a change in the state of the real object through the first camera 230 and display the graphic region through the display 220 in response to the identification. For example, since the graphic region is displayed according to a change in the state of the real object, the wearable device 102 may provide a service suitable for a situation by displaying the graphic region. Displaying the graphic region based on a change in the state of the real object may be exemplified through FIG. 19.

Figure 19:
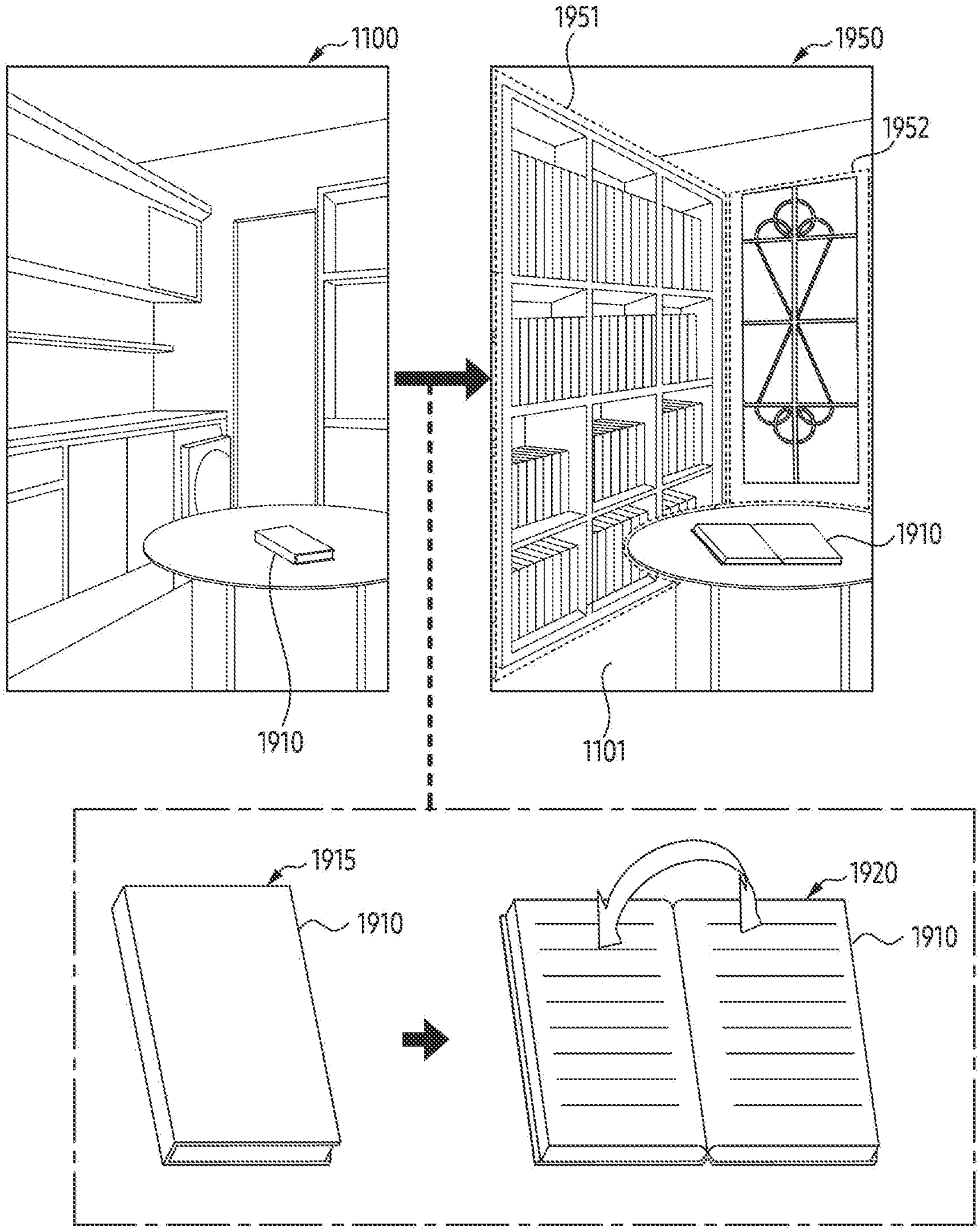
FIG. 19 illustrates an exemplary method of displaying a graphic region according to a change in a state of a real object in an environment.

FIG. 19 illustrates an exemplary method of displaying a graphic region according to a change in a state of a real object in an environment.

Referring to FIG. 19, the processor 210 may provide a state 1100. The processor 210 may identify that a state of a real object 1910 in the environment 1101 is changed from a first state 1915 to a second state 1920 through the first camera 230, while providing the state 1100. For example, the processor 210 may change the state 1100 to the state 1950, in response to identifying the real object 1910 changed from the first state 1915 to the second state 1920 through the first camera 230. For example, the state 1950 may be provided for the environment 1101 suitable for the real object 1910 in the second state 1920.

For example, in the state 1950, the processor 210 may display the graphic region 1951 and the graphic region 1952 through the display 220. For example, each of the graphic region 1951 and the graphic region 1952 may be displayed for a situation (e.g., reading) corresponding to the second state 1920. For example, the wearable device 102 may enhance a quality of the environment 1101 by displaying the graphic region 1951 and the graphic region 1952.

Unlike the above examples, the graphic region may be displayed based on identifying a change in a state of an electronic device in an environment. For example, the processor 210 may display the graphic region through the display 220, based on receiving a signal indicating the change in the state of the electronic device from the electronic device through the communication circuit 260. For example, the processor 210 may display the graphic region through the display 220, by identifying the change in the state of the electronic device based on recognition of an image obtained through the first camera 230. For example, since the graphic region is displayed according to a change in a state of the electronic device in the environment, the wearable device 102 may provide a service suitable for a situation by displaying the graphic region. Displaying the graphic region based on a change in a state of the electronic device in the environment may be exemplified through FIG. 20.

Figure 20:
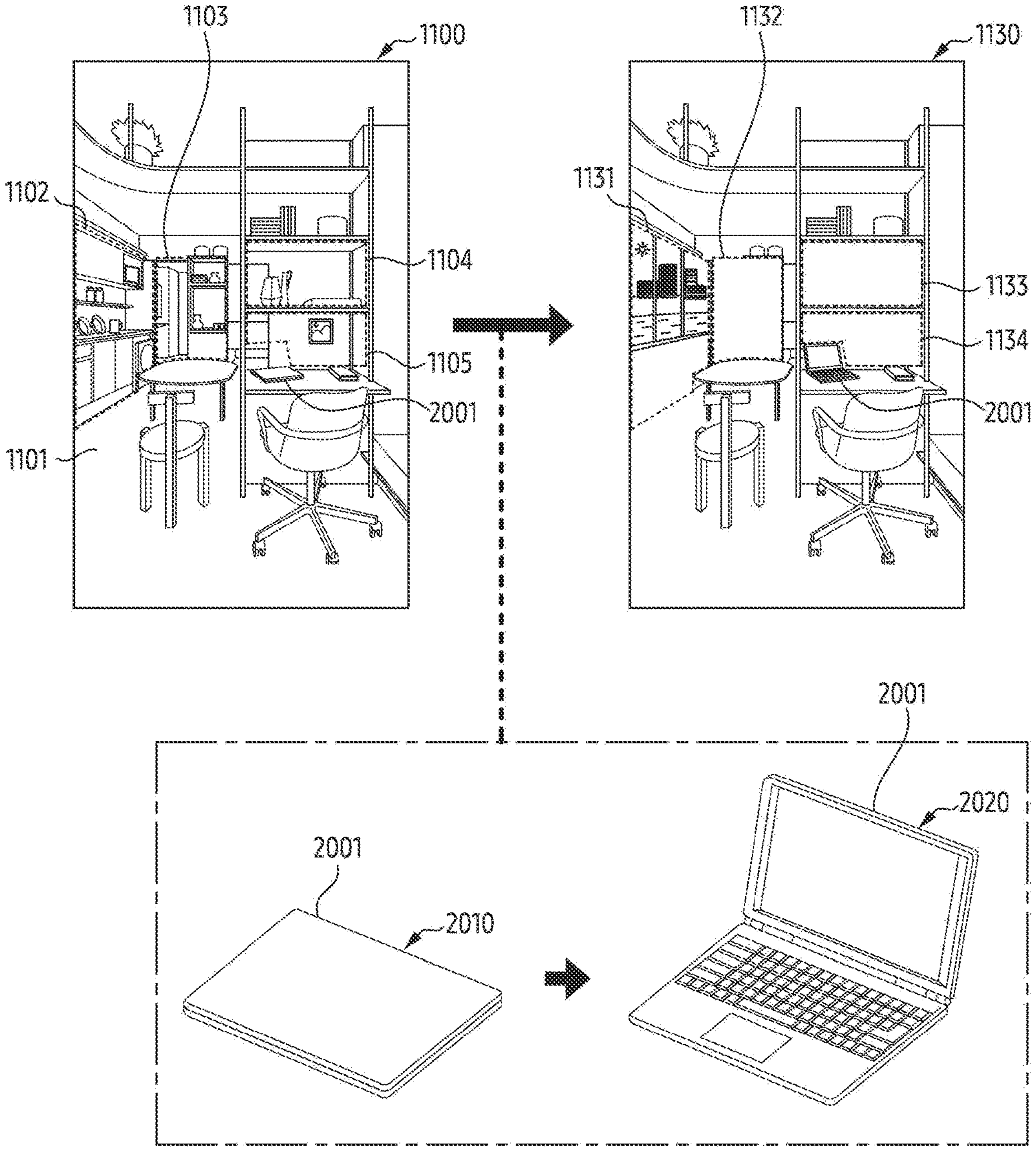
FIG. 20 illustrates an exemplary method of displaying a graphic region according to a change in a state of an electronic device in an environment.

FIG. 20 illustrates an exemplary method of displaying a graphic region according to a change in a state of an electronic device in an environment.

Referring to FIG. 20, the processor 210 may provide a state 1100. For example, an environment 1101 in the state 1100 may include an electronic device 2001 in a first state 2010. The processor 210 may identify that a state of the electronic device 2001 is changed from the first state 2010 to a second state 2020 while providing the state 1100. For example, the processor 210 may receive a signal indicating the second state 2020 of the electronic device 2001 from the electronic device 2001, by using the communication circuit 260 through a connection between the electronic device

2001 and the wearable device 102. The processor 210 may execute the identification based on the signal. For another example, the processor 210 may identify that a state of the electronic device 2001 is changed to the second state 2020 in response to establishing the connection between the electronic device 2001 and the wearable device 102. For example, according to the change from the first state 2010 to the second state 2020, a communication circuit of the electronic device 2001 may be activated. For example, when the electronic device 2001 has a history of being connected to the wearable device 102, the electronic device 2001 may establish the connection with the wearable device 102 based on the history, in response to activating the communication circuit of the electronic device 2001. Even when an explicit indication from the electronic device 2001 is not present, the processor 210 may identify the second state 2020 of the electronic device 2001 changed from the first state 2010 based on the connection. For still another example, the processor 210 may identify whether a state of the electronic device 2001 changes from the first state 2010 to the second state 2020 based on recognizing an image obtained through the first camera 230. For example, the processor 210 may identify a change to the second state 2020 based on the recognition of the image. However, it is not limited thereto.

For example, the processor 210 may change the state 1100 to the state 1130 in response to the identification. For example, the processor 210 may provide the state 1130 changed from the state 1100 for a situation corresponding to the second state 2020 (e.g., task). For example, the wearable device 102 may enhance a quality of the environment 1101 by providing the state 1130.

As described above, displaying the graphic region may be provided together with at least another function. For example, the at least one other function provided with the display of the graphic region may include changing setting of an electronic device set in association with the graphic region. Changing setting of the electronic device may be exemplified through FIG. 21.

Figure 21:
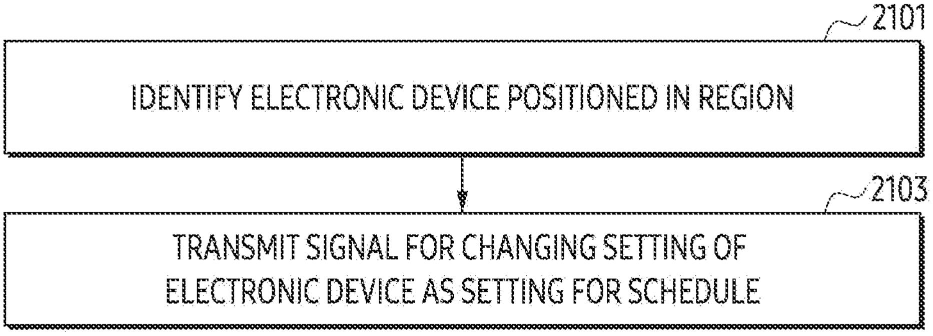
FIG. 21 is a flowchart illustrating an exemplary method of changing a setting of an electronic device to a setting for a schedule, based at least in part on identifying the schedule associated with a graphic region.

FIG. 21 is a flowchart illustrating an exemplary method of changing a setting of an electronic device to a setting for a schedule, based at least in part on identifying the schedule associated with a graphic region.

Referring to FIG. 21, in operation 2101, the processor 210 may identify an electronic device positioned in a region (or real region) in which the graphic region is set, through the first camera 230 and/or the communication circuit 260. For example, the processor 210 may identify the electronic device based on receiving a signal (e.g., an advertising signal) broadcasted from the electronic device through the communication circuit 260. For example, the processor 210 may identify the electronic device based on receiving the signal through operations exemplified in FIG. 6. the processor 210 may identify the electronic device registered in association with a schedule in which a region where the graphic region is set is labeled. For example, the processor 210 may identify the electronic device based on recognition of an image obtained through the first camera 230. For example, the processor 210 may identify the electronic device positioned in the region based on a position of the electronic device stored in association with a spatial map through the first camera 230. However, it is not limited thereto.

In operation 2103, the processor 210 may transmit a signal for changing setting of the electronic device to the electronic device through the communication circuit 260 as setting for the schedule. For example, the processor 210 may transmit the signal to the electronic device to enhance a quality of the graphic region displayed based at least in part on the schedule. For example, the electronic device may receive the signal. For example, the electronic device may operate according to the setting for the schedule while the graphic region is displayed.

Figure 22:
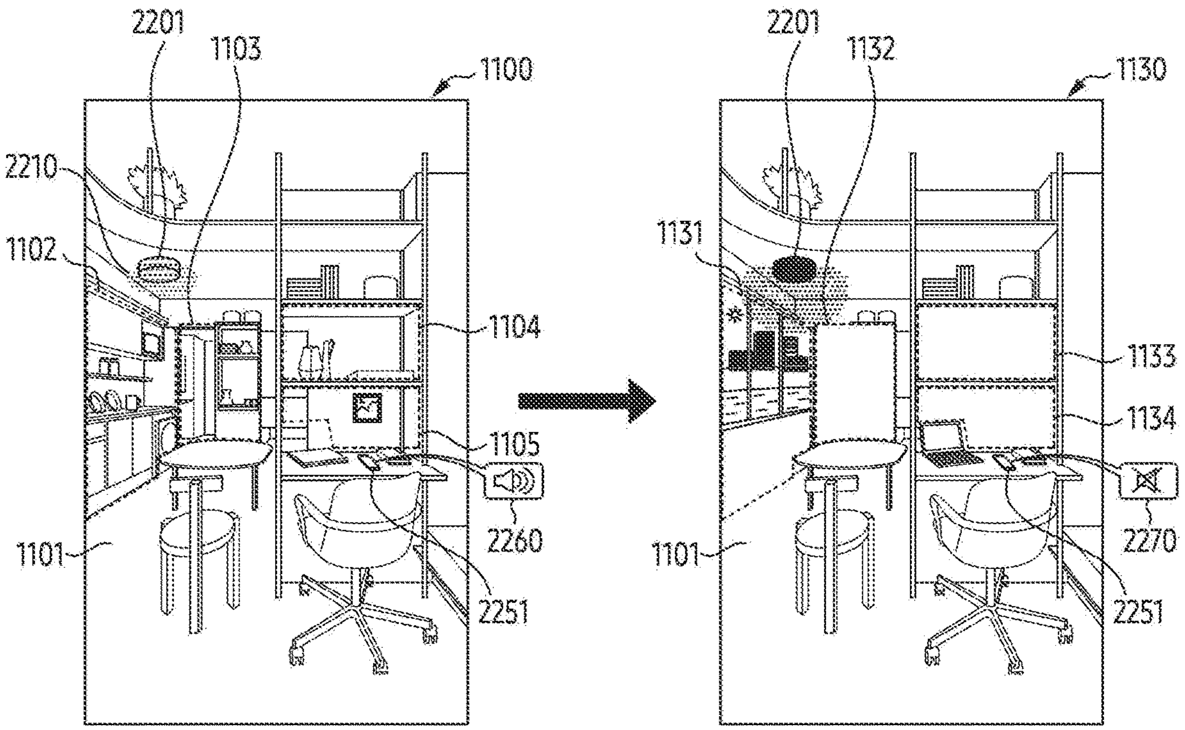
FIG. 22 illustrates a method of changing a setting of an electronic device to a setting for a schedule with displaying a graphic region.

Changing setting of the electronic device to the setting for the schedule may be exemplified through FIG. 22.

FIG. 22 illustrates a method of changing a setting of an electronic device to a setting for a schedule with displaying a graphic region.

Referring to FIG. 22, the processor 210 may provide a state 1100. For example, in the state 1100, an electronic device 2201 (e.g., a lighting) in an environment 1101 may emit a first brightness as in a state 2210. For example, in the state 1100, an electronic device 2251 in the environment 1101 may be in a mode outputting a ringtone in response to an incoming call, as in a state 2260. The processor 210 may change the state 1100 to the state 1130 in response to the schedule.

For example, in response to a change from the state 1100 to the state 1130, the processor 210 may change a state of the electronic device 2201 from the state 2210 to a state 2220 together with displaying the first graphic region 1131 to the fourth graphic region 1134. For example, the electronic device 2201 in the state 2220 may emit a second brightness different from the first brightness for the schedule. For example, in response to the change from the state 1100 to the state 1130, the processor 210 may change a state of the electronic device 2251 from the state 2260 to a state 2270 together with displaying the first graphic region 1131 to the fourth graphic region 1134. For example, the electronic device 2251 in the state 2270 may be in a mode blocking to output a sound in response to an incoming call.

As described above, the wearable device 102 may enhance a quality of the environment 1101, by changing setting of an electronic device adjacent to the graphic region or identified in association with the graphic region to setting corresponding to the schedule as well as displaying the graphic region.

For example, the processor 210 may identify a second schedule next to the first schedule while displaying the first graphic region for the first schedule. In response to identifying the second schedule, the processor 210 may provide an environment that is adaptively changed according to a change in a schedule by changing the first graphic region to a second graphic region. Changing the first graphic region to the second graphic region according to a change in the schedule may be exemplified through FIG. 23.

Figure 23:
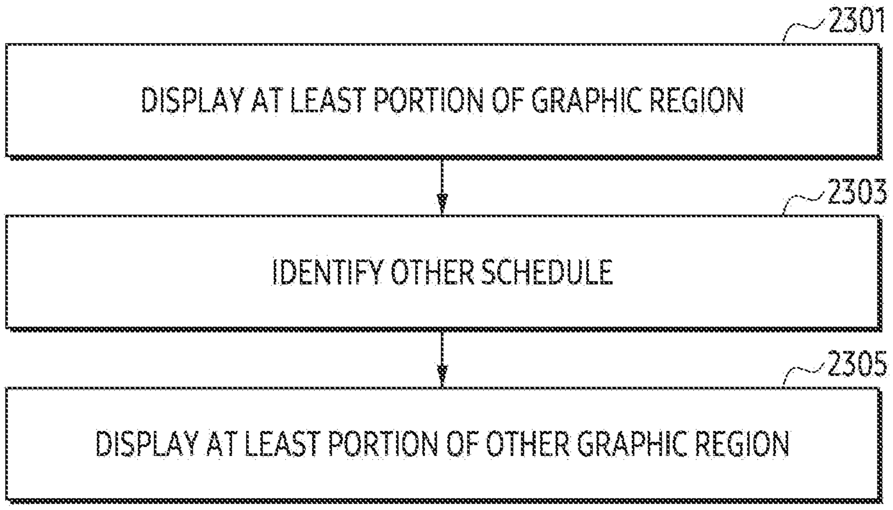
FIG. 23 is a flowchart illustrating an exemplary method of displaying at least a portion of another graphic region, in response to identifying another schedule while displaying at least a portion of a graphic region.

FIG. 23 is a flowchart illustrating an exemplary method of displaying at least a portion of another graphic region, in response to identifying another schedule while displaying at least a portion of a graphic region.

Referring to FIG. 23, in operation 2301, the processor 210 may display at least a portion of graphic region through the display 220, based at least in part on the schedule.

In operation 2303, the processor 210 may identify another schedule registered with respect to the region in which the graphic region is set through a user account used for the graphic region, while the at least a portion of the graphic region is displayed through the display 220, the other schedule being distinct from the schedule.

In operation 2305, the processor 210 may display at least a portion of another graphic region for the other schedule through display 220 on at least a portion of the region, in response to identifying the other schedule. Displaying at least a portion of the other graphic region may be exemplified through FIG. 24.

Figure 24:
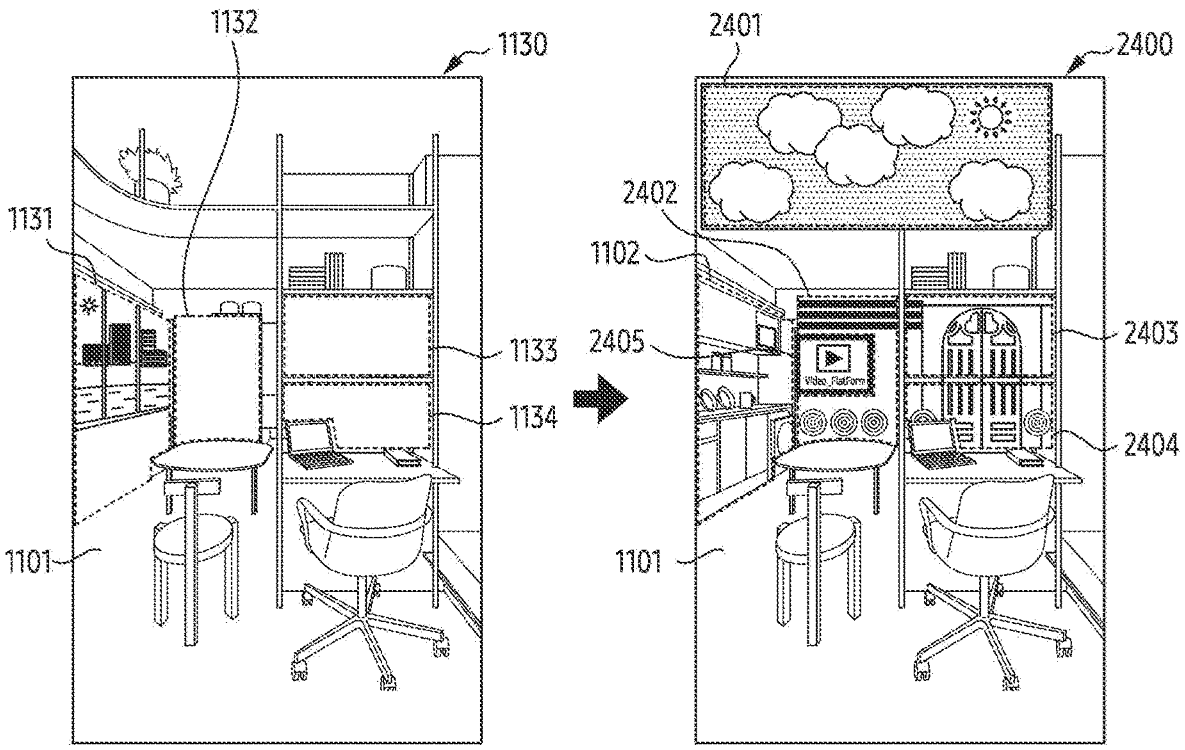
FIG. 24 illustrates an exemplary method of displaying at least a portion of another graphic region.

FIG. 24 illustrates an exemplary method of displaying at least a portion of another graphic region.

Referring to FIG. 24, the processor 210 may provide a state 1130. For example, in the state 1130, the processor 210 may display a first graphic region 1131, a second graphic region 1132, a third graphic region 1133, and a fourth graphic region 1134. The processor 210 may identify the other schedule registered with respect to the environment 1101 while the state 1130 is provided, the other schedule being distinct from the schedule. The processor 210 may change the state 1130 to a state 2400 in response to the identification.

For example, since the other schedule (e.g., meal) is different from the schedule (e.g., task), the processor 210 may cease to display the first graphic region 1131 in the state 2400, and may change the second graphic region 1132 to the fourth graphic region 1134 set for the schedule to the second graphic region 2402, the third graphic region 2403, and the fourth graphic region 2404 set for the other schedule, respectively. For example, in the state 2400, the processor 210 may display a first graphic region 2401, which is a new graphic region set for the other schedule, through the display 220. For example, in the state 2400, the processor 210 may display an execution screen 2405 set for the other schedule. For example, the execution screen 2405 may be provided from a software application executed in response to a change from the state 1130 to the state 2400.

As described above, on a condition of identifying another schedule changed from the schedule, the wearable device 102 may enhance a quality of an environment provided through the wearable device 102, by displaying a graphic region for the other schedule, which is at least partially distinct from the graphic region for the schedule.

According to the above examples, displaying the graphic region may enhance a quality of the environment, but a user may not accurately recognize a change in the real environment due to the display of the graphic region. The wearable device 102 may adjust transparency of a graphic region in response to identifying that an external object enters a region where the graphic region is set, in order to enhance recognition of a change in the real environment. Adjusting transparency of the graphic region according to entrance of the external object may be exemplified through FIG. 25.

Figure 25:
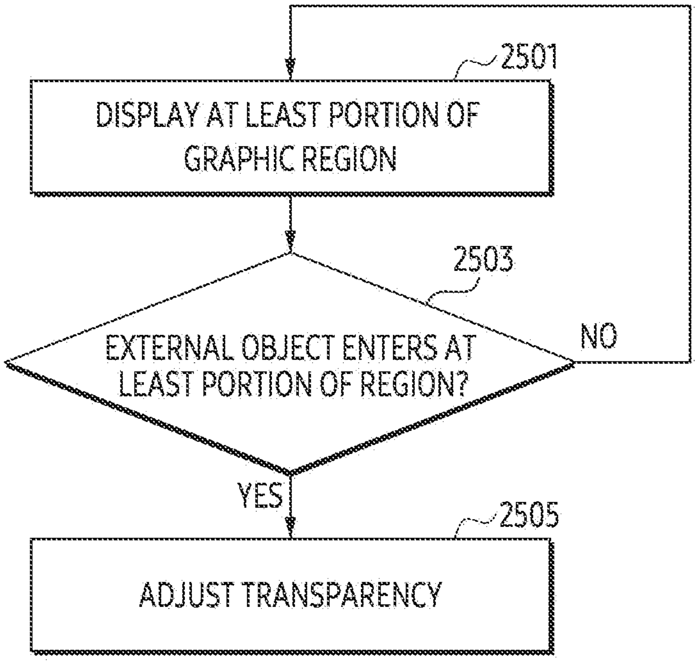
FIG. 25 is a flowchart illustrating an exemplary method of adjusting transparency of a graphic region based on an external object.

FIG. 25 is a flowchart illustrating an exemplary method of adjusting transparency of a graphic region based on an external object.

Referring to FIG. 25, in operation 2501, the processor 210 may display at least a portion of a graphic region through the display 220. For example, since the at least a portion of the graphic region is displayed on a region (e.g., real region), the at least a portion of the graphic region may cover at least a portion of the region.

In operation 2503, the processor 210 may identify whether an external object enters at least a portion of the region while the at least a portion of the graphic region is displayed. For example, the processor 210 may maintain identification of the external object through operation 2503 while the at least a portion of the graphic region is displayed. For example, the processor 210 may execute operation 2505 in response to identifying that the external object enters the at least a portion of the region.

In operation 2505, the processor 210 may adjust transparency of the at least a portion of the graphic region in response to the external object entering the at least a portion of the region. For example, according to adjustment of the transparency, the external object may be visually recognized by a user. Adjusting the transparency in response to the external object entering the at least a portion of the region may be exemplified through FIG. 26.

Figure 26:
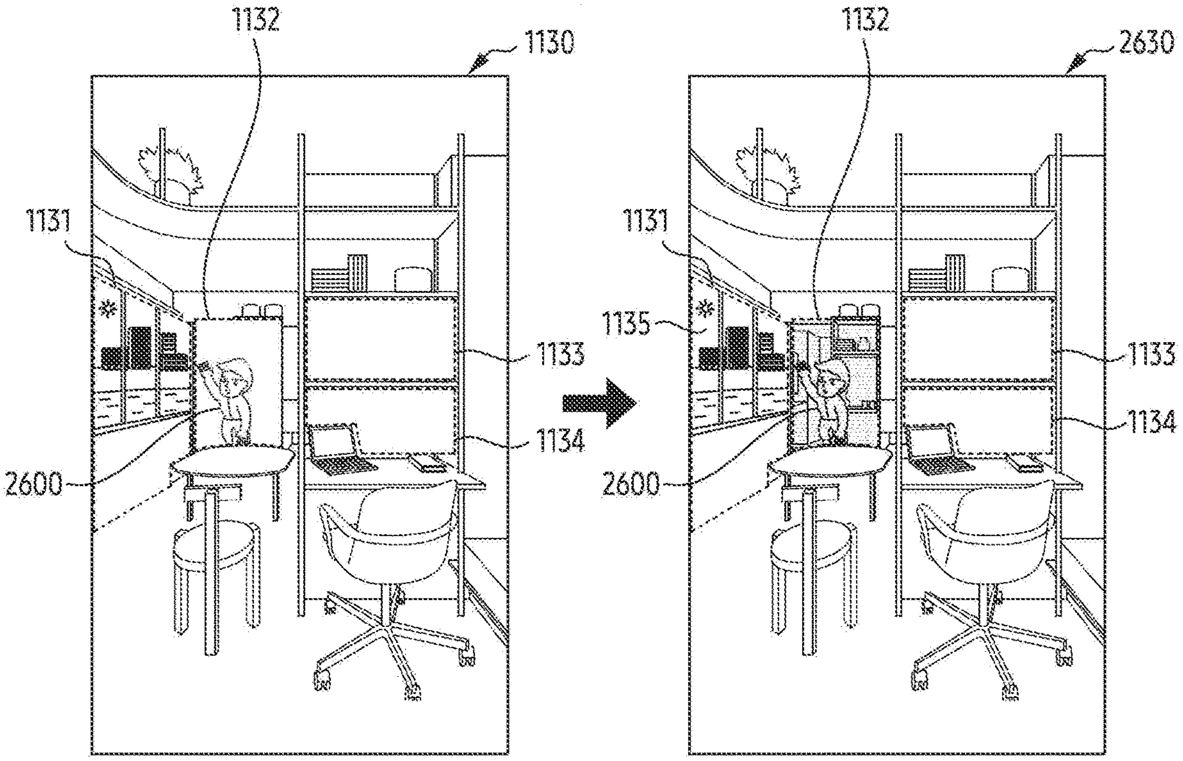
FIG. 26 illustrates an exemplary method of adjusting transparency of at least a portion of a graphic region based on an external object entering a region.

FIG. 26 illustrates an exemplary method of adjusting transparency of at least a portion of a graphic region based on an external object entering a region.

Referring to FIG. 26, the processor 210 may provide a state 1130. The processor 210 may identify whether an external object enters an environment 1101 while the state 1130 is provided. For example, the identification may be executed based on recognition of an image obtained through the first camera 230.

The processor 210 may change the state 1130 to a state 2630 in response to identifying an external object 2600 in the environment 1101. For example, in the state 2630, the processor 210 may adjust transparency of a first graphic region 1131 and a second graphic region 1132 corresponding to a position of the external object 2600. For example, the external object 2600 may be visually recognized through the adjustment of the transparency. For example, when the wearable device 102 is a VST device, the processor 210 may adjust transparency of the environment 1101 in the state 2630. However, it is not limited thereto. Unlike illustration of FIG. 26, the processor 210 may also display a message informing that the external object 2600 is identified through the display 220.

As described above, the wearable device 102 may enhance safety of a user wearing the wearable device 102 through image recognition while displaying the graphic region.

Displaying the graphic region according to the above examples may enhance a quality of the environment, but a movement of the user while the graphic region is displayed may cause a risk to the user. The wearable device 102 may adjust transparency of the graphic region based on a changes in a posture of the user, in order to reduce accidents caused by the risk. Adjusting transparency of the graphic region according to a change in a posture of a user may be exemplified through FIG. 27.

Figure 27:
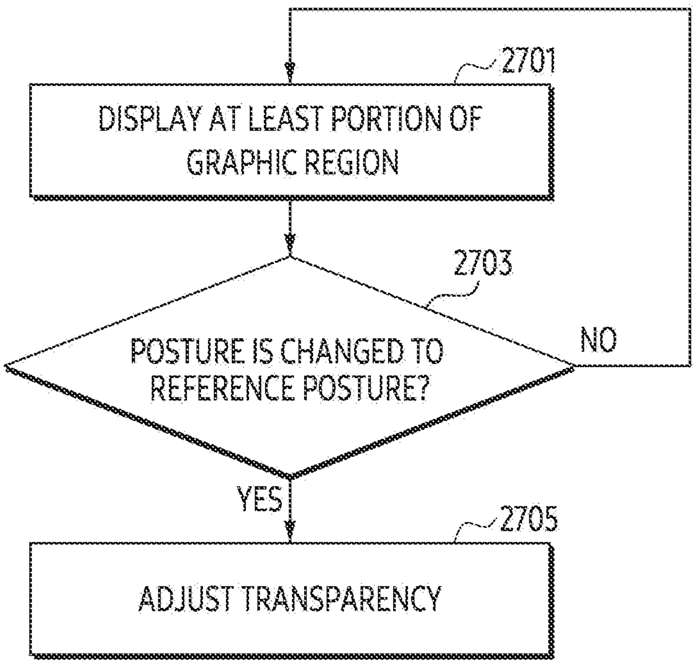
FIG. 27 is a flowchart illustrating an exemplary method of adjusting transparency of at least a portion of a graphic region in response to identifying a change in a user's posture.

FIG. 27 is a flowchart illustrating an exemplary method of adjusting transparency of at least a portion of a graphic region in response to identifying a change in a user's posture.

Referring to FIG. 27, in operation 2701, the processor 210 may display at least a portion of a graphic region through the display 220. For example, since the at least a portion of the graphic region is displayed on a region (e.g., real region), the at least a portion of the graphic region may cover at least a portion of the region.

In operation 2703, the processor 210 may identify whether a user's posture is changed to a reference posture capable of changing a position (or reference posture capable of being moved a user), while the at least a portion of the graphic region is displayed. For example, the processor 210 may identify a change in the user's posture through a change in a posture of the wearable device 102 worn by the user. For example, the processor 210 may execute operation 2703 through the sensor 250. For example, the sensor 250 may include an acceleration sensor and/or a gyro sensor. For example, the acceleration sensor may be used to identify a direction (or orientation) of the wearable device 102. For example, the gyro sensor may be used to identify a direction of the moving wearable device 102. For example, the processor 210 may execute operation 2703 based on recognition of an image obtained through the first camera 230. For example, the processor 210 may execute operation 2703 based on a reflection signal with respect to a signal transmitted from the communication circuit 260 (e.g., a communication circuit for UWB). However, it is not limited thereto.

For example, the processor 210 may maintain identifying whether the posture is being changed to the reference posture through operation 2703 while the at least a portion of the graphic region is displayed. For example, the processor 210 may execute operation 2705 in response to identifying that the posture is changed to the reference posture.

In operation 2705, the processor 210 may adjust transparency of the at least a portion of the graphic region in response to the posture changed to the reference posture. For example, a real region covered by the at least a portion of the graphic region according to the adjustment of the transparency may be visually recognized. Adjusting transparency of the at least a portion of the graphic region in response to the posture changed to the reference posture may be exemplified through FIG. 28.

Figure 28:
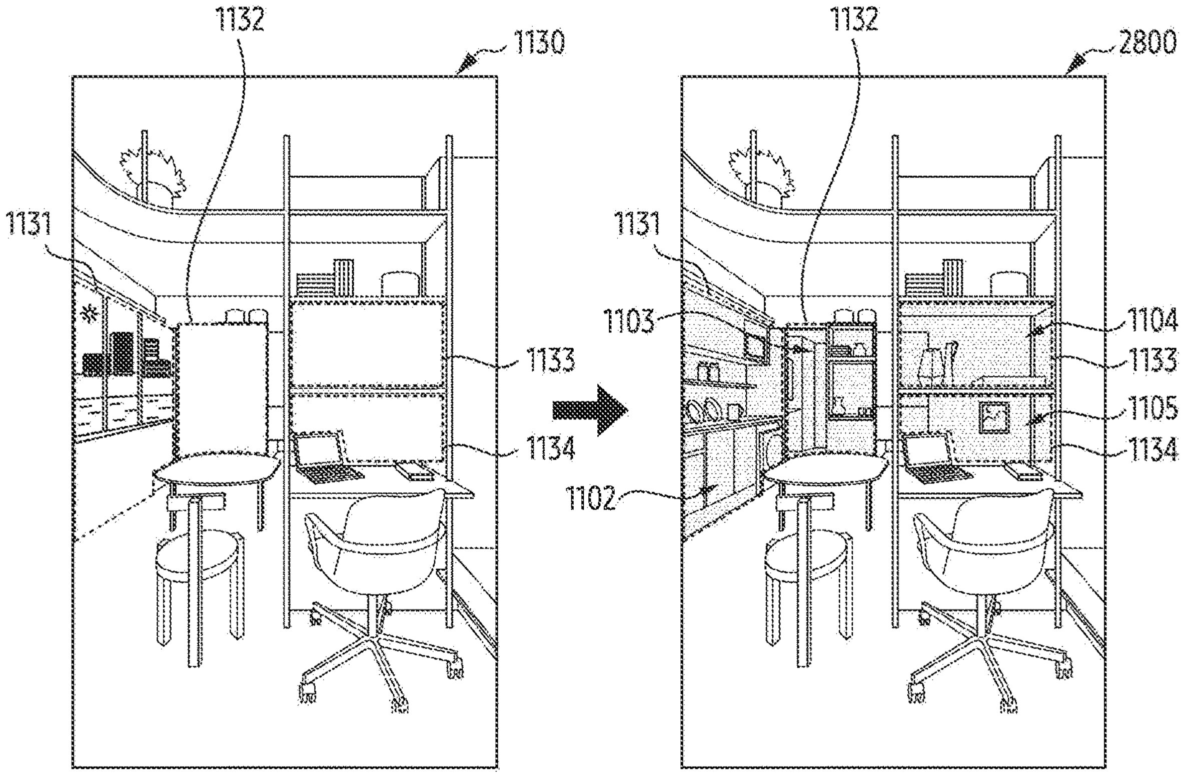
FIG. 28 illustrates an exemplary method of adjusting transparency of at least a portion of a graphic region in response to identifying a change in a user's posture.

FIG. 28 illustrates an exemplary method of adjusting transparency of at least a portion of a graphic region in response to identifying a change in a user's posture.

Referring to FIG. 28, the processor 210 may provide a state 1130. The processor 210 may identify whether a posture of a user wearing the wearable device 102 is changed to the reference posture while the state 1130 is provided. The processor 210 may change the state 1130 to a state 2800 on a conditions that the posture is changed to the reference posture. For example, in the state 2800, the processor 210 may adjust transparency of the first graphic region 1131, the second graphic region 1132, the third graphic region 1133, and the fourth graphic region 1134. According to adjustment of the transparency, the region 1102, the region 1103, the region 1104, and the region 1105 may appear through the display 220. For example, the region 1102, the region 1103, the region 1104, and the region 1105 appear according to the adjustment of the transparency, the wearable device 102 may provide a service for the safety of a user wearing the wearable device 102. Although FIG. 28 illustrates an example in which transparency is adjusted, the processor 210 may also display a message informing or guiding that a risk may occur when the user moves, via the display 220, unlike illustration of FIG. 28.

The above descriptions illustrate a wearable device 102 that displays a graphic region together with a part of a real environment, but the wearable device 102 may also display the graphic region in a virtual environment. For example, the processor 210 may identify biometric data of a user wearing the wearable device 102, and provide a virtual reality displaying a graphic region in a virtual environment or a mixed reality or augmented reality displaying a graphic region in a real environment, according to the biometric data. Providing the virtual reality or the mixed reality according to the biometric data may be exemplified through FIG. 29.

Figure 29:
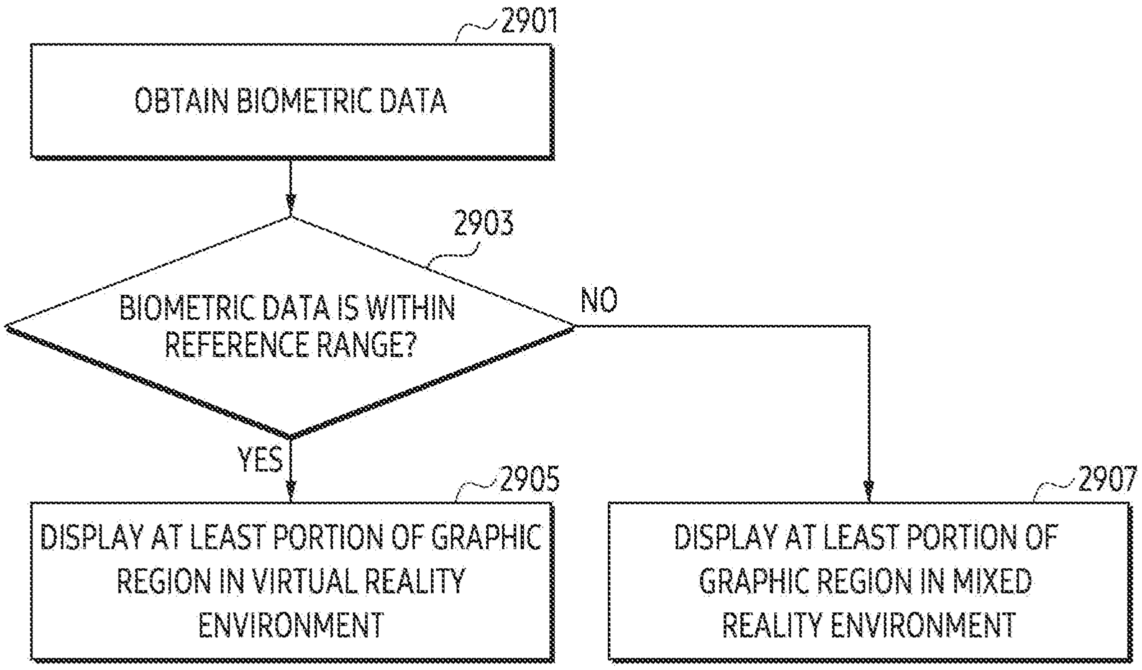
FIG. 29 is a flowchart illustrating an exemplary method of displaying at least a portion of a graphic region within a mixed reality environment or displaying at least a portion of a graphic region within a virtual reality environment, based on biometric data.

FIG. 29 is a flowchart illustrating an exemplary method of displaying at least a portion of a graphic region within a mixed reality environment or displaying at least a portion of a graphic region within a virtual reality environment, based on biometric data.

Referring to FIG. 29, in operation 2901, the processor 210 may obtain biometric data of the wearable device 102. For example, the biometric data may be obtained through the sensor 250. For example, the biometric data may be obtained from an electronic device (e.g., the electronic device 101) connected to the wearable device 102 or another wearable device (e.g., a smartwatch). For example, the processor 210 may obtain the biometric data by receiving the biometric data obtained through a sensor of the other wearable device from the other wearable device through the communication circuit 260. For example, the processor 210 may obtain the biometric data by receiving the biometric data obtained through the sensor of the other wearable device from the other wearable device using the communication circuit 260 through an electronic device (e.g., the electronic device 101). For example, the processor 210 may obtain the biometric data by receiving the biometric data from the electronic device through the communication circuit 260. For example, the electronic device may obtain data indicating a state of a user's body from each of a plurality of electronic devices related to the electronic device, and obtain the biometric data based on the data. The electronic device may transmit the biometric data to the wearable device 102. The wearable device 102 may obtain the biometric data by receiving the biometric data through the communication circuit 260.

For example, the biometric data may indicate the user's blood pressure, the user's heart rate, the user's breathing state, the user's body temperature, the user's stress index, the user's muscle state, and/or the user's sleep time. For example, the biometric data may indicate a user's concentration level for a schedule provided based at least in part on a display of the graphic region. For example, since the biometric data indicates a state of the user's body, the biometric data may be a usable parameter to identify how much the user can concentrate on the schedule.

In operation 2903, the processor 210 may identify whether the biometric data is within a reference range. For example, the biometric data within the reference range may indicate that the user cannot easily concentrate on the schedule. For example, the biometric data outside the reference range may indicate that the user can concentrate on the schedule. For example, the biometric data within the reference range may indicate a state in which processing of the wearable device 102 for the schedule is required or provided, and the biometric data outside the reference range may indicate a state in which the processing of the wearable device 102 for the schedule is not required, provided, or limited.

For example, the processor 210 may execute operation 2905 based on the biometric data within the reference range, and execute operation 2907 based on the biometric data outside the reference range.

In operation 2905, the processor 210 may display the at least a portion of the graphic region for the schedule in a virtual reality environment on a condition that the biometric data is within the reference range. Displaying the at least a portion of the graphic region in the virtual reality environment will be exemplified through FIG. 30.

In operation 2907, the processor 210 may display the at least a portion of the graphic region in a mixed reality environment on a condition that the biometric data is not within the reference range. Displaying the at least a portion of the graphic region in the mixed reality environment may be exemplified through FIG. 30.

Figure 30:
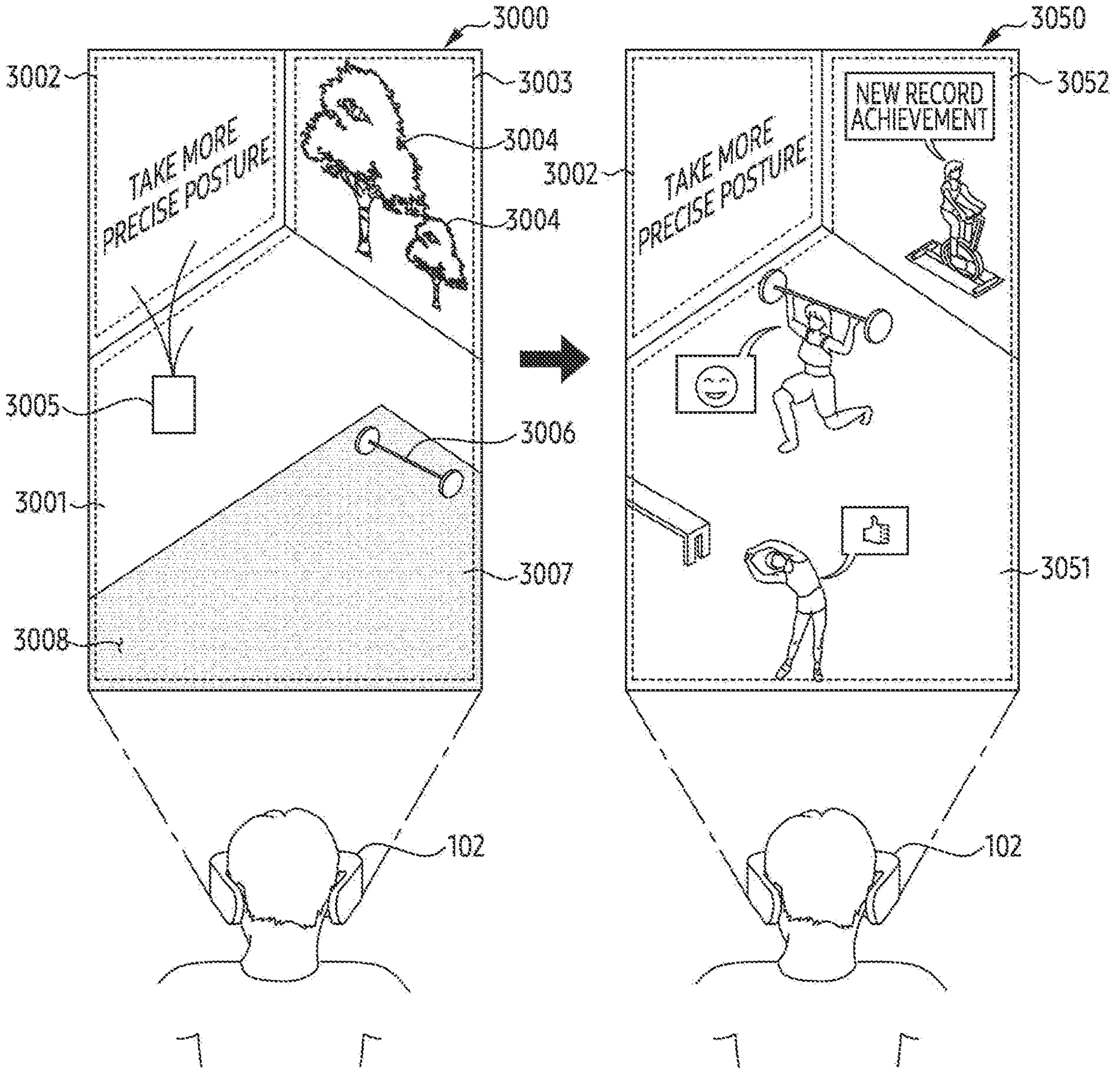
FIG. 30 illustrates an exemplary method of displaying at least a portion of a graphic region within a mixed reality environment or displaying at least a portion of a graphic region within a virtual reality environment, based on biometric data.

FIG. 30 illustrates an exemplary method of displaying at least a portion of a graphic region within a mixed reality environment or displaying at least a portion of a graphic region within a virtual reality environment, based on biometric data.

Referring to FIG. 30, the processor 210 may provide a state 3000 based on the biometric data outside the reference range. For example, in the state 3000, the processor 210 may provide or display an environment 3001. For example, the processor 210 may display a graphic region 3002. For example, the processor 210 may provide a real object 3003, a real object 3004, a real object 3005, a real object 3006, and a real object 3007 together with the graphic region 3002. For example, when the wearable device 102 is AR glasses, a portion 3008 in the environment 3001 may be a part of a real environment shown through the display 220. For example, when the wearable device 102 is a VST device, the portion 3008 in the environment 3001 may be an image displayed through the display 220. For example, the image may indicate the portion 3008 in the environment 3001 that includes the real object 3003, the real object 3004, the real object 3005, the real object 3006, and the real object 3007. For example, in the state 3000, the processor 210 may display the graphic region 3002 within the environment 3001, which is the mixed reality environment.

For example, the processor 210 may provide a state 3050 based on the biometric data within the reference range. For example, in the state 3050, the processor 210 may display an environment 3051. For example, the processor 210 may display the graphic region 3002. For example, the graphic region 3002 displayed within the state 3050 may correspond to the graphic region 3002 displayed within the state 3000. For example, the processor 210 may display a portion 3052 of the environment 3051 within the state 3050. For example, real objects in real environment may not be included in the portion 3052 of the environment 3051. For example, virtual objects included in the portion 3052 of the environment 3051 may not exist in the real environment. For example, the virtual objects may be displayed based on the biometric data outside the reference range, in order to induce the user to concentrate more on the schedule. For example, in the state 3050, the processor 210 may display the graphic region 3002 within the environment 3051, which is a virtual reality environment.

As described above, the wearable device 102 may enhance a user experience of a user wearing the wearable device 102 by adaptively providing a virtual reality environment or a mixed reality environment.

FIGS. 29 and 30 illustrate an example of adaptively providing a virtual reality environment or a mixed reality environment based on biometric data, but the wearable device 102 may also adaptively provide the virtual reality environment or the mixed reality environment based on a level of a schedule. For example, displaying at least a portion of the graphic region in the virtual reality environment or displaying at least a portion of the graphic region in the mixed reality environment according to a level may be exemplified through FIG. 31.

Figure 31:
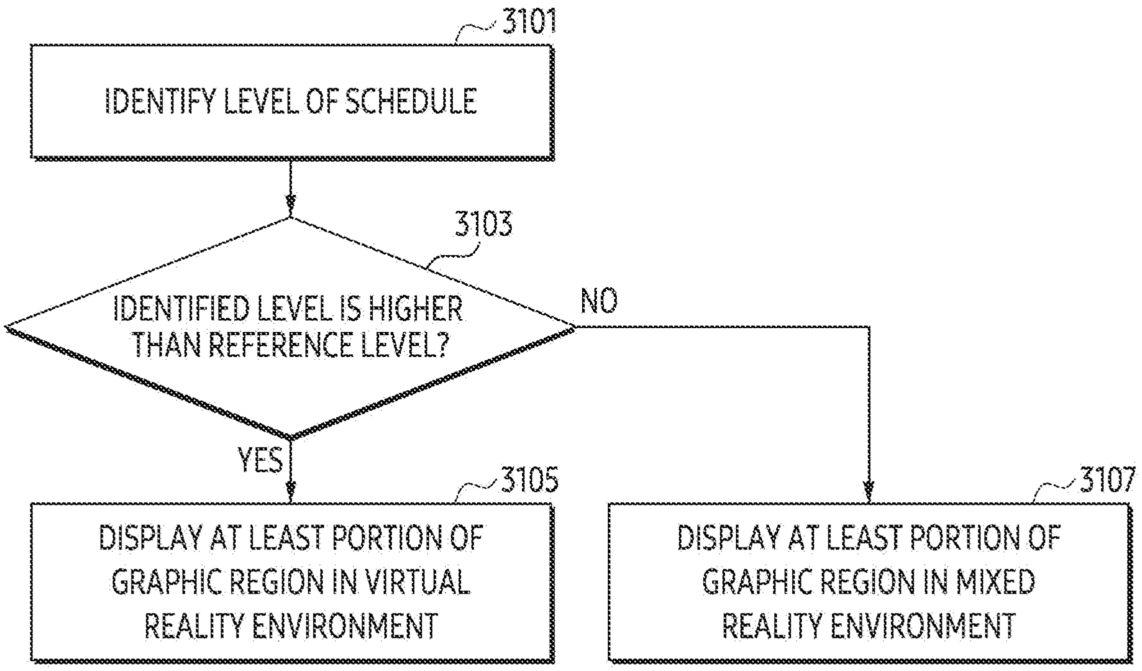
FIG. 31 is a flowchart illustrating an exemplary method of displaying at least a portion of a graphic region within a mixed reality environment or displaying at least a portion of a graphic region within a virtual reality environment, based on a level of a schedule.

FIG. 31 is a flowchart illustrating an exemplary method of displaying at least a portion of a graphic region within a mixed reality environment or displaying at least a portion of a graphic region within a virtual reality environment, based on a level of a schedule.

Referring to FIG. 31, in operation 3101, the processor 210 may identify a level of a schedule in response to identifying the schedule. For example, the level may indicate importance of the schedule. For example, the level may indicate a level of concentration of a user required for the schedule. For example, the level may indicate a priority of the schedule. As a non-limiting example, the level may be differently identified according to biometric data of a user wearing the wearable device 102. For example, even when the schedule has the same importance, the level may be identified differently. For example, when a condition of a body of a user identified through the biometric data is relatively good, the level may be identified relatively low. For example, when the condition of the body of the user identified through the biometric data is relatively poor, the level may be identified relatively high.

In operation 3103, the processor 210 may identify whether the identified level is higher than a reference level. For example, the level higher than the reference level may indicate a state in which processing of the wearable device 102 for a concentration of the user is required or provided. For example, the level lower than or equal to the reference level may indicate a state in which processing of the wearable device 102 for the concentration is not required, provided, or limited.

For example, the processor 210 may execute operation 3105 in response to the level higher than the reference level, and may execute operation 3107 in response to the level lower than or equal to the reference level.

In operation 3105, the processor 210 may display the at least a portion of the graphic region for the schedule within a virtual reality environment, on a condition that the level is higher than the reference level. Displaying the at least a portion of the graphic region in the virtual reality environment will be exemplified through FIG. 32.

In operation 3107, the processor 210 may display the at least a portion of the graphic region within a mixed reality environment, on a condition that the reference level is lower than or equal to the reference level. Displaying the at least a portion of the graphic region in the mixed reality environment may be exemplified through FIG. 32.

Figure 32:
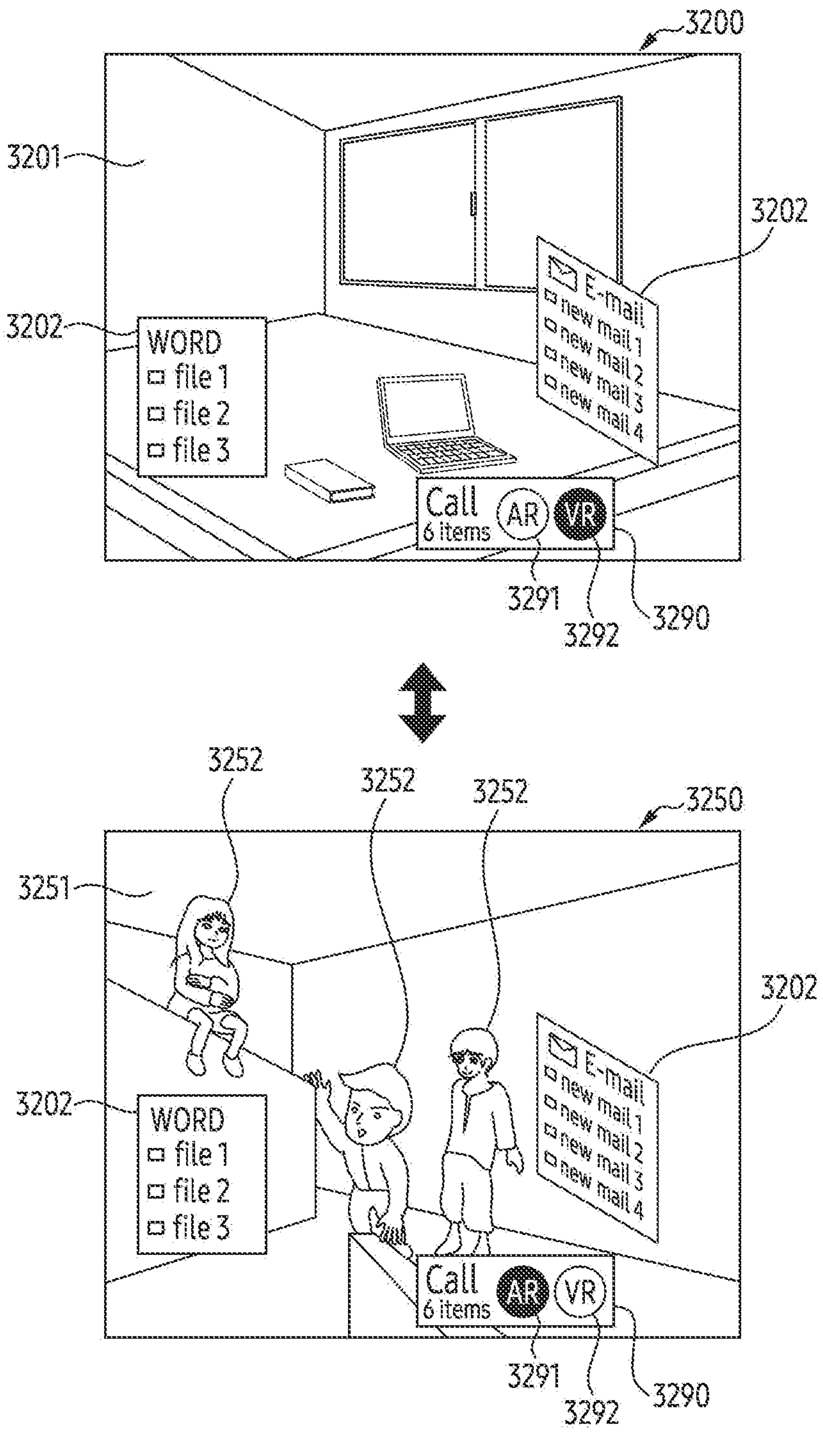
FIG. 32 illustrates an exemplary method of displaying at least a portion of a graphic region within a mixed reality environment or displaying at least a portion of a graphic region within a virtual reality environment, based on a level of a schedule.

FIG. 32 illustrates an exemplary method of displaying at least a portion of a graphic region within a mixed reality environment or displaying at least a portion of a graphic region within a virtual reality environment, based on a level of a schedule.

Referring to FIG. 32, the processor 210 may provide a state 3200 based on the level higher than the reference level. For example, in the state 3200, the processor 210 may provide an environment 3201, which is a virtual reality environment. For example, the processor 210 may display a graphic region 3202. For example, the graphic region 3202 displayed within the state 3200 may correspond to the graphic region 3202 displayed within a state 3250. For example, the environment 3201 within the state 3200 may not include real objects in the real environment. For example, the environment 3201 including the graphic region 3202 may include virtual objects for the schedule, in order to focus on the schedule. For example, a speaker of the wearable device 102 may be in a noise canceling state, while the environment 3201 is displayed in the state 3200. For example, the processor 210 may provide setting of the wearable device 102 for the user to be independent of a state of real environment around the wearable device 102, while the environment 3201 is displayed in the state 3200.

For example, the processor 210 may provide the state 3250 based on the level lower than or equal to the reference level. For example, in the state 3250, the processor 210 may provide or display an environment 3251, which is a mixed reality environment. For example, the processor 210 may display the graphic region 3202. For example, the graphic region 3202 displayed within the state 3250 may correspond to the graphic region 3202 displayed within the state 3200. For example, the environment 3251 in the state 3250 may include real objects in real environment, unlike the environment 3201 in the state 3200. For example, the environment 3251 may include real objects 3252. For example, when the wearable device 102 is AR glasses, the real objects 3252 may be shown through the display 220. For example, when the wearable device 102 is a VST device, the real objects 3252 may be visual objects in an image displayed through the display 220.

On the other hand, providing the environment 3201, which is a virtual reality environment, as in the state 3200 or the environment 3251, which is a mixed reality environment, as in the state 3250 may be different from intention of a user. For example, contrary to the user's intention, the processor 210 may display a user interface 3290, in order to reduce providing the environment 3201 or providing the environment 3251. For example, the user interface 3290 may include a viable object 3291 for providing a mixed reality environment and a viable object 3292 for providing a virtual reality environment. For example, the object 3291, which is executable when the mixed reality environment is provided among the mixed reality environment and the virtual reality environment may be visually emphasized with respect to the executable object 3292. For example, the object 3292, which is executable when the virtual reality environment is provided among the mixed reality environment and the virtual reality environment may be visually emphasized with respect to the executable object 3291.

For example, the processor 210 may change the state 3200 to the state 3250 in response to receiving a user input for an object 3291 executable within the state 3200. For example, the processor 210 may change the state 3250 to the state 3200 in response to receiving a user input for an object 3292 executable within the state 3250.

As described above, the wearable device 102 may enhance a user experience of a user wearing the wearable device 102 by adaptively providing a virtual reality environment or a mixed reality environment.

The wearable device 102 may change a graphic region to another graphic region according to a progress status of the schedule. For example, the progress status of the schedule may be identified based on various methods. For example, the progress status of the schedule may be changed based on the biometric data. Changing the graphic region to the other graphic region according to the progress status of the schedule identified based on the biometric data may be exemplified through FIG. 33.

Figure 33:
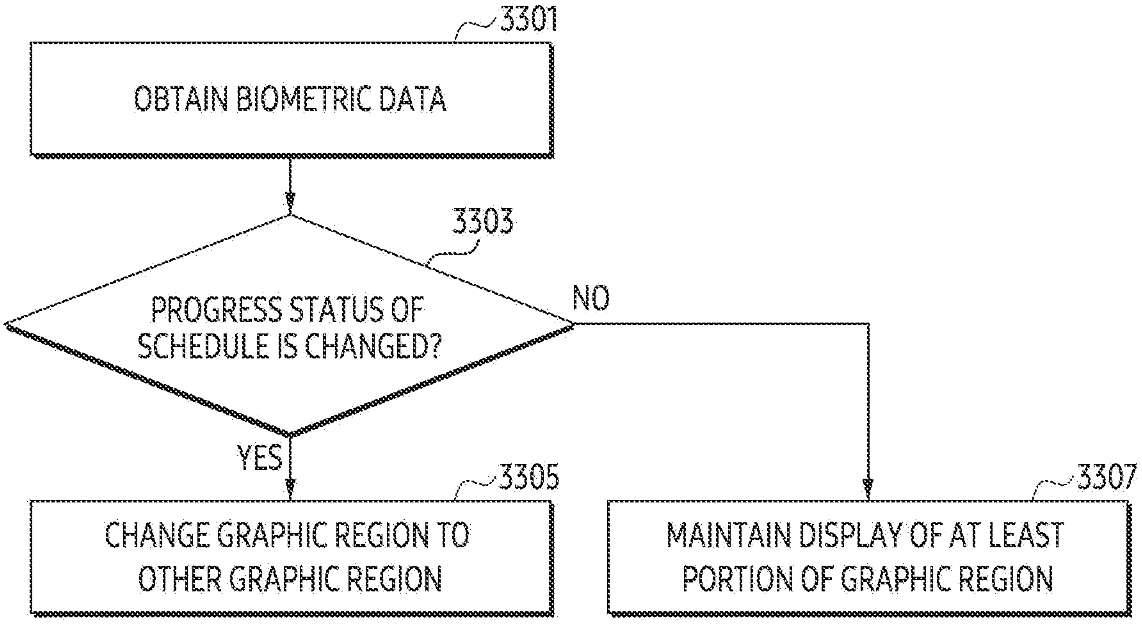
FIG. 33 is a flowchart illustrating an exemplary method of changing a graphic region to another graphic region based at least in part on biometric data.

FIG. 33 is a flowchart illustrating an exemplary method of changing a graphic region to another graphic region based at least in part on biometric data.

Referring to FIG. 33, in operation 3301, the processor 210 may obtain biometric data. For example, the processor 210 may obtain the biometric data while displaying a graphic region. For example, the biometric data may be associated with a schedule provided in association with the graphic region. For example, since the biometric data indicates a state of a user wearing the wearable device 102 while the schedule is in progress, the biometric data may indicate the progress status of the schedule or a state of a user performing the schedule.

For example, the biometric data may be obtained through at least a portion of the methods exemplified in operation 2901 of FIG. 29.

In operation 3303, the processor 210 may identify whether a progress status of the schedule is changed based on the biometric data. For example, the change in the progress status of the schedule may indicate refraining from, bypassing, or limiting a display of the graphic region. For example, maintaining the progress status of the schedule may indicate maintaining a display of the graphic region. For example, when the biometric data indicates that the user is tired or the biometric data indicates a state of a user who has completed a mission provided within the schedule, the processor 210 may identify that the progress status is changed. For another example, when the biometric data indicates that the user is active leisurely or the biometric data indicates a state of a user performing a mission provided within the schedule, the processor 210 may identify that the progress status is maintained.

For example, the processor 210 may execute operation 3305 on a condition that the progress status is changed, and execute operation 3307 on a condition that the progress status is maintained.

In operation 3305, the processor 210 may change the graphic region to the other graphic region based on identifying that the progress status is changed. Changing the graphic region to the other graphic region may be exemplified through FIG. 34.

Figure 34:
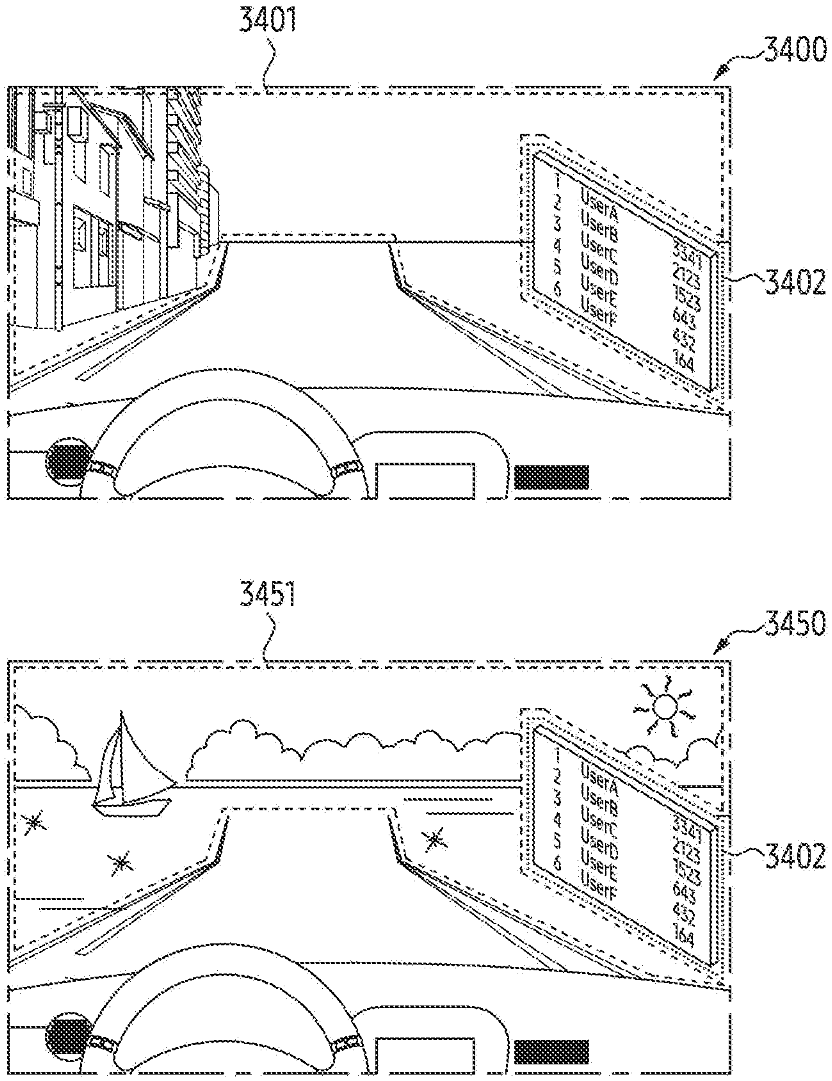
FIG. 34 illustrates an exemplary method of changing a graphic region to another graphic region based at least in part on biometric data.

FIG. 34 illustrates an exemplary method of changing a graphic region to another graphic region based at least in part on biometric data.

Referring to FIG. 34, the processor 210 may obtain the biometric data while providing a state 3400. For example, in the state 3400, the processor 210 may display a graphic region 3401 and a graphic region 3402 through the display 220. For example, the graphic region 3401 and the graphic region 3402 may be displayed for a schedule. For example, the graphic region 3401 may be displayed while the schedule is in progress, unlike the graphic region 3402. However, it is not limited thereto.

For example, the processor 210 may identify that the biometric data obtained while providing the state 3400 displaying the graphic region 3401 and the graphic region 3402 indicates a change in the progress status of the schedule. For example, the processor 210 may change the state 3400 to a state 3450 in response to the biometric data indicating the change in the process status.

In the state 3450, the processor 210 may display a graphic region 3451 changed from the graphic region 3401 and the graphic region 3402 maintained independently of a change from the state 3400 to the state 3450 through the display 220. For example, the graphic region 3451 may indicate that the schedule is completed or the schedule is at least temporarily stopped, unlike the graphic region 3401 indicating that the schedule is in progress. For example, the processor 210 may display the graphic region 3451 changed from the graphic region 3401, in order to reduce user fatigue accumulated while the state 3400 is provided.

FIG. 34 illustrates an example of changing the graphic region 3401 to the graphic region 3451, but the processor 210 may also cease displaying the graphic region 3401 and the graphic region 3402 according to the progress status of the schedule identified according to the biometric data. For example, the processor 210 may cease providing an environment including a graphic region, and provide an environment including only a real region.

As described above, the wearable device 102 may provide an enhanced user experience by adaptively executing a change in a graphic region or a change from an environment including a graphic region to an environment including a real region.

The wearable device 102 capable of executing the above-described operations may be configured as exemplified in FIGS. 35, 36, and 37A to 37B.

Figure 35:
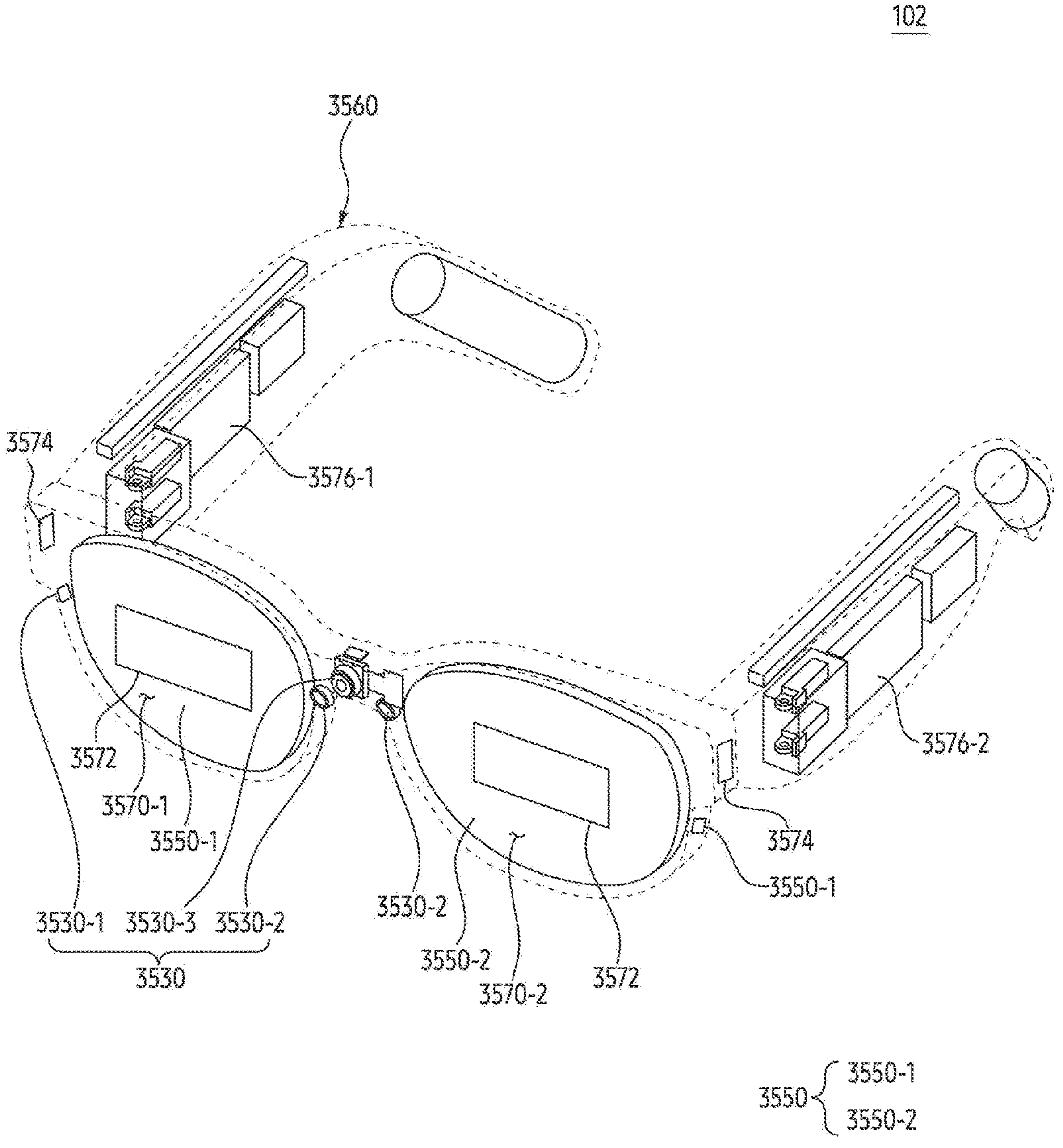
FIG. 35 is a perspective view illustrating an exemplary wearable device.

FIG. 35 is a perspective view illustrating an exemplary wearable device. For example, the wearable device may be the wearable device 102 illustrated in FIG. 2.

Referring to FIG. 35, a frame 3560 of the wearable device 102 may have a physical structure worn on a part of a user's body. For example, the frame 3560 may be configured such that a first display 3550-1 in a display 3550 is positioned in front of a user's right eye and a second display 3550-2 in the display 3550 is positioned in front of a user's left eye, when the wearable device 102 is worn.

In an embodiment, the display 3550 including the first display 3550-1 and the second display 3550-2 may include a liquid crystal display (LCD), a digital mirror device (DMD), a liquid crystal on silicon (LCoS), an organic light emitting diode (OLED), or a micro light emitting diode (LED). In an embodiment, when the display 3550 is configured with the LCD, the DMD, or the LCOS, the wearable device 102 may include a light source (not illustrated in FIG. 35) that emits light toward a display region of the display 3550. In an embodiment, when the display 3550 is configured with the OLED or the micro LED, the electronic device 102 may not include the light source. However, it is not limited thereto.

In an embodiment, the wearable device 102 may further include a first transparent member 3570-1 and a second transparent member 3570-2. For example, each of the first transparent member 3570-1 and the second transparent member 3570-2 may be formed of a glass plate, a plastic plate, or a polymer. For example, each of the first transparent member 3570-1 and the second transparent member 3570-2 may be transparent or translucent.

In an embodiment, the wearable device 102 may include a waveguide 3572. For example, the wave guide 3572 may be used to transmit a light source generated by the display 3550 to the eyes of a user wearing the wearable device 102. For example, the wave guide 3572 may be formed of a glass, a plastic, or a polymer. For example, the wave guide 3572 may include a nano pattern configured with a polygonal or curved grating structure within the waveguide 3572 or in a surface of the waveguide 3572. For example, light incident on one end of the waveguide 3572 may be provided to a user through the nano pattern. In an embodiment, the waveguide 3572 may include at least one of at least one diffraction element (e.g., a diffractive optical element (DOE), a holographic optical element (HOE)) or a reflection element (e.g., a reflection mirror). For example, the at least one diffraction element or the reflection element may be used to guide light to the user's eyes. In an embodiment, the at least one diffraction element may include an input optical member and/or an output optical member. In an embodiment, the input optical member may refer to an input grating area used as an input end of light, and the output optical member may refer to an output grating area used as an output end of light. In an embodiment, the reflection element may include a total internal reflection (TIR) optical element or a total internal reflection waveguide for a total internal reflection.

In an embodiment, a camera 3530 in the wearable device 102 may include at least one first camera 3530-1, at least one second camera 3530-2, and/or at least one third camera 3530-3.

In an embodiment, the at least one first camera 3530-1 may be used for motion recognition or spatial recognition of three degrees of freedom (3DoF) or six degrees of freedom (6DoF). For example, the at least one first camera 3530-1 may be used for head tracking or hand detection. For example, the at least one first camera 3530-1 may be configured as a global shutter (GS) camera. For example, the at least one first camera 3530-1 may be configured as a stereo camera. For example, the at least one first camera 3530-1 may be used for gesture recognition.

In an embodiment, the at least one second camera 3530-2 may be used to detect and track a pupil. For example, the at least one second camera 3530-2 may be configured as the GS camera. For example, the at least one second camera 3530-2 may be used to identify a user input defined by a user's gaze.

In an embodiment, the at least one third camera 3530-3 may be referred to as a high resolution (HR) or photo video (PV) camera, and may provide an auto focusing (AF) function or an optical image stabilization (OIS) function. In an embodiment, the at least one third camera 3530-3 may be configured as the GS camera or a remote shutter (RS) camera.

In an embodiment, the wearable device 102 may further include an LED unit 3574. For example, the LED unit 3574 may be used to assist in tracking the pupil through the at least one second camera 3530-2. For example, the LED unit 3574 may be configured as an IR LED. For example, the LED unit 3574 may be used to compensate for brightness when illuminance around the wearable device 102 is low.

In an embodiment, the wearable device 102 may further include a first PCB 3576-1 and a second PCB 3576-2. For example, each of the first PCB 3576-1 and the second PCB 3576-2 may be used to transmit an electrical signal to a component of the wearable device 102 such as a cameras 3530 or a display 3550. In an embodiment, the wearable device 102 may further include an interposer disposed between the first PCB 3576-1 and the second PCB 3576-2. However, it is not limited thereto.

Figure 36:
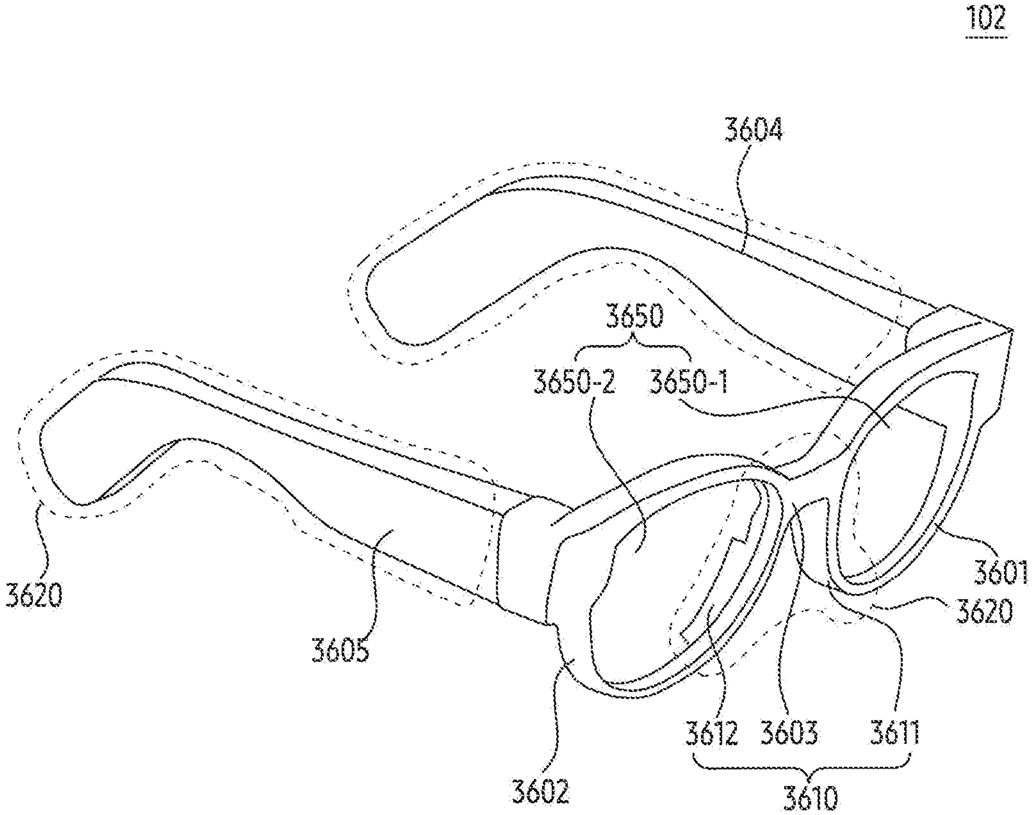
FIG. 36 is a perspective view illustrating an exemplary wearable device.

FIG. 36 is a perspective view illustrating an exemplary wearable device. For example, the wearable device may be the wearable device 102 illustrated in FIG. 2. As shown in FIG. 36, according to an embodiment, the wearable device 102 may include at least one display 3650 and a frame supporting the at least one display 3650.

According to an embodiment, the wearable device 102 may be worn on a portion of a user's body. The wearable device 102 may provide augmented reality (AR), virtual reality (VR), or mixed reality (MR) that combines the AR and the VR to a user wearing the wearable device 102. For example, the wearable device 102 may output a virtual reality image to a user through the at least one display 3650, in response to a user's designated gesture obtained through the third camera 3530-3 of FIG. 35.

According to an embodiment, the at least one display 3650 in the wearable device 102 may provide visual information to a user. The at least one display 3650 may include the display 220 of FIG. 2. For example, the at least one display 3650 may include a transparent or translucent lens. The at least one display 3650 may include a first display 3650-1 and/or a second display 3650-2 spaced apart from the first display 3650-1. For example, the first display 3650-1 and the second display 3650-2 may be disposed at a position corresponding to the user's left and right eyes, respectively.

Referring to FIG. 36, together with visual information included in ambient light passing through lens, the at least one display 3650 may provide other visual information distinct from the visual information to a user wearing the wearable device 102, by forming a display region on the lens. The lens may be formed based on at least one of a lens, a pancake lens, or a multi-channel lens. A display region of the at least one display 3650 may be formed on a surface of the lens. When the user wears the wearable device 102, ambient light may be transmitted to the user by being incident on the first surface of the lens and penetrating through the second surface opposite to the first surface. For another example, the at least one display 3650 may display a virtual reality image to be coupled to a reality screen transmitted through ambient light. The virtual reality image outputted from the at least one display 3650 may be transmitted to the user's eyes through one or more hardware (e.g., the waveguide 3572 in FIG. 35) included in the wearable device 102.

According to an embodiment, the frame may have a physical structure in which the wearable device 102 can be worn on the user's body. According to an embodiment, the frame may be configured so that the first display 3650-1 and the second display 3650-2 may be positioned a position corresponding to the user's left and right eyes when the user wears the wearable device 102. The frame may support the at least one display 3650. For example, the frame may support the first display 3650-1 and the second display 3650-2 to be positioned in a position corresponding to the user's left and right eyes.

Referring to FIG. 36, the frame may include a region 3620 at least partially in contact with a portion of a user's body when the user wears the wearable device 102. For example, the region 3620 in contact with a portion of the user's body of the frame may include a region contacting a portion of the user's nose, a portion of the user's ear, and a portion of the side of the user's face that the wearable device 102 contacts. According to an embodiment, the frame may include a nose pad 3610 in contact with a portion of the user's body. When the wearable device 102 is worn by the user, the nose pad 3610 may be in contact with a portion of the user's nose. The frame may include a first temple 3604 and a second temple 3605 in contact with another portion of the user's body distinct from the portion of the user's body.

According to an embodiment, the frame may include a first rim 3601 surrounding at least a portion of the first display 3650-1, a second rim 3602 surrounding at least a portion of the second display 3650-2, a bridge 3603 disposed between the first rim 3601 and the second rim 3602, a first pad 3611 disposed along a portion of an edge of the first rim 3601 from one end of the bridge 3603, a second pad 3612 disposed along a portion of an edge of the second rim 3602 from another end of the bridge 3603, a first temple 3604 extending from the first rim 3601 and fixed to a part of the wearer's ear, and a second temple 3605 extending from the second rim 3602 and fixed to a part of opposite ear of the ear. The first pad 3611 and the second pad 3612 may be contacted with a part of the user's nose, and the first temple 3604 and the second temple 3605 may be contacted with a part of the user's face and a part of the ear. The temples 3604 and 3605 may be rotatably connected to the rim via a hinge unit. According to an embodiment, the wearable device 102 may identify an external object (e.g., the user's fingertip) that touches the frame and/or a gesture performed by the external object, by using a touch sensor, a grip sensor, and/or a proximity sensor formed on at least a portion of the surface of the frame.

Figure 37A:
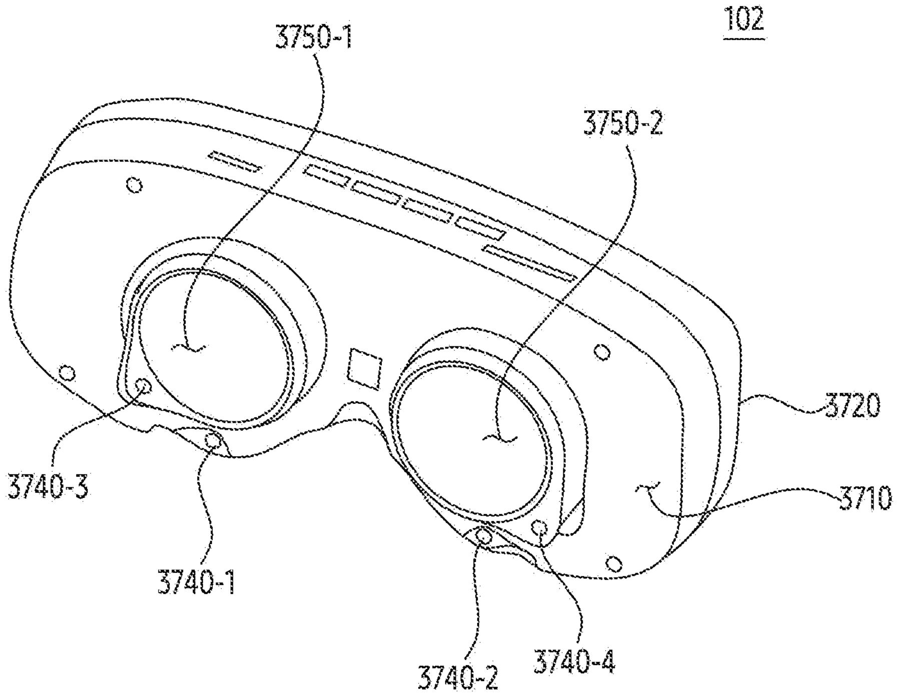
FIGS. 37A to 37B illustrate appearance of an exemplary wearable device.
Figure 37B:
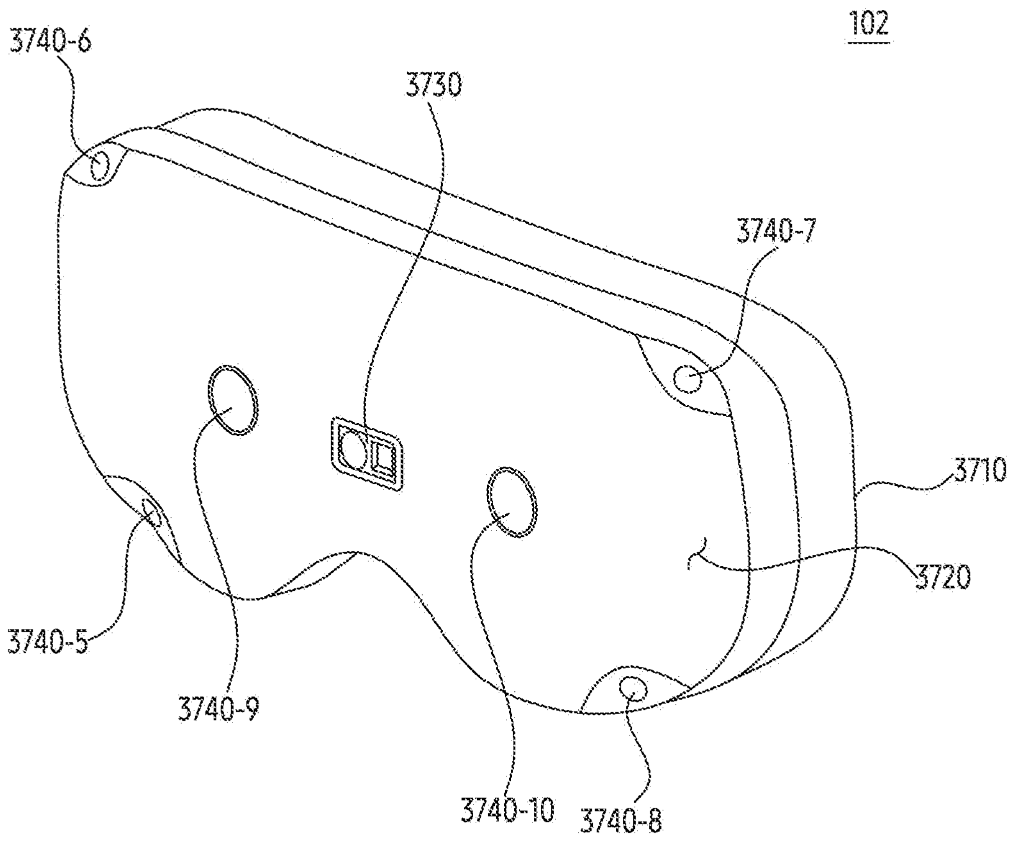

FIGS. 37A to 37B illustrate appearance of an exemplary wearable device. For example, the wearable device may be the wearable device 102 illustrated in FIG. 2. According to an embodiment, an example of appearance of a first surface 3710 of a housing of the wearable device 102 may be illustrated in FIG. 37A, and an example of appearance of a second surface 3720 opposite to the first surface 3710 may be illustrated in FIG. 37B.

Referring to FIG. 37A, according to an embodiment, the first surface 3710 of the wearable device 102 may have a shape attachable on the user's body part (e.g., the user's face). Although not illustrated, the wearable device 102 may further include a strap for being fixed on the user's body part, and/or one or more temples (e.g., the first temple 3604 and/or the second temple 3605 of FIG. 36). A first display 3750-1 for outputting an image to the left eye among the user's two eyes and a second display 3750-2 for outputting an image to the right eye among the user's two eyes may be disposed on the first surface 3710. The wearable device 102 may further include rubber or silicon packing, which is formed on the first surface 3710, to prevent interference by light (e.g., ambient light) different from the light emitted from the first display 3750-1 and the second display 3750-2.

According to an embodiment, the wearable device 102 may include cameras 3740-3 and 3740-4 for photographing and/or tracking the user's two eyes adjacent to each of the first display 3750-1 and the second display 3750-2. The cameras 3740-3 and 3740-4 may be referred to as an ET camera. According to an embodiment, the wearable device 102 may include cameras 3740-1 and 3740-2 for photographing and/or recognizing the user's face. The cameras 3740-1 and 3740-2 may be referred to as an FT camera.

Referring to FIG. 37B, Cameras (e.g., cameras 3740-5, 440-6, 440-7, 440-8, 440-9, and 440-10) and/or a sensor (e.g., a depth sensor 3730) for obtaining information related to an external environment of the wearable device 102 may be disposed on the second surface 3720 opposite to the first surface 3710 of FIG. 37A. For example, cameras 3740-5, 440-6, 440-7, 440-8, 440-9, 440-10 may be disposed on the second surface 3720 to recognize an external object different from the wearable device 102. For example, the wearable device 102 may obtain an image and/or a media to be transmitted to each of the user's two eyes, by using cameras 3740-9 and 440-10. The camera 3740-9 may be disposed on the second surface 3720 of the wearable device 102 to obtain a frame to be displayed through the second display 3750-2 corresponding to the right eye among the two eyes. The camera 3740-10 may be disposed on the second surface 3720 of the wearable device 102 to obtain a frame to be displayed through the first display 3750-1 corresponding to the left eye among the two eyes.

According to an embodiment, the wearable device 102 may include a depth sensor 3730 disposed on the second surface 3720 to identify a distance between the wearable device 102 and an external object. Using the depth sensor 3730, the wearable device 102 may obtain spatial information (e.g., depth map) on at least a portion of an FoV of the user wearing the wearable device 102.

Although not illustrated, a microphone for obtaining sound outputted from an external object may be disposed on the second surface 3720 of the wearable device 102. The number of microphones may be one or more according to embodiments.

As described above, a wearable device 102 may comprise a display 220 arranged with respect to eyes of a user wearing the wearable device 102, a camera including at least one lens that faces a direction corresponding to a direction in which the eyes faces, and a processor 210. The processor 210 may be configured to identify, in response to a schedule, a place labeled with respect to the schedule. According to an embodiment, the processor 210 may be configured to identify, based at least in part on the identification, whether the camera of the wearable device 102 positioned in the place faces a region in the place to which a graphic region for the schedule is set. According to an embodiment, the processor 210 may be configured to display, via the display 220, at least portion of the graphic region on at least portion of the region, based on identifying that a direction of the camera corresponds to a first direction in which the camera faces the region. According to an embodiment, the processor 210 may be configured to identify, via the display 220, information for informing the first direction, based on identifying that the direction corresponds to a second direction different from the first direction.

According to an embodiment, the processor 210 may be configured to display, via the display 220, information for informing a movement to the place, based on a position of the wearable device 102 outside of the place.

According to an embodiment, the processor 210 may be configured to display, in response to the direction corresponding to the first direction, the at least portion of the graphic region by expanding the at least portion of the graphic region from a portion of the region spaced apart from the wearable device 102 to another portion of the region adjacent to the wearable device 102.

According to an embodiment, the processor 210 may be configured to display, via the display 220, an execution screen of each of one or more software applications set for the schedule, with the at least portion of the graphic region, based on the direction corresponding to the first direction. According to an embodiment, the processor 210 may be configured to cease displaying one or more execution screens of one or more other software applications, distinct from the one or more software applications, based on the direction corresponding to the first direction. According to an embodiment, the wearable device 102 may comprise another camera facing the eyes. According to an embodiment, the processor 210 may be configured to identify a gaze of the user through images obtained by using the other camera. According to an embodiment, the processor 210 may be configured to cease displaying a first execution screen positioned outside of the gaze from among the one or more execution screens, based on the direction corresponding to the first direction. According to an embodiment, a second execution screen in which the gaze is positioned from among the one or more execution screens may be maintained via the display 220, independently from the direction corresponding to the first direction. According to an embodiment, the processor 210 may be configured to cease representing content provided through the second execution screen maintained via the display 220.

According to an embodiment, the processor 210 may be configured to display, via the display 220, a message including an executable object for stopping to display the graphic region, while at least portion of the graphic region appears. According to an embodiment, the processor 210 may be configured to display, via the display 220, a portion of the region and a portion of the graphic region by stopping to display the graphic region, in response to a user input on the executable object.

According to an embodiment, the processor 210 may be configured to display, via the display 220, a message including an executable object for ceasing to display the graphic region on the region, while at least portion of the graphic region appears. According to an embodiment, the processor 210 may be configured to maintain to provide the region, by ceasing to display a portion of the graphic region displayed based on the direction corresponding to the first direction, in response to a user input on the executable object.

According to an embodiment, the processor 210 may be configured to obtain biometric data of the user. According to an embodiment, the processor 210 may be configured to display, in a virtual reality environment, the at least portion of the graphic region, based on the direction corresponding to the first direction and the biometric data within reference range. According to an embodiment, the processor 210 may be configured to display, in a mixed reality environment, the least portion of the graphic region, based on the direction corresponding to the first direction and the biometric data outside of the reference range.

According to an embodiment, the processor 210 may be configured to identify a level of the schedule. According to an embodiment, the processor 210 may be configured to display, in a virtual reality environment, the at least portion of the graphic region, based on the direction corresponding to the first direction and the level higher than a reference label. According to an embodiment, the processor 210 may be configured to display, in a mixed reality environment, the least portion of the graphic region, based on the direction corresponding to the first direction and the level lower than or equal to the reference label.

According to an embodiment, the processor 210 may be configured to obtain data indicating illuminance around the wearable device 102. According to an embodiment, the processor 210 may be configured to display the at least portion of the graphic region in a brightness identified based on the illuminance in response to the direction corresponding to the first direction.

According to an embodiment, the processor 210 may be configured to identify, while the at least portion of the graphic region is displayed via the display 220, a progress status of the schedule, based on biometric data of the user. According to an embodiment, the processor 210 may be configured to, based on the progress status, maintain to display the at least portion of the graphic region or change the at least portion of the graphic region to at least portion of another graphic region set with respect to the region for the schedule.

According to an embodiment, the processor 210 may be configured to identify another schedule, distinct from the schedule, registered with respect to the region through an account of the user, while the at least portion of the graphic region is displayed via the display 220. According to an embodiment, the processor 210 may be configured to display, via the display 220, at least portion of another graphic region for the other schedule, on at least portion of the region, in response to the other schedule.

According to an embodiment, the wearable device may comprise a communication circuit. According to an embodiment, the processor 210 may be configured to identify an electronic device positioned in the region, via the camera or the communication circuit. According to an embodiment, the processor 210 may be configured to transmit, to the electronic device via the communication circuit, a signal for changing settings of the electronic device to settings for the schedule, based at least in part on the direction corresponding to the first direction.

According to an embodiment, the processor 210 may be configured to identify an electronic device, including a display 220, positioned in the region, via the camera or the communication circuit. According to an embodiment, the processor 210 may be configured to, based on the direction corresponding to the first direction, display, via the display 220, an execution screen of a first software application set for the schedule, with the at least portion of the graphic region, and transmit, to the electronic device via the communication circuit, a signal for displaying an execution screen of a second software application set for the schedule via the display 220 of the electronic device.

According to an embodiment, the processor 210 may be configured to register, through a software application, the schedule in which the place including the region to which the graphic region is set is labeled. According to an embodiment, the processor 210 may be configured to transmit, via the communication circuit to a server, information on the schedule, based on the registration. According to an embodiment, the processor 210 may be configured to, while the software application is in an inactive state, receive, via the communication circuit, a signal transmitted from the server in response to identifying the schedule based on the information. According to an embodiment, the processor 210 may be configured to change, in response to the signal, a state of the software application from the inactive state to an active state. According to an embodiment, the processor 210 may be configured to execute operations for displaying via the display 220 the least portion of the graphic region, by using the software application changed to the active state.

According to an embodiment, the processor 210 may be configured to register, through a software application, the schedule in which the place including the region to which the graphic region is set is labeled. According to an embodiment, the processor 210 may be configured to transmit, via the communication circuit to a server, information on the schedule, based on the registration. According to an embodiment, the processor 210 may be configured to receive, via the communication circuit, a signal transmitted from the server in response to identifying the schedule based on the information. According to an embodiment, the processor 210 may be configured to change, in response to the signal, states of one or more other software applications indicated by the signal to active states. According to an embodiment, the processor 210 may be configured to execute operations for displaying via the display 220 the at least portion of the graphic region, based at least in part on the one or more other software applications changed to the active states.

According to an embodiment, the processor 210 may be configured to register, through a software application, the schedule in which the place including the region to which the graphic region is set is labeled. According to an embodiment, the processor 210 may be configured to transmit, via the communication circuit to a server, information on the schedule, based on the registration. According to an embodiment, the processor 210 may be configured to provide, through an operating system, data for accessing to the information in the server, to one or more other software applications in the wearable device 102, the one or more other software applications capable of processing the schedule.

According to an embodiment, the processor 210 may be configured to register, through a software application, the schedule in which the place including the region to which the graphic region is set is labeled. According to an embodiment, the processor 210 may be configured to provide, through an operating system to one or more other software applications in the wearable device 102, data indicating a location in which information on the schedule is stored according to the registration, the one or more other software applications capable of processing the schedule.

According to an embodiment, the processor 210 may be configured to identify whether an external object enters at least a portion of the region covered according to a display of the at least a portion of the graphic region, through the camera. According to an embodiment, the processor 210 may be configured to adjust transparency of the at least a portion of the graphic region in response to the external object entering the at least a portion of the region.

According to an embodiment, the wearable device 102 may include at least one sensor. According to an embodiment, the processor 210 may be configured to identify whether the user's posture is changed to a reference posture capable of changing a position, through the at least one sensor, while the at least a portion of the graphic region is displayed. According to an embodiment, the processor 210 may be configured to adjust transparency of the at least a portion of the graphic region in response to the posture changed to the reference posture.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., the electronic device 102). For example, a processor (e.g., the processor 210) of the machine (e.g., the electronic device 102) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device comprising:

a display arranged with respect to eyes of a user wearing the wearable device;

a camera comprising at least one lens that faces a direction corresponding to a direction in which the eyes face;

at least one processor comprising processing circuitry; and memory storing instructions that, when executed by the at least one processor individually or collectively, cause the wearable device to:

identify, based on a schedule, a place and a time duration that are labeled in the schedule for displaying a graphic region for the schedule, based on the wearable device being positioned in the place labeled in the schedule within the time duration labeled in the schedule, identify a direction of the camera of the wearable device with respect to a region in the place to which the graphic region for the schedule is set to be displayed, wherein the region in the place is labeled in the schedule, based on identifying that the direction of the camera corresponds to a first direction in which the camera faces the region in the place, display, via the display, at least a portion of the graphic region on at least a portion of the region in the place, and based on identifying that the direction of the camera corresponds to a second direction different from the first direction, display, via the display, information for informing to change a direction of the camera toward the first direction.

2. The wearable device of claim 1, wherein the instructions further cause, when executed by the at least one processor, the wearable device to:

display, via the display, information for informing a movement to the place, based on the wearable device being positioned outside of the place labeled in the schedule within the time duration labeled in the schedule.

3. The wearable device of claim 1, wherein the instructions cause, when executed by the at least one processor, the wearable device to display, based on the direction corresponding to the first direction, the at least the portion of the graphic region by expanding the at least the portion of the graphic region from a portion of the region spaced apart from the wearable device to another portion of the region adjacent to the wearable device.

4. The wearable device of claim 1, wherein the instructions further cause, when executed by the at least one processor, the wearable device to display, via the display, an execution screen of each of one or more software applications set for the schedule, with the at least the portion of the graphic region, based on the direction corresponding to the first direction.

5. The wearable device of claim 4, wherein the instructions further cause, when executed by the at least one processor, the wearable device to cease displaying one or more execution screens of one or more other software applications, distinct from the one or more software applications, based on the direction corresponding to the first direction.

6. The wearable device of claim 5, further comprising:

another camera facing the eyes, wherein the instructions further cause, when executed by the at least one processor, the wearable device to:

identify a gaze of the user through images obtained by using the other camera, and cease displaying a first execution screen positioned outside of the gaze from among the one or more execution screens, based on the direction corresponding to the first direction, and wherein a second execution screen in which the gaze is positioned from among the one or more execution screens is maintained via the display, independently from the direction corresponding to the first direction.

7. The wearable device of claim 6, wherein the instructions further cause, when executed by the at least one processor, the wearable device to cease representing content provided through the second execution screen maintained via the display.

8. The wearable device of claim 1, wherein the instructions further cause, when executed by the at least one processor, the wearable device to:

display, via the display, a message comprising an executable object for ceasing to display the graphic region, while at least the portion of the graphic region appears, and display, via the display, a portion of the region and a portion of the graphic region by ceasing to display another portion of the graphic region, in response to a user input on the executable object.

9. The wearable device of claim 1, wherein the instructions further cause, when executed by the at least one processor, the wearable device to:

display, via the display, a message comprising an executable object for ceasing to display the graphic region on the region, while at least the portion of the graphic region appears, and maintain providing the region, by ceasing to display a portion of the graphic region displayed based on the direction corresponding to the first direction, in response to a user input on the executable object.

10. The wearable device of claim 1, wherein the instructions further cause, when executed by the at least one processor, the wearable device to:
obtain biometric data of the user,
display, in a virtual reality environment, the at least the portion of the graphic region, based on the direction corresponding to the first direction and the biometric data within a reference range, and
display, in a mixed reality environment, the at least the portion of the graphic region, based on the direction corresponding to the first direction and the biometric data outside of the reference range.

11. The wearable device of claim 1, wherein the instructions cause, when executed by the at least one processor, the wearable device to:
identify a level of the schedule,
display, in a virtual reality environment, the at least the portion of the graphic region, based on the direction corresponding to the first direction and the level higher than a reference level, and
display, in a mixed reality environment, the at least the portion of the graphic region, based on the direction corresponding to the first direction and the level lower than or equal to the reference level.

12. The wearable device of claim 1, wherein the instructions cause, when executed by the at least one processor, the wearable device to:
obtain data indicating illuminance around the wearable device, and
display the at least the portion of the graphic region in a brightness identified based on the illuminance in response to the direction corresponding to the first direction.

13. The wearable device of claim 1, wherein the instructions cause, when executed by the at least one processor, the wearable device to:
identify, while the at least the portion of the graphic region is displayed via the display, a progress status of the schedule, based on biometric data of the user, and
based on the progress status, maintain displaying the at least the portion of the graphic region or change the at least the portion of the graphic region to at least a portion of another graphic region set with respect to the region for the schedule.

14. The wearable device of claim 1, wherein the instructions cause, when executed by the at least one processor, the wearable device to:
identify another schedule, distinct from the schedule, registered with respect to the region through an account of the user, while the at least the portion of the graphic region is displayed via the display, and
display, via the display, at least a portion of another graphic region for the other schedule, on at least the portion of the region, in response to the other schedule being identified.

15. The wearable device of claim 1, further comprising:
a communication circuit,
wherein the instructions further cause, when executed by the at least one processor, the wearable device to:
identify an electronic device being positioned in the region, via the camera or the communication circuit, and
transmit, to the electronic device via the communication circuit, a signal for changing settings of the electronic device to settings for the schedule, based on the direction corresponding to the first direction.

16. The wearable device of claim 1, further comprising:
a communication circuit,
wherein the instructions further cause, when executed by the at least one processor, the wearable device to:
identify an electronic device, comprising a display, positioned in the region, via the camera or the communication circuit, and
based on the direction corresponding to the first direction:
display, via the display, an execution screen of a first software application set for the schedule, with the at least the portion of the graphic region, and
transmit, to the electronic device via the communication circuit, a signal for displaying an execution screen of a second software application set for the schedule via the display of the electronic device.

17. The wearable device of claim 1, further comprising:
a communication circuit,
wherein the instructions further cause, when executed by the at least one processor, the wearable device to:
register, through a software application, the schedule labeled in the place including the region to which the graphic region is set,
based on the registration, transmit, via the communication circuit to a server, information on the schedule,
while the software application is in an inactive state, receive, via the communication circuit, a signal transmitted from the server in response to identifying the schedule based on the information,
change, in response to the signal, a state of the software application from the inactive state to an active state, and
execute operations for displaying via the display the at least the portion of the graphic region, by using the software application changed to the active state.

18. The wearable device of claim 1, further comprising:
a communication circuit,
wherein the instructions further cause, when executed by the at least one processor, the wearable device to:
register, through a software application, the schedule labeled in the place including the region to which the graphic region is set,
based on the registration, transmit, via the communication circuit to a server, information on the schedule,
receive, via the communication circuit, a signal transmitted from the server in response to identifying the schedule based on the information,
change, in response to the signal, states of one or more other software applications indicated by the signal to active states, and
execute operations for displaying via the display the at least the portion of the graphic region, based at least in part on the one or more other software applications changed to the active states.

19. The wearable device of claim 1, further comprising:
a communication circuit,
wherein the instructions further cause, when executed by the at least one processor, the wearable device to:
register, through a software application, the schedule labeled in the place including the region to which the graphic region is set,
based on the registration, transmit, via the communication circuit to a server, information on the schedule, and
provide, through an operating system, data for accessing the information in the server, to one or more other software applications in the wearable device, the one or more other software applications capable of processing the schedule.

20. The wearable device of claim 1, wherein the instructions further cause, when executed by the at least one processor, the wearable device to:

register, through a software application, the schedule labeled in the place including the region to which the graphic region is set, and provide, through an operating system to one or more other software applications in the wearable device, data indicating a location in which information on the schedule is stored according to the registration, the one or more other software applications capable of processing the schedule.

* * * * *